US011272195B2

(12) United States Patent
Van Der Vleuten et al.

(10) Patent No.: US 11,272,195 B2
(45) Date of Patent: Mar. 8, 2022

(54) MULTI-RANGE HDR VIDEO CODING

(71) Applicant: KONINKLIJKE PHILIPS N.V., Eindhoven (NL)

(72) Inventors: Renatus Josephus Van Der Vleuten, Veldhoven (NL); Rutger Nijland, Someren (NL); Johannes Yzebrand Tichelaar, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 17/266,650

(22) PCT Filed: Aug. 22, 2019

(86) PCT No.: PCT/EP2019/072536
§ 371 (c)(1),
(2) Date: Feb. 8, 2021

(87) PCT Pub. No.: WO2020/048790
PCT Pub. Date: Mar. 12, 2020

(65) Prior Publication Data
US 2021/0360266 A1    Nov. 18, 2021

(30) Foreign Application Priority Data

Sep. 5, 2018  (EP) .................................... 18192636
May 27, 2019 (EP) .................................... 19176732
Jul. 23, 2019  (EP) .................................... 19187932

(51) Int. Cl.
*H04N 19/186*    (2014.01)
*H04N 19/44*      (2014.01)
*H04N 19/98*      (2014.01)

(52) U.S. Cl.
CPC ........... *H04N 19/186* (2014.11); *H04N 19/44* (2014.11); *H04N 19/98* (2014.11)

(58) Field of Classification Search
CPC ....... H04N 19/186; H04N 19/44; H04N 19/98
(Continued)

(56) References Cited

U.S. PATENT DOCUMENTS

2016/0307602 A1  10/2016  Mertens
2018/0115777 A1  4/2018   Piramanayagam et al.

FOREIGN PATENT DOCUMENTS

WO    2011107905 A1    9/2011
WO    2012127401 A1    9/2012
WO    2016020189 A1    2/2016

OTHER PUBLICATIONS

International Search Report and Written Opinion from PCT/EP2019/072536 dated Nov. 26, 2019.

*Primary Examiner* — On S Mung

(57) ABSTRACT

At least some applications in the total HDR video chain desire some more sophisticated approach, such as a high dynamic range video encoder (900), arranged to receive via an image input (920) an input high dynamic range image (MsterHDR) which has a first maximum pixel luminance (PB_C_H50), the encoder being arranged to receive via a metadata input (921) a master luma mapping function (FL_50$t$1), which luma mapping function defines the relationship between normalized lumas of the input high dynamic range image and normalized lumas of a corresponding standard dynamic range image (Im_LDR) having a maximum pixel luminance of preferably 100 nit, characterized in that the encoder further comprises a metadata input (923) to receive a second maximum pixel luminance (PB_CH), and the encoder further being characterized in that it comprises: —a HDR function generation unit (901) arranged to apply a standardized algorithm to transform the master luma mapping function (FL_50$t$1) into a adapted luma mapping function (F_H2hCI), which relates normal- (Continued)

ized lumas of the input high dynamic range image to normalized luminances of an intermediate dynamic range image (IDR) which is characterized by having a maximum possible luminance being equal to the second maximum pixel luminance (PB_CH); an IDR image calculation unit (902) arranged to apply the adapted luma mapping function (F_H2hCI) to lumas of pixels of the input high dynamic range image (MsterHDR) to obtain lumas of pixels of the intermediate dynamic range image (IDR); and an IDR mapping function generator (903) arranged to derive on the basis of the master luma mapping function (FL_50*t*1) and the adapted luma mapping function (F_H2hCI) a channel luma mapping function (F_I2sCI), which defines as output the respective normalized lumas of the standard dynamic range image (Im_LDR) when given as input the respective normalized lumas of the intermediate dynamic range image (IDR); the encoder being further characterized to have as output: the intermediate dynamic range image (IDR), as first metadata the second maximum pixel luminance (PB_CH), as second metadata the channel luma mapping function (F_I2sCI); and as third metadata the first maximum pixel luminance (PB_C_H50).

25 Claims, 28 Drawing Sheets

(58) Field of Classification Search
USPC .................................................... 375/240.12
See application file for complete search history.

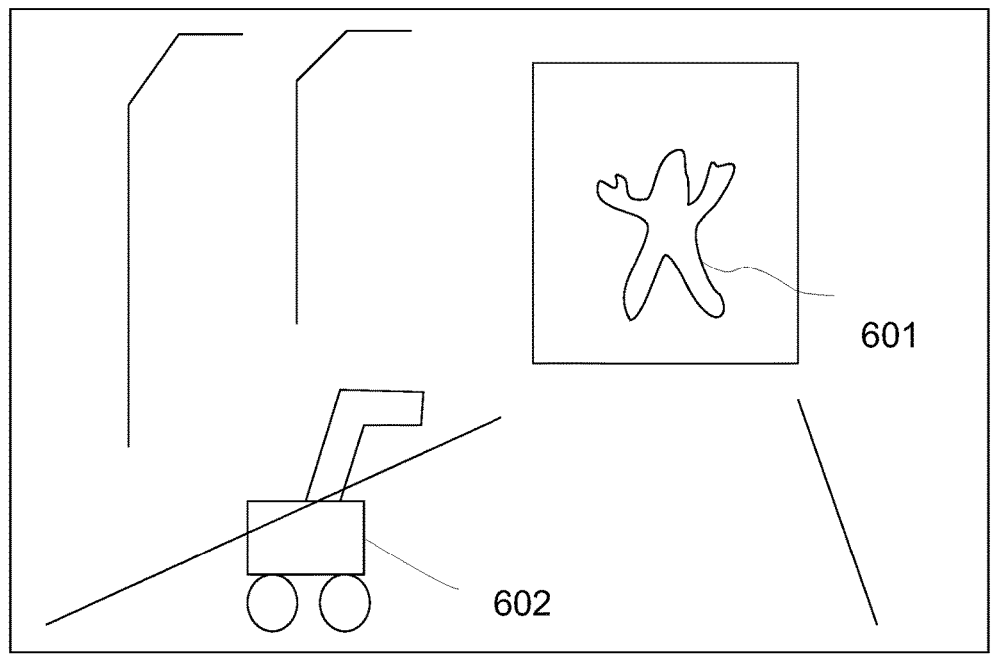
Fig. 6A
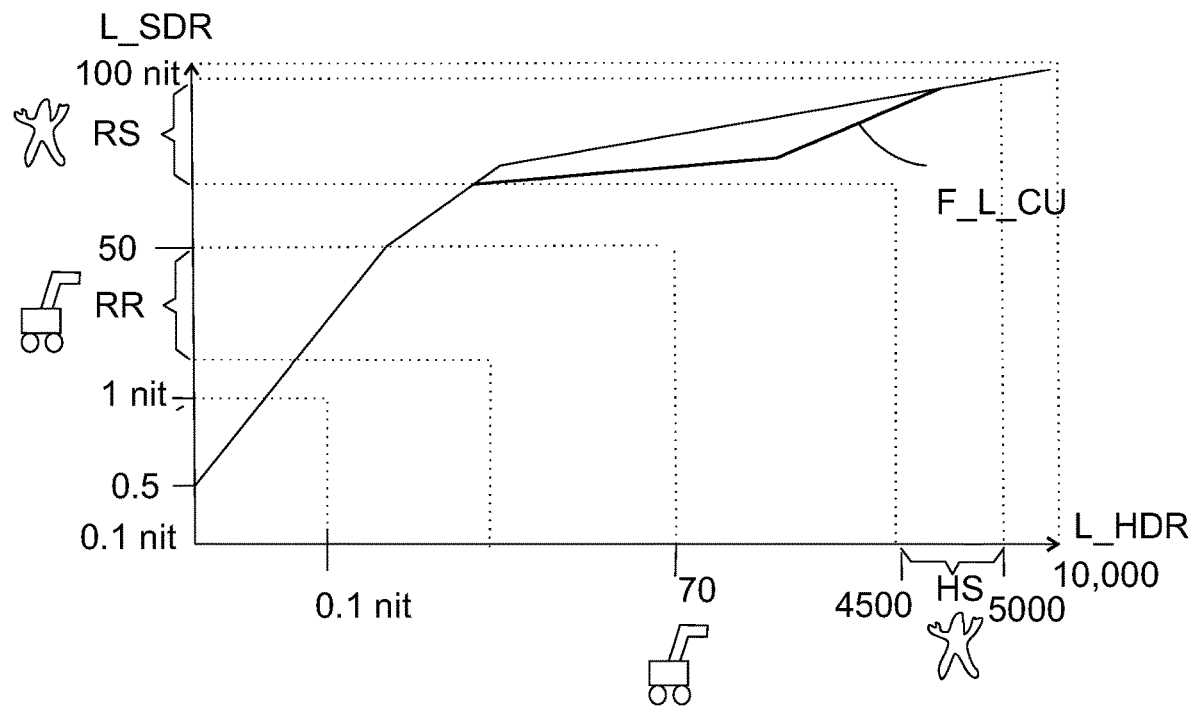
Fig. 6B
Fig. 6

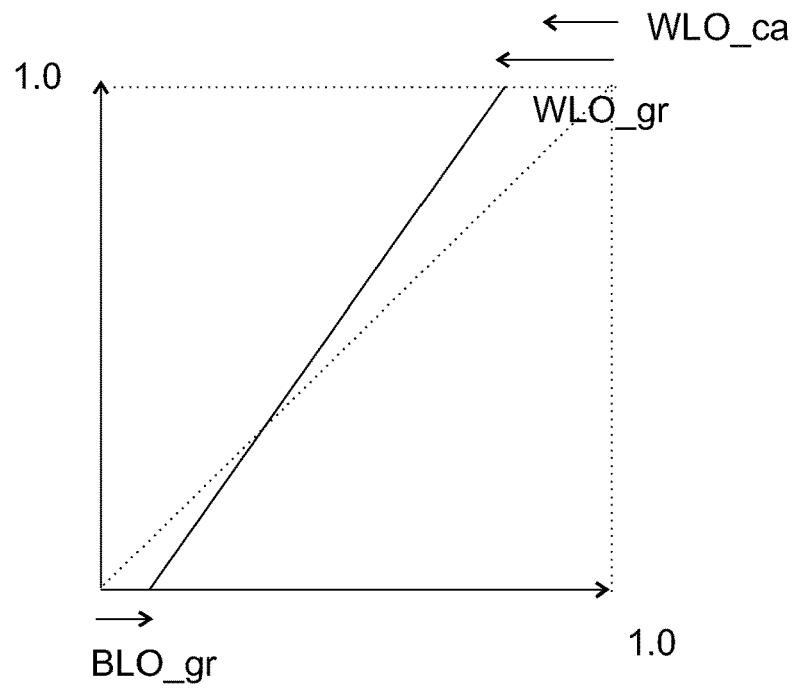
Fig. 12a
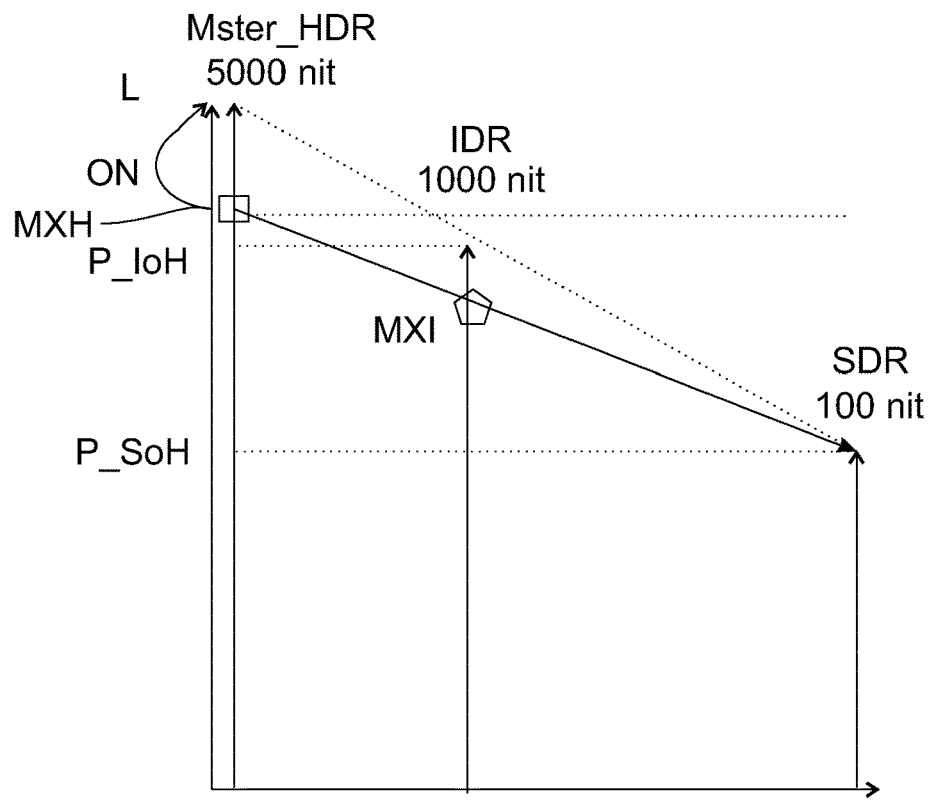
Fig. 12b
Fig. 12

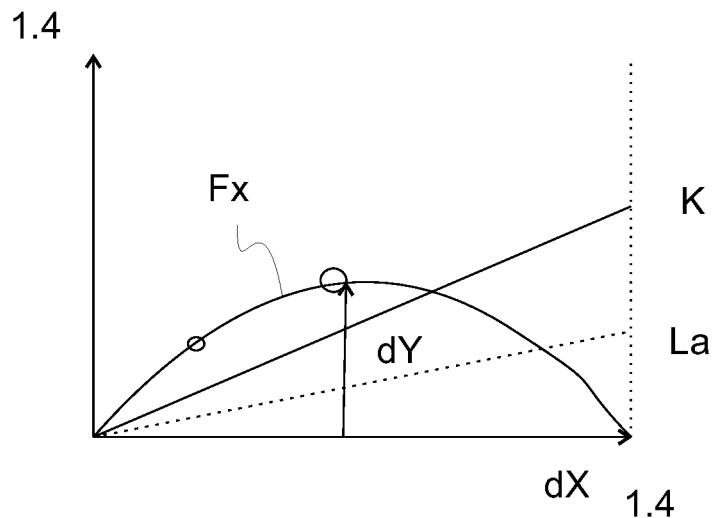
Fig. 13a
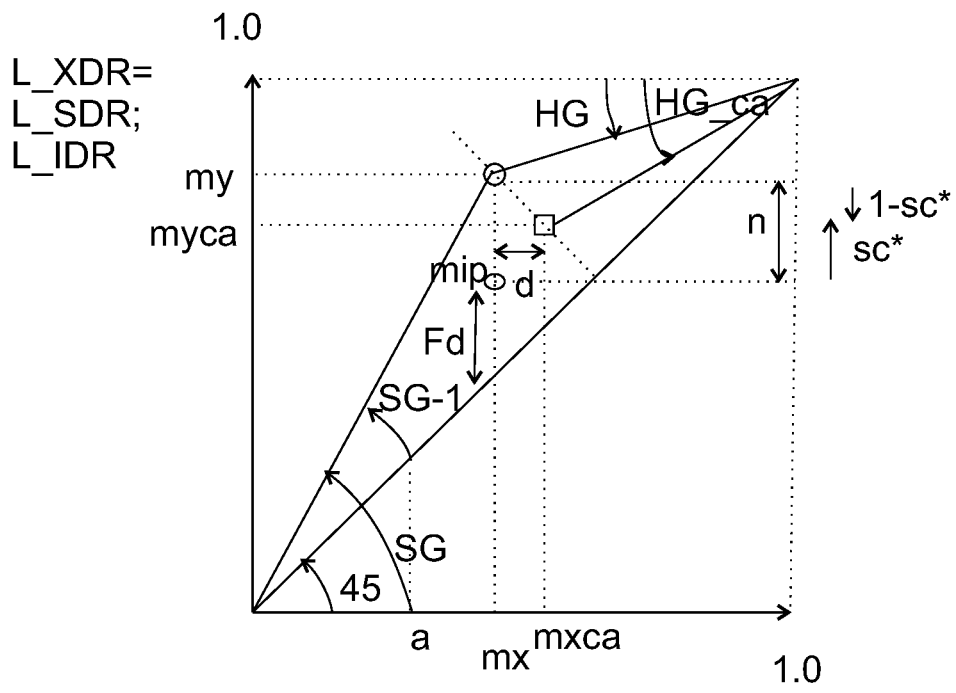
Fig. 13b
Fig. 13

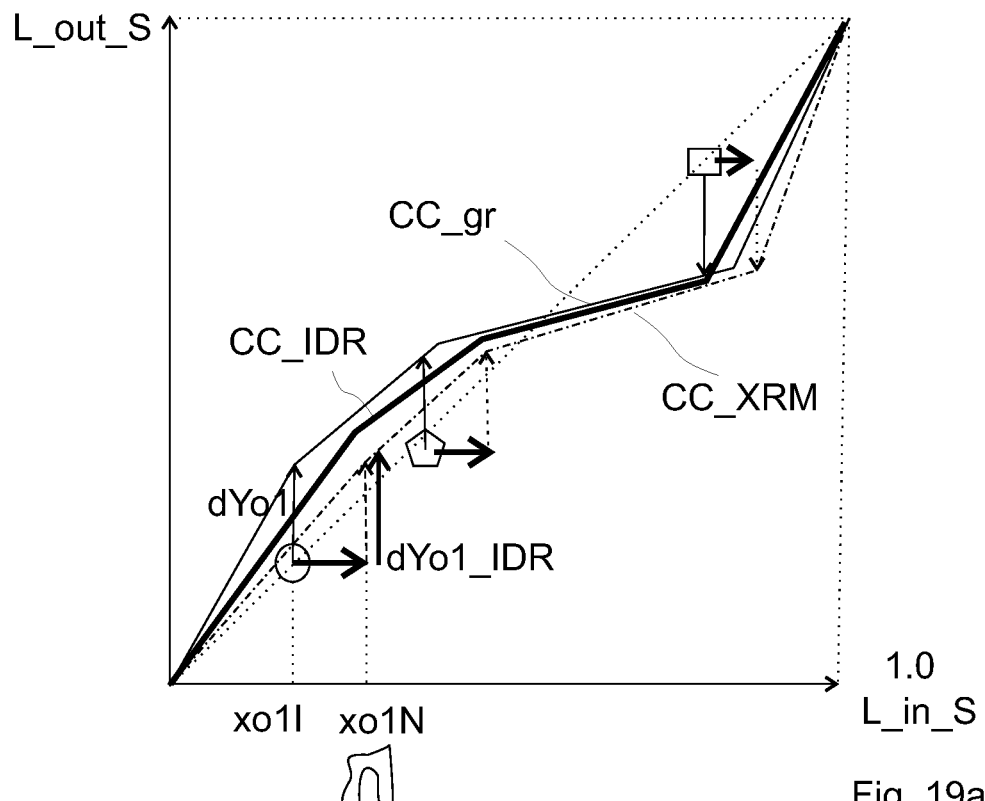
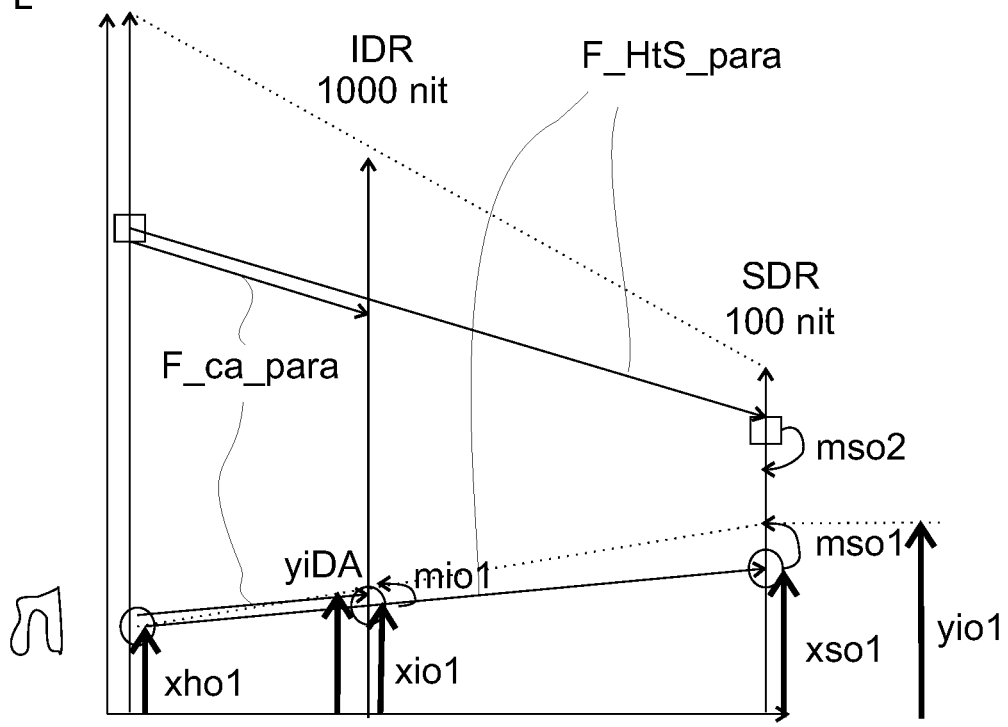
Fig. 19a
Fig. 19b    Fig. 19

MULTI-RANGE HDR VIDEO CODING

CROSS-REFERENCE TO PRIOR APPLICATIONS

This application is the U.S. National Phase application under 35 U.S.C. § 371 of International Application No. PCT/EP2019/072536, filed on Aug. 22, 2019, which claims the benefit of EP Patent Application No. EP 18192636.1, filed on Sep. 5, 2018 and EP Patent Application No. EP 19176732.6, filed on May 27, 2019 and EP Patent Application No. EP 19187932.9, filed on Jul. 23, 2019. These applications are hereby incorporated by reference herein.

FIELD OF THE INVENTION

The invention relates to methods and apparatuses for coding high dynamic range images, and in particular videos being time sequences of images which can be compressed according to compression techniques like MPEG-HEVC (e.g. television broadcasts), in particular by using an image(s) of a second dynamic range (for communication to a decoder) to represent a (master) image(s) of a first dynamic range, which dynamic range change involves the changing of image pixel luminances (e.g. from a first normalized to 1.0 value to a second normalized to 1.0 value) by applying functions to be co-communicated with the second dynamic range image(s) typically as metadata.

BACKGROUND OF THE INVENTION

About 5 years ago, the novel techniques of high dynamic range video coding were introduced to the world (e.g. leading to special HDR blu-ray disks, to be watched on 1000 nit UltraHD Premium tv's).

This novel way of technically handling images contrasts technically in many ways with the legacy video coding according to which all videos were encoded for the previous 50 years until then, which is nowadays called Standard Dynamic Range (SDR) video coding (a.k.a. low dynamic range video coding; LDR). To represent an image, digitally coded representations of pixel colors are needed, and SDR's luma code definition (a.k.a. Opto-electrical transfer function OETF) of Rec. 709 was able to encode (with 8 or 10 bit luma words) only about 1000:1 luminance dynamic range, because of its approximately square root function shape (luma: $Y=\sqrt{Luminance\ L}$). This however suited perfectly for encoding images to be displayed on the displays of those times having typical luminance rendering capabilities (of all displays at that time) approximately between 0.1 and 100 nit, the latter value being the so-called peak brightness (PB), a.k.a. maximum luminance.

Seeing that the Rec. 709 luma code definition function cannot mathematically represent the huge range of HDR scene image luminances (e.g. between 0.001 nit and 10,000 nit desired image coding peak brightness PB_C), HDR researchers initially solved this problem by designing a new HDR code allocation which was much more logarithmic in shape, so that much more luminances could be coded (since the visual system needs less accuracy i.e. less code values for brighter than darker regions, ergo one can understand that allocating e.g. 50 codes out of $2^8=256$ (where ^ denotes the power function) for each luminance decade one can already code 100,000:1 dynamic range). This is the simple "natural" manner to encode HDR image colors, by using the SMPTE 2084-standardized so-called perceptual quantizer (PQ) function.

One may naively think that this is all there is to encoding and decoding HDR images, but things are not quite that simple, ergo additional coding approaches emerged, in particular the previously developed approach to HDR video coding and handling of the present applicant.

To get a decent understanding of what is involved and needed in HDR video coding, FIG. 1 summarizes some important aspects.

Suppose we have on the left side the luminance range of all possible (PQ-decoded) HDR luminances, up to PB_C=5000 nit. Suppose for a moment that to make this image look perfectly as desired, all object pixels of this what we will call master HDR image are created on a computer (how to start from e.g. a broadcast camera is explained below with FIG. 2). A problem with the natural HDR codec (which merely offers a technology to encode luminances up to 10,000 nit i.e. also up to 5000 nit as desired in this example), is that if the consumer also has an expensive 5000 nit display peak brightness (PB_D) display (and if he views the image under standardized viewing environment conditions) he may watch the video perfectly as the creator (e.g. the movie director) intended, but if he has a different display (e.g. PB_D=750 nit, or PB_D=100 nit) there is an unresolved, and also not simple problem: how does one display a 5000 nit PB_C image on a 750 nit PB_D display? There seems to be no elegant simple solution to this. Applying accurate luminance displaying will perfectly display all objects with a luminance up to 750 nit, but clip all the brighter object pixels to the same PB_D=750 nit, making a lot of the image objects disappear into a white blob area, which certainly is not good-looking. One may think that linear scaling of the content is a solution (dividing all HDR luminances by 5000/750, which is the so-called map content-white-on-display-white approach), but then the darker objects like the man in the dark area of the cave in example scene image ImSCN3 having HDR luminances (0.05 nit), which may already be too low for lesser dynamic range displays, gets unperceivable dark luminance on the 750 nit display (0.05*750/5000=0.0075 nit).

FIG. 1 also teaches that different HDR images, of different archetypical HDR scenes, may have quite different requirements regarding how to squeeze the various (potentially at "arbitrary" luminance positions along the HDR luminance range DR_2) HDR luminances into the much smaller e.g. LDR luminance dynamic range DR_1.

Real world luminances may range e.g. when both indoors and outdoors objects are simultaneously in view over illumination contrast*object reflection contrast=(1:100)*(1:100), and although the luminances in an image representing a scene need not nor will typically be identical to the original scene luminances, for a good HDR representation image one would expect pixel luminances possibly ranging up to at least 1000 nit, and starting at a minimum being at least 0.1 nit or less (ergo DR_im>=10,000:1). Furthermore, good HDR images may be much more about the smart allocation of the various object luminances along the luminance range than about the physical dynamic range itself (let alone the misunderstanding that it is the amount of bits that is guiding, which is not true for non-linear luma code definitions, and a 10 bit luma image may just as well be some HDR image as an SDR image).

FIG. 1 shows a couple of archetypical illustrative examples of the many possible HDR scenes a HDR system of the future (e.g. connected to a 1000 nit PB_D display) may need to be able to correctly handle, i.e. by displaying the appropriate luminances for all objects/pixels in the image.

E.g. ImSCN1 is a sunny outdoors image from a western movie (which has mostly bright areas, brighter than average which would be a dull day image, which areas should ideally be rendered brighter than on a 100 nit display, to offer more a sunny look than a rainy day look, e.g. with an average luminance of say 400 nit). ImSCN2 on the other hand is a very different kind of image, namely a night-time image, in which the dark regions (and e.g. their good visibility) dominate, yet what makes this a HDR image rather than simply a dark SDR image is that there are also bright pixels in the spots under the street lights, and may be in the lit windows of the houses, and even very bright pixels (e.g. 3000 nit) on the lamp surfaces of the street lights.

What makes such an ImSCN1 image sunny, versus the ImSCN2 dark? Not necessarily the relative luminances, at least not in the SDR paradigm (there will be pixel luminances all over the range between 0.1 and 100 nit possibly for both images, although the spatial distribution of such luminances and in particular the histogram may be different).

What makes HDR image rendering different from how it always was in the SDR era which ended only a couple of years ago, is that the SDR had such a limited dynamic range (about PB=100 nit, and minimum black level MB approximately 0.1 to 1 nit), that mostly only the intrinsic reflectivities of the objects could be shown in SDR (which would fall between 90% for good white and 1% for good black). That would be good for recognizing objects (having a certain amount of brightness from their reflection, and of course their chromaticity), under uniform technically controlled illumination, but not so much the beautiful variations in illumination itself one can have in natural scenes, and what impact that can have on viewers (a sunbeam coming out of a window, or plasma radiating out of a witch). If the display allows it, and therefor so should the image coding and handling technology, one would in a forest walk really see the sun shine through the trees, i.e. rather than just a somewhat more yellowish impression like on a SDR display, one would like to see bright and colorful sunlit clothes when the person walks from the shadow into the sun. And so should fire and explosions have an optimal visual impact, at least as far as the PB_D allows.

In SDR one could make the night-time image somewhat darker than a normally lit image, as perceivable in the luma histogram, but not too much or it would just render as too dark and ugly (possibly largely invisible even) an image (this is why the convention was introduced to make night-time images relatively bright still, but blue). And also, on a 100 nit TV or in a 100 nit encoding there just isn't any room available for anything overly bright. So one had to show the objects independent of their illumination, and couldn't at the same time faithfully show all the sometimes highly contrasty illuminations of the scene that could happen. In practice that meant that the highly bright sunny scene had to be rendered with approximately the same display luminances (0-100 nit) as a dull rainy day scene, and even a night-time scene.

In real life human vision would also adapt to the available amount of light, but not that much (most people in real life do recognize that it's getting dark, or that they are in a darker, or quite bright environment). And one should not forget that a television showing images is not a simulation of an adapted eye, but rather a simulation of real-life environments, as good as it gets given the viewing environment and other technical limitations. So one would like to display the images with all the spectacular local and also temporal lighting effects that one can artistically design into the images, to get much more realistic rendered images at least if the end viewer has a HDR display available. What exactly would be an appropriate luminance for say a light saber in a dark room we will leave to the color grader creating the master grading(s) to decide (we assume for simplicity of teaching in this patent that the various dynamic range images, at least the two of extremest different dynamic range are created by a human grader, but similarly images can be created by automatic software), and this application will focus on the needed technical components to create and handle such images, for various market players with potentially different needs. On the left axis of FIG. 1 are object luminances as one would like to see them in a (e.g.) 5000 nit PB_C master HDR grading, as directly displayable on a 5000 nit PB_D (reference) display (i.e. the image grader makes an image assuming the typical high quality HDR TV at home will have 5000 nit PB_D, and he may actually be sitting in a representation of such a home viewing room and grade on such a grading display). If one wants to convey not just an approximate illusion of the original HDR scene that was captured, but a real sense of the cowboy being in a bright sunlit environment, one must specify and render those pixel luminances sufficiently bright, around e.g. 500 nit on average.

For the night scene one wants mostly dark luminances, but the main character on the motorcycle should be well-recognizable i.e. not too dark (e.g. around 5 nit), and at the same time there can be pixels of quite high luminance, e.g. of the street lights, e.g. around 3000 nit on a 5000 nit display, or around the peak brightness on any other HDR display (e.g. 1000 nit PB_D). The third example ImSCN3 shows what is now also possible on HDR displays: one can simultaneously render both many (semantically more relevant than merely a lamp, i.e. with lots of intra-region detail, like sunlit trees) very bright and many important very dark pixels. ImSCN3 shows as what may be seen as an archetypical and relatively difficult to handle HDR scene image a dark cave, with an opening through which one can see the sunny outside. For this scene one may want to make the sunlit objects like the tree somewhat less bright than in a scene which wants to render the impression of a bright sunny landscape only, e.g. around 400 nit, which should be more coordinated with the essentially dark character of the inside of the cave. A color grader may want to optimally coordinate the luminances of all objects (already in the PB_HDR=5000 nit master HDR image), so that nothing looks inappropriately dark or bright and the contrast are good, e.g. the person standing in the dark in this cave may be coded in the master HDR graded image around 0.05 nit.

Having this master HDR image created, an artistic question (even before formulating it in enabling technology) is then how this image should be RE graded to images of different dynamic range, e.g. at least a 100 nit PB_C legacy SDR image.

It helps for intelligibility when relationships between luminances are given, ergo we will do so in this patent when handy. In fact technically, luminances will be coded as lumas, via a luma code allocation function a.k.a. opto-electrical transfer function (OETF), and hence one can also formulate all relationships between luminances, e.g. a function to calculate an output luminance L_out from an input L_in, also as relationships between equivalent lumas.

Perhaps a little confusing, one can also formulate luminances in a normalized (i.e. with max. normalized luminance equal to 1.0) manner, and define all actions on such normalized luminances. This has as advantage that (provided both image pixel colors are defined in the same set of RGB primaries) the normalized HDR color gamut exactly overlaps the LDR color gamut, and one can hence show luminance changes in this single normalized color gamut. Obviously the relative position of a normalized LDR luminance which should display at exactly the same absolute luminance as a HDR luminance which is defined in a HDR luminance luminance range with PB_C=5000, will have a different relative height (i.e. one can then show in such a gamut representation a luminance mapping for a particular HDR pixel luminance needed when creating a corresponding LDR image pixel luminance as a relative/normalized change of height in this normalized gamut). The relationship between absolute and relative luminances is simple: L_norm=L_abs/PB_C, with PB_C any maximum luminance of a coding, e.g. 5000 nit for a HDR coding, and by standard agreement 100 nit for SDR.

A last thing that is important to learn from FIG. 1 (because all technology must behave accordingly), is that depending on which type of object (i.e. its pixel luminances) in which kind of HDR scene one is dealing with, there can be different high level approaches on how to re-grade i.e. luminance transform said pixel luminance(s).

E.g., an object in the dark like the motorcycle rider may be rendered by equating the absolute luminance (which involves a corresponding scaling change for the normalized luminance) for all re-graded image, in particular the starting master HDR image on the left, the corresponding SDR image on the right, and any medium dynamic range (MDR) image in between, e.g. the one shown with PB_C=PB_MDR=800 nit which is optimized (with the correct object luminances) for direct display on a 800 nit PB_D display (e.g. for a consumer who has purchased such a display, and gets 5000 nit PB_C HDR images from e.g. his cable provider, or via a satellite settopbox, or from internet, etc.). This makes sense, because the creator of the content wants to convey a dark atmosphere in which the motorcycle is just visible, and it would be bad to render it brighter on a brighter display, merely for the reason that such a display can do so, because it has a larger luminance range ending at a higher PB_D to display all object luminances in the scene.

An object like the sun will probably follow an entirely different philosophy, namely the map white-on-white method, in which it is always given the highest possible value in any image representation, i.e. PB_C. Obviously other kinds of objects can follow other kinds of rules, and we could go on for longer (e.g. the cowboy will follow a scaled middle grey philosophy), but it suffices for the reader to appreciate that one must have a technology which allows an almost "arbitrary" allocation of all pixel luminances, and not e.g. a fixed one like what simple technologies would prescribe.

Whereas FIG. 1 summarizes simplistically the desiderata for versatile HDR image creation (spanning such differently technically constrained applications like movies, real-life sports broadcast, etc.), the question for HDR technology developers is then still how to encode HDR images, and also how to transform HDR images to be able to optimally display them on any display with lesser PB_D than the coded PB_C (i.e. the brightest pixel that can possibly occur in the video at least once). Capturing HDR scene images, and importantly also art directing and lighting an HDR scene is also a technical skill, but the present application need not focus on that aspect.

The simplest thing to conceive is to merely code the HDR pixel luminances (ignoring the complexity of display adaptation (DA), i.e. how to map a PB_C1 image to an image for a less capable display). The problem was that the Rec. 709 OETF could only code a luminance dynamic range of 1000:1, i.e. a new HDR OETF (or in fact its inverse, the EOTF) had to be invented. A first HDR codec was introduced to the market, called HDR10, which is e.g. used to create the new black ribbon HDR blu-rays, and it uses as OETF a more logarithmically shaped function called the Perceptual Quantizer (PQ) function which is standardized in SMPTE 2084, and which allows defining lumas for luminances between 1/10,000 nit and 10,000 nit, sufficient for practical HDR video production. Furthermore it has as a nice property that the luma codes it produces are in tune with how human vision works (kind of the perceptual grey values the brain uses to characterize different luminances in a scene, which is a nice property both for efficiently re-grading certain grey valued objects, and for efficiently representing luminances, as does the brain). After the calculation of the lumas, one just had a 10 bit plane of pixels (or rather with also the two chrominance planes Cb and Cr 3 bit planes), which could be classically treated further down the line "as if" they were an SDR image mathematically, e.g. MPEG compressed (this is an important constraint, since it avoids to redesign and redeployment of several pre-existing technologies in the total video pipeline).

A significant technical difficulty with HDR10 images is still how to appropriately display them on lesser capable displays (e.g. less capable than the 2000 PB_C that the HDR content was made for). If one e.g. merely maps linearly white-on-white (coded image max. white a.k.a. coding peak brightness PB_C to e.g. SDR display peak brightness PB_D) the most interesting (darker) parts of an image with PB_C=1000 nit typically would look 10× too dark, which would mean that the night scene ImSCN2 become unwatchable. Because of the logarithmic nature of the PQ OETF, HDR10 images are watchable (when just rendered as lumas, i.e. decoded with the wrong EOTF), but have an ugly deteriorated contrast, making them look inter alia washed out and of incorrect brightness.

A simple system for creating HDR video content, e.g. in a broadcast scenario, is explained with FIG. 2. Again, details of the non-linear luma or R'G'B' pixel color codes allocation are not considered yet, for keeping the elucidation simple (the so-called Opto-optical approach: OOTF, with normal (absolute) luminances throughout the chain). With the camera (201) exposure (EXP) one can select which object luminances are faithfully recorded, and at which relative value (since a camera functions as a relative luminance meter for all spatial positions, or rather a relative colorimeter yielding RGB-triplets). Since both a camera sensor and an N-bit mathematical representation of a color component both practically have a final extent, starting at a minimum value and ending at a maximum value, it makes sense to expose not for the details of the sun which is a billion nit, but clip at least those luminances or RGB values to their maximum. In a substantially infinite range exposure choices can be "corrected" by later luminance remapping, but in any case this fact illustrates to the reader that there is no "natural" obvious mapping of scene luminances onto to be displayed luminances (the latter referencing of luminances being known as a display-related colorimetry, and the one which in fact is what ultimately matters). The linear luminance image LIN HDR is typically first subjected to an OOTF mapping (202). This existed already to some extent in the SDR era, and corrects for the fact that human vision in the typically darker viewing environment of the evening living room in which television is watched needs higher contrast for a similar visual experience, ergo the OOTF is typically a soft gamma function. However, especially when mapping a scene of considerable dynamic range, on a typical display (205) of lesser dynamic range (even when it is a high quality 4000 nit reference monitor), some artistic optimization of the various object pixel luminance may be in order, by applying a potentially arbitrary curve, which we will in this text call grading, by grading unit 203. Especially for offline high quality productions, the grading effort may be considerable, to put a so-called creative vision or look into the master HDR image MAST_HDR (which as according to the present invention still has to be further handled technically, e.g. advantageously encoded). The resultant image then looks optimally and can be sent via some image communication connection 204 to the display 205, on which the human grader can check whether the image is already as desired, or continue tweaking the at least one luminance mapping function via a user interface control unit 206 (e.g. a grading console). This arbitrary grading forms the master look, not to be confused with arbitrary re-grading (secondary look) to obtain e.g. an as optimal as possible corresponding SDR image, which may be called the master SDR image (e.g. when forming part of a video coding philosophy as described herebelow). Although we elucidated for the reader only one more simple topology, the reader can understand that in practice there may be different actual embodiments depending on e.g. whether there is a real-life broadcast going on with only a single HDR camera, or a number of SDR and HDR cameras mixed, or a previously determined HDR image and corresponding re-graded SDR master image, which need to now be co-encoded according to the coding principles (e.g. ETSI1 or ETSI2 principles see below), etc.

Applicant realized, which was already elucidated with FIG. 1, that since there is a mathematical re-grading relationship between the various possible re-graded MDR image starting from the master HDR, provided one can technically pragmatically capture those functions, one can in fact encode a whole spectrum of different dynamic range functions, by sending only one of them, and the at least one luminance mapping function to create another image from the one actually sent. The first introduction of this possibility and ensuing technical coding concept was done in WO2011107905.

It was found to make sense to define the luminance mapping function F_L for transforming the (e.g. 5000 nit PB_C) master HDR image luminances to SDR image luminances, i.e. have the grader define the needed re-grading behaviour between the most extreme image representations, and then recalculate display-adapted luminance mapping functions F_L_DA for calculating an in-between MDR image pixel luminance corresponding to any possible 5000 nit PB_C M_HDR image luminance.

As applicant subsequently standardized, there are then two logical choices for the image to actually transmit (as sole image for the entire spectrum of re-gradable images of different dynamic range, in particular PB_C endpoint, as oftentimes one may assume the lower endpoint MB to be approximately fixed, e.g. 0.01 nit) to any receiver: the master HDR image, or the corresponding SDR image (one should stop for a second to understand that in that situation actually plain SDR images are transmitted instead of HDR images, and in fact because of the F_L function still also HDR images are communicated, because L_HDR_reconstructed=F_L_inverse[L_SDR]).

The second coding option, which is quite useful when the technical constraint is that many legacy displays need to be served in an undisturbed manner (in fact an old SDR display just gets an SDR image, and without needing to know that this encodes also an HDR image, it can directly display the SDR image and immediately get a very nice SDR rendering of a HDR scene, in fact as best as the display can display such a HDR scene), was standardized first under ETSI TS 103433-1 (note the -1; we will abbreviate it as ETSI1). Note that one has technical constraints like a need for reversibility of the SDR image colors, to be able to with sufficient precision reconstruct the original master HDR image at any receiving side, which was part of the technical contemplation leading to that standard (de)coding approach as it is defined.

The ETSI TS 103433-2 (ETSI2) is the coding alternative in which actually the master HDR image is communicated to receivers, and in which the function(s) F_L (actually as will be shown below, although for elucidation one may contemplate the system as if there was a single global F_L function for all pixel luminances in the communicated image, for technical reasons a set of subsequently applied mapping functions is used) serve to calculate images for optimal display on displays with PB_D<PB_C_master (i.e. for so-called display adaptation). Various customers can choose which system they desire to employ, e.g. a cable operator communicating ETSI2 HDR, will deploy to its users a STB which will decode and optimize for any display that user happens to have at home.

FIG. 3 first shows at bird-view level the components of a typical single-image-plus-functions HDR video communication system (encoder+decoder), non-limiting a typical system of the SDR-communicating type for the purpose of explaining the basic concepts.

The color transformer 302 gets as input MAST_HDR images (e.g. as they were captured by the camera and graded by the system elucidated with FIG. 2, and then communicated over some professional video communication system to a broadcaster-side encoder 321, which e.g. will transmit television programs over the air or via a television cable network) from an image source 301. A set of color transformation functions F_ct is then applied (in this example e.g. determined by a grading automaton software, such as applicant's automatic HDR-to-SDR conversion technology, which defines the F_ct functions based on image characteristics such as the histogram, etc.; the particular details can be left aside for this application's elucidation since that requires merely the presence of such optimized functions for any image or temporally successive set of images), comprising at least the luminance mapping function F_L, to obtain the corresponding SDR luminances for the luminances of the master HDR image (MAST_HDR) pixels. For ease of understanding the reader may for simplicity assume F_L is a $4^{th}$ power luminance mapping function (L_out_SDR=power(L_in_HDR; ¼)), for deriving the normalized to 1.0 SDR output luminances of the pixels in the 100 nit PB_C SDR output image Im_LDR (i.e. the right side luminance range of FIG. 1).

Since there is now a "normal" SDR image, it can be compressed with a standard video compression technique, e.g. an MPEG standard like HEVC or MPEG2, or a similar standard like AV1, which compression is performed by video compressor 303.

Since the receivers must be able to reconstruct the master HDR image from the received corresponding compressed SDR image Im_COD, apart from the actual pixelated images to be transmitted, also the color mapping functions F_ct must enter the video compressor. Without limitation, we may assume that the functions are stored in metadata, e.g. by means of the SEI (supplemental enhancement information) mechanism or a similar technique. Finally a formatter 304 does whatever is needed to format (put into data chunks etc.) the video stream for any technical communication medium 305, e.g. do a formatting for storage on a blu-ray disk, or for DVB communication over satellite, etc (the details of this can be found by the skilled person in the respective technical fields, and are irrelevant for understanding the present inventive concepts).

After MPEG decompression in a video receiver 320 performed by video decompressor 307 (after having passed through unformatter 306), the SDR image can be interpreted by the receiver by applying the standard Rec. 709 EOTF (to obtain the image for an SDR display), but a receiver can also decode the received Im_COD image differently, to obtain the reconstructed HDR image Im_RHDR.

This is performed by a color transformer 308, which is arranged to transform the SDR image as decompressed Im_RLDR into an image of any non-SDR dynamic range (i.e. of PB_C higher than 100 nit, and typically at least 6× higher). E.g. the 5000 nit original master image Im_RHDR may be reconstructed by applying the inverse color transformations IF_ct of the color transformations F_ct used at the encoding side to make the Im_LDR from the MAST_HDR (and which were received in metadata and passed through to the color transformer 308). Or, a display adaptation unit 309 may be comprised which transforms the SDR image Im_RLDR to a different dynamic range, e.g. Im3000 nit being optimally graded in case display 310 is a 3000 nit PB display, or a 1500 nit or 1000 nit PB image for corresponding lower PB_D displays, etc. We have non-limitedly assumed the video decoder and color transformer to be in a single video receiver 320. The skilled reader can understand that one can similarly design many different topologies with e.g. the decoding functionality separated in a settopbox to be connected to a display which merely functions as a dumb display for the pre-optimized images as received, or which does further image color transformations, etc.

FIG. 4 shortly summarizes the principles of applicant's luminance and color mapping technology as standardized in ETSI2 (in fact it details the color transformer 302 which was generically introduced in FIG. 3 according to the ETSI2 decoding philosophy (or similarly the ETSI1 encoding philosophy)), because it must be understood to understand some of the more specific embodiment techniques of the present application.

The input is supposed to be PQ-defined YCbCr pixel colors (i.e. luma Y and chrominance Cb and Cr color components per pixel). First the luma is linearized to normal linear luminances L in by EOTF application unit 401, which must use the SMPTE 2084 PQ EOTF. The whole re-grading process to obtain an SDR output pixel color from an input HDR pixel color can then be defined again with normal (physical SI and CIE universally defined) luminances. After this the luminance processing can be performed by luminance processor 401, which realizes the total F_L mapping as desired, but by sensibly chosen sub-units (these units 402, 403 etc. were technically designed to be advantageous to the needs of various HDR applications, such as automatic grading, ease of human grading, complexity of IC design, etc.).

Firstly a luminance uniformizer applies a fixed curve transformation which shape depends only on the peak brightness PB_C_H of the input HDR image (PB_C_H=e.g. 5000 nit), by applying the PB-depending one of a family of curves defined as:

$$Y'HP = \log(1+(RHO-1)*power(L\_in/PB\_C\_H;1/(2.4)))/\log(RHO) \quad [\text{Eq. 1}]$$

With $$RHO = 1+32*power(PB\_C\_H/10000;1/2.4) \quad [\text{Eq. 2}]$$

This maps all luminances to perceptually uniform grey lumas Y'HP. If PB_C_HDR=10000 nit, then this curve closely corresponds to the SMPTE 2084 PQ curve, which was known to be perceptually uniform. For lower PB_C_HDR input images the curve nicely scales (in fact it represents a sub-curve ending at e.g. 3000 nit on the 10000 nit curve in absolute sense), leading to a less steep for the darkest colors loggamma curve in the normalized [0-1.0]/[0-1.0] input/output luminance axis representation. I.e., the rest of the processing already starts nicely pre-normalized.

Subsequently a black-white level offsetter 403 may where desired apply some additive white level offset WLO, and some black level offset BLO.

The white level offset usefulness can be understood as follows. Suppose that the content creator is grading his images on a system set at PB_C=4000 nit (i.e. e.g. his reference grading monitor has a PB_D of 4000 nit), however, in the entire video he never actually makes an image with a higher pixel maximum brightness than e.g. 1500 nit (video maximum, being a different thing than codeable maximum PB_D). Then, since the SDR luminance dynamic range being small enough as it is, it makes sense to re-scale the input HDR dropping those unused values 1500-4000 nit (since we are using dynamically adjustable luminance mappings, which can be optimized per image/video time instant anyway). 1500/4000 corresponds to a normalized (input) HDR luminance of 0.375, so we can map this value to the maximum of the scaled HDR luma Y'HPS by dividing by 2.6.

To be precise, according to the ETSI2 standard the following calculation is performed:

$$Y'HPS = (Y'HP - BLO)/(1 - WLO - BLO) \quad [\text{Eq. 3}]$$

With WLO and BLO being communicated in the metadata co-communicated with or associatable with the received video images.

The black level offset is useful to get a more contrasty look for the SDR corresponding re-graded images, but one should mind that the ESTI1 received images should remain reverse-mappable to HDR image, i.e. not too many black pixel details should be lost (which is why there is also a parallel gain limiter, not shown in FIG. 4).

Basically, one can understand simplistically the black level offset as putting some HDR "black" color to 0.0 in the SDR, or more precisely via the unit 403 preparing for the HDR-to-SDR luminance mapping (i.e. with normalized luminances still in HDR, meaning with a relative distribution usable for getting a good look on an HDR display, and a bad not yet optimized look on a SDR display).

Subsequently a coarse dynamic range transformer 404 applies the primary luminance transformation to get SDR luminances (i.e. with a good first re-distribution of object luminances to get a reasonable look on SDR displays). For this the ETSI2 uses a curve which consist of a slope-controllable linear segment for the darkest HDR normalized luminances (the slope of this segment is called the Shadow Gain), another linear compressive part for the brightest normalized HDR input luminances Y'HPS (with a slope control parameter Highlight Gain), and a controllable parabolic part smoothing it together by offering a good SDR appearance for the midtones (with a control parameter midtone width, and the mathematics being readable in the standard, and in this application only re-explained (in as simple digestable manner as appropriate) to the extent necessary to understand the new inventive embodiments according to the present insights). So the output lumas Y'CL of this coarse dynamic range transformer 404 for the first time is defined in the SDR range, or SDR relative luma distribution statistics.

The technical (and artistic) offer to the content creator of this unit 404, is that the grader can nicely optimize how bright he needs to make the darkest pixels, at the expense (because of the limited SDR luminance range) of the intra-object contrast of other objects containing brighter pixels, but he can co-tune e.g. the Highlight Gain. The Shadow Gain can be understood e.g. for the person of 0.05 nit luminance standing in the dark shadowy areas of the cave. If we were to display him on an SDR display with a white-on-white criterion, i.e. a normalized mapping function which is an identity function with 45 degree slope being the diagonal of the normalized luminance function plot, we would find that his normalized luminance in HDR is 0.05/5000, which stays an equal normalized luminance because of the identity mapping for the coarse-mapped SDR luminances, i.e. after making them absolute those pixels should be displayed on the SDR display with (1/100000)*100, i.e. minimum black ("0" driving signal) on that display and invisible. Ergo, we must considerably boost such luminances, even in the more logarithmic uniformized HDR and SDR relative grey values or lumas representation, to obtain SDR luminances which are sufficiently visible and leading to object texture discriminatability within the person object (e.g. person pixel luminances spanning 0.3-1.2 nit displayed on the SDR display). Therefore, depending on how deep the person happened to fall on the HDR luminance range (which as taught above will depend on how the combination of such factors as HDR scene construction, scene lighting, camera exposure, and artistic master HDR grading was chosen by the content creator), the encoder (e.g. the human grader making a suitable F_L part being this first coarse luminance mapping choice to re-grade the master HDR input to optimal or suitable corresponding SDR pixel luminances) will select an appropriate Shadow Gain for processing said darkest pixels of this particular image (i.e. image-content optimized). Note that actually in ETSI the shadow gain SG is defined as a correction for an automatic scaling based on the ratio of the peak brightnesses of the input and output image, at least the luma representations thereof. It makes sense, under an equiluma philosophy, that one should boost luminances represented on a normalized luma range which corresponds to e.g. only 200 nit PB_C (or rather the value according to above equations 1 and 2:
Y'HP=Y'200=v(PB_C_H/200;RHO(200)), v being the above pseudo-logarithmic equation of Eq. 1), by starting from the normalized HDR luminances as: L_200=Y'200*L_HDR. However, this gives typically a too bright and low contrast image, so the grader can use an exposure gain correction: SG=expgain*Y'200, which will be a dimming factor moving the SG back towards the diagonal value 1.0 and bringing some darkness back into the SDR image (he will typically not select expgain=1/Y'200, because then the SDR normalized lumas will be equal to the HDR normalized lumas and be too dark again; SG will e.g. fall between 1.0 and 1.8).

This curve kind of implements a non-linear luminance compression "spring" for squeezing the lot of HDR luminances in a potentially much larger luminance Dynamic Range, into the much smaller SDR DR. Since not a fixed curve which "should never be too unreasonable on average" is used, but the encoder can apply an already optimized curve, the resulting SDR image will not be bad for many HDR scenes (not all HDR scenes are equally complex, e.g. sometimes there is just some weak shadowy area next to a uniformly sunlit area, and then although the most simple systems will create problems like clipping to white, a not too complex smart HDR-to-SDR mapping like the three-part curve of unit 404 will oftentimes already do a good job at creating a suitable SDR re-graded image of the HDR master image (e.g. the one coming out of the HDR camera of a real-life event capturing content creator).

However, several other scenes may be more complex, and some content creators may also have a higher level of professional desiderata when fine-tuning their artistic content (e.g. a Hollywood movie director or DOP).

Therefore the next unit, the customizable curve applicator 405, allows the content creator (again whether a human or a smart automaton with various rules encoded in its algorithm) to apply a customizable and potentially arbitrarily shaped fine grading luminance mapping function F_L_CU to the Y'CL pre-graded lumas, yielding graded LDR lumas Y'GL (the only requirements for the function is that it is non-decreasing, and typically even monotonically increasing, and typically at least as chosen in ETSI2 mapping 1.0 input to 1.0 output). In practice the shape of this function F_L_CU may be communicated to decoders either as a set of shape-defining parameters, e.g. coefficients of a polynomial, or as a LUT, etc.

Such a fine-grading may be needed because the visual system has a complex way of determining perceived image object grey value impressions, and/or because the squeezing of a large span of HDR luminances into the limited SDR DR can require quite some savvy sometimes, and/or because the content creator explicitly desires to put some additional artistic flavour into this customized curve F_L_CU (which shape will then typically be determined by another color user interface computer hardware and connected software at the encoding side, not shown). In fact, on the one hand one could say that all MDR images should be some compressed representation of all information (merely) in the master HDR image, but on the other hand (since that may give rather weak impression images, e.g. with too little contrast as if seen through a mist) the other important requirement for a content creation may be to make all images up to the SDR image look—given their more limited DR capability—as realistic as possible like the HDR scene or at least as beautiful as possible. Human vision is highly non-linear and smart, and may quickly perceive if one has used too simple a function. So the content creator may use the savvy of the customizable function F_L_CU in addition to the coarse luminance squeezing function F_C to do a better job at the near impossible of making a SDR image which still looks as good as possible for and preferably like an HDR scene (e.g. lowering the brightness of some luminance sub-range of pixels to make just a little bit more inter-object contrast, e.g. for the brightness of a stained-glass window versus the church interior, or an indoors-outdoors visual contrast in the SDR image, or optimize colorfulness versus luminance for some objects in the scene by selecting the via a special local shape of the F_L_CU curve, etc.).

We can enlighten the reader and provide him with the minimally needed understanding of the customizable luminance mapping function with the single simple example of a "Shadowman" image, shown in FIG. 6.

FIG. 6A shows geometrically what one can see in the image, and FIG. 6B shows the functional relationship between the L_HDR and L_SDR luminances. The image shows a dark space station (DRKSPST), through which a robot 602 is moving. At a certain image presentation time, it encounters the shadow man 601, which is colorimetrically defined as a set of very bright HDR pixels, with little luminance difference between the various pixels making up the shadow man's body. This occurs because he is standing behind a window in a strongly lit environment filled with an atmosphere of mist. The mist adds a component to the luminances originating from the shadow man's body (e.g. his clothes) giving final luminances towards the viewer in the HDR image of e.g. L_pants=20 nit+L_mist=4500 nit=4520 nit, L_shirt=50 nit+L_mist=4800 nit=4850 nit, etc. The problem when using a course luminance mapping function with too small a slope for the brightest pixels, is that the shadow man may become insufficiently contrasty and badly visible in lesser dynamic range images, such as the SDR image. A solution is to define the F_L_CU function, so that it locally has a larger slope in the input HDR luminance region 4500-5000 nit, leading to a larger SDR luminance subrange RS for the shadow man, making him and his details, e.g. the tie he is wearing more visible in the mist, even in the SDR image. It can be understood that there are many more situations where it can be advantageous to have somewhat more additional re-grading control than merely the coarse mapping function F_C.

Returning to FIG. 4, after having defined the appropriate (uniform visual representation) SDR lumas, the linearizer 406 converts them to (normalized) SDR lumas Ls. It therefore applies the inverse of above equation 1, but since SDR luminance are to be made this time with a RHO corresponding to the PB_C_S=100 nit (which is input into unit 406) rather than the 5000 nit which was used for the perceptual uniformization at the beginning of the luminance processing chain.

Colors are of course not 1-dimensional (unless one works only with achromatic grey value images), which makes dynamic range conversion and coding quite more complex, but in any case which needs a parallel processing track for the chrominances Cb and Cr of the pixels, to obtain more suitable corresponding SDR chrominances, or in fact as shown in FIG. 4 ultimately suitable SDR RGB colors, as output color components Rs, Gs, and Bs.

The chromatic processing track 450 of ETSI2 performs the following (shortly explained again to the extent needed only). The input pixel chrominances Cb and Cr are similarly multiplied by a value F_C[Y] by multiplier 452, yielding output chrominances Cb*, Cr*. The difficulty is to always obtain the appropriate output chrominances, knowing that there are many difficulties: an irregularly shaped color gamut of realizable colors (see explanation in FIG. 5), non-linearities of the math, and otherwise of the human visual system of the viewers, etc. Furthermore as will be shown below in the present application's embodiments, the market has ever more desiderata, leading to ever more complicated HDR handling systems.

ETSI2 uses a saturation processing determiner 451, which can load e.g. a LUT defining output values to be sent to the multiplier depending on which luma value Y the input pixel happened to have. Again the content creator can at liberty define/optimize the shape of this luma-dependent saturation multiplier defining function. At least that is, to the degree needed, because as we will see below sometimes inventive color math is needed for defining this F_C[Y] LUT.

Matrix application unit 453 simply converts from the Cb, Cr color specification to a corresponding normalized RGB representation (the math of this is uninteresting for the present application, and the interested reader can find it in ETSI2 juncto ETSI1).

One can define a real RGB triplet by multiplying the "un-HDR-luminanced" normalized R/Lh etc. values by the normalized Ls value calculated in the luminance processing track 401. Note that the resulting RN, GN and BN values are in fact still normalized luminances rather than absolute SDR luminances (Rs etc.), but they are "SDR-correct" normalized luminances, because they are now taking into account what luminance the SDR colors happened to get (Ls).

To get the reader quicker up to speed with that possible initially a little difficult concept for somebody who is not a colorimetry technology skilled person, we elucidate what happens in the normalized (universal, i.e. the SDR and HDR gamut nicely overlap when normalized as explained above, but of course we must shift HDR colors to become suitable SDR colors, even if the transformation was not a highly smart and optimized one to the needs of the present HDR scene image, but simply one equating the absolute SDR luminance to the input HDR absolute luminance) YCbCr color gamut in FIG. 5.

A pure luminance transformation will occur in the vertical direction, so one typically moves a HDR luminance or its corresponding luma Y (i.e. of ColHDR) upwards to an optimal new position (ColSDR), because for a HDR-to-SDR luminance mapping the F_L curve on the normalized axes plot will always fall above the diagonal (i.e. the input HDR normalized luminances or lumas with a certain x-coordinate, also have as y-coordinate the height of the diagonal at the position of the x-coordinate, and the normalized SDR output luminance of a function which always lies above that diagonal will hence always yield a higher normalized output value). Which actual (absolute) SDR luminance corresponds to this normalized luma value Y, is found by first EOTF-ing to a normalized luminance (which unit 406 performed, because the processing lumas Y'HP up to Y'GL were defined by applying the corresponding EOTF of Eq. 1), and those normalized luminances are simply multiplied by 100 by multiplier 455 (e.g. 0.7*100=70 nit). I.e. the reader now sees that with this framework anything needed can be defined from an input HDR image color, in particular its PQ-defined luma Y (e.g. as stored on a HDR blu-ray disk) all the way to the absolute SDR luminance of the corresponding pixel to be displayed on the SDR display, to show an optimal corresponding SDR image to the HDR input image (and the resulting decoding of the SDR image from the received HDR image).

Up to here the reader now understands the basic starting point of HDR encoding, at least according to applicant's ETSI-standardized coding philosophy. For most customers, a selection of either ETSI1 or ETSI2 (and then everything which technically happens) would suffice for their purposes i.e. the supply of their market with beautiful HDR images (of course they would still need to make those beautiful HDR images, inclusive determining a good shape for at least the F_C function and preferably also the F_L_CU function, or at least when not manually optimizing those functions according to their own specific artistic desiderata, purchase and use applicant's automaton which automatically generates a quite nice look for each HDR image type, and the ensuing codec function shapes). E.g., customers that would go for a full revamp to obtain future-proof high quality versatile HDR could deploy the ETSI2 system, and market players which value either their SDR images or the SDR customers more could deploy their HDR system as an ETSI1 system (this may also involve various discussions depending on where one is in the HDR video handling chain, e.g. a content creator versus a cable television communication system operator, and transcoding may be involved etc.).

There is however another need in the market or offer to the market for customers that don't like to deploy ETSI1 or ETSI2 exactly as standardized. It would make good sense that if one chooses to communicate HDR images as the sole images representing the entire spectrum of images needed for all various PB_D displays, that one communicates the (e.g. 5000 nit PB_C) master HDR images themselves, not just because those images are already available, but also the best quality representation of the images HDR scene (they are the content creators "gold" in fact, the images he has specifically created and signed off on, and often the starting point of the creative vision movie, if not already the only thing he actively created if the rest of the re-grading works automatically by the elected technology). However, especially the coming years, there is a market situation which may benefit from another additional approach. Sadly not all televisions (or in general video decoding or handling devices) in the market which are not dumb legacy SDR displays (i.e. incapable of doing all the math involved in HDR decoding, display adaptation, etc.) will always immediately be ETSI2—(or ETSI1)—capable televisions. There are a number of televisions in the market which apply a very different approach to HDR coding and displaying, like e.g. according to the recently standardized Hybrid Loggamma approach. Or maybe some tv's can only decode PQ luma encoded HDR images only, but nothing else. Perhaps some televisions may only use that approach, so probable the best thing they can do is not process an incoming ETSI2 HDR video at all. Similarly, there may be some televisions in the market which don't follow any standard philosophy, at least not regarding the display adaptation, i.e. the re-grading of the e.g. 2000 nit image as received to a e.g. 900 nit image for a 900 nit PB_D display. Such a television would need the decoding capability to make sense of what pixel colors and in particular luminances the image as received contains, but they could use their own (tone mapping) heuristics on how to make the 900 nit image. A disadvantage, at least from the point of view of a content creator who would like that every consumer can see his movie as nicely as he originally created it, is that such a variability will create a high degree of uncertainty on what any particular brand television will make of any received HDR image. E.g., a simple display reinterpretation of the HDR images which was performed in the recent past is the absolute rendering of the HDR image luminances. This means that all HDR image luminances up to 900 nit are displayed with exactly the luminance as coded in the image, but all higher luminances as clipped to the display's whitest possible white (i.e. PB_D). With an example image like the space station of FIG. 7, that could mean that some parts of the earth are clipped away to a ugly white patch (there where the sun overshines the earth on its right). Whereas this TV will still be a beautiful HDR TV to some extent, because it will show the nicely bright blues of most of the earth seen through the top viewing portal of the space station nicely contrasting with the dark interior, at least one part of the image will look ugly (and some other scenes may show much more severe errors at least on some TVs, like e.g. clipping away every image detail outside the cave of FIG. 1, or a souk, etc.). Performing another simplistic tone mapping reinterpretation like e.g. a linear compression of the luminances like a white-on-white strategy can create several other problems. So although such a system could work and produce some kind of HDR image for the end viewer (e.g. in our ETSI2 system such a TV could only use the PQ function of 401, but ignore all other luminance mapping function metadata and the consequential sequential luminance mappings 402, 403, etc. which in ESTI2 perform the functionality of display adaptation), but the results will be neither of best visual quality nor—which is probably worse—predictable.

This led to a new coding topology based on a second kind of HDR image in addition to the master HDR image, the so-called intermediate dynamic range (IDR) image, which was first introduced in WO2016020189. The advantage is then that one can define such secondary HDR image (the IDR coded image, which will be communicated to receivers instead of the master HDR image in the classical ETSI2 codec philosophy) with a PB_C which lies in the range of many televisions in the field (e.g. 1000 nit, or 750 nit; although one could also chose to use 500 nit with the same technique, or maybe even 400 nit PB_IDR). But one can still make whatever PB MHDR master HDR as artistically or practically technical-limitation-wise (e.g. the available grading monitor) is desired. The idea is that whatever display reinterpretation (including tone mapping) technique any television uses, it should be smooth, in that sense that the processing should not deviate too much from the received image if PB_D is close to PB_IDR, the peak brightness of the IDR image as received. E.g., even a television which is so dumb that it merely clips all pixel luminances above PB_D, should then not clip too much (e.g. not the entire earth or sunny outside of the cave image). And the content creator gains back some control, because even if on the one hand he desires to make beautiful ultrabright image regions, e.g. around an average of 4000 nit in a master of 5000 nit PB_C_H, he can control the way he re-grades those regions in the IDR image, so that they fall e.g. sufficiently below 1000 nit so that even an 800 nit dumb television should only clip the brightest and visually least destructive pixels, e.g. only the rays of the sun in the space station example of FIG. 7. So some new technology is needed to cater for that new approach.

FIG. 7 shows how the codec philosophy of WO2016020189 catered for the channel adaptation approach (the channel-communicated image being the IDR image, whereby one could say that a particular communication channel is configured for sending e.g. 1000 nit PB_CH images). The example is again chosen to be interesting for the elucidation of some main concepts. One thing one should understand is that, although it may be useful if all different PB_C images along the range are exactly or at least very close to what the content creator would make if he graded each one of them separately and unconstrained in any technical system, but this need not necessarily always be so, in particular for the IDR image. There may be some relaxation involved (on the other hand there can also be some debate as to when and why some particular image grading of HDR scene category X versus Y is optimal, and for which deviation there seems to be a sufficient deviation; e.g. one can imagine that the luminance of pixels of the street light lamp are less critical than those of a face, especially if it is supposed to be seen as half-hiding in the dark, also already because in real life any street lamp might well be a little brighter or less bright anyway).

WO2016020189 provided for a means to define functions (different functions) from the IDR image as some middle point, i.e. upwards towards the master HDR to be reconstructed from the IDR image as received by receivers, and downwards to do display adaptation for any MDR display of PB_D<PB_IDR. With such a technology, the master HDR range could well be chosen to be always fixed as the 10000 nit PB_C range, which is the range tied to the PQ function.

We see that there may again be different considerations involved on how to transform various possible luminances, and these might advantageously be quite different on the left of the chosen IDR image than on the right. Because in fact conceptually we may be doing something different. On the left we are making a secondary ("smaller") HDR image from the master HDR image. So one consideration may be, that this IDR image must be "just as good" (despite of the lower PB_IDR) as the master HDR image (and how to solve that seeming contradiction elegantly then?). On the right we are compressing towards an ever smaller PB_MDR (which can be considerable for some high complexity, meaning inter alia many critical objects spread all over the luminance range, and high PB_C_H images), i.e. we seem to have a different task of display adapted image generation. So one can imagine this could lead to (quite) different technical handling, in particular in our image+luminance mapping vision differently shaped/designed luminance mapping functions.

In this example the dark space station luminances are displayable on every reasonable television (at least in principle) since they are darker than 60 nit. But the brighter pixels must first be quite gently compressed to the IDR image, and then the less compression was done in the first part, the more must be done towards the SDR image. And there might be different criteria again for the exemplary two bright objects, the bright blue earth, versus the much brighter but almost colorless sun and its rays. As the luminance sub-ranges on respectively the master HDR image luminance range (BE) and the IDR luminance range (Be2) for the bright earth object indicate, ideally this content creator may desire the maximum brightness for the earth to never go above e.g. 750 nit, whatever the PB_C capability of any image or display (because otherwise the earth may start to glow too much and look unrealistic). However, what the sun luminances must then do becomes a function of several factors, not just artistic desiderata, but also the amount of luminances left for coding the sun object above 750 nit in the elected (800 nit PB_IDR) IDR image (of course in some situations the content communicator may choose another higher PB_IDR value, but we have assumed here that whatever apparatus is connected to the receiving end of the communication channel always expects a PB_IDR of 800 nit for any video content, whether a Hollywood movie or a news program). The finally selected F_H2$h$ luminance mapping function for creating the IDR image luminances from the master HDR image luminances for all those brightest pixels as a subset is shown with the two arrows: a solution was chosen to define a total compressive action for the two objects together, which also reduces the lowest bright earth object luminances somewhat. This is an example of a situation where the ideal re-grading desideratum of the content creator is not 100% perfectly met (because maybe that corresponds to some other technical difficulties), yet the IDR image is sufficiently close for most people. It really doesn't matter that much if the earth pixels are only a little darker in the IDR image, and may be one kind of would expect it even for a lesser quality HDR image. But the important point is that this IDR image can still fulfil all requirements of the original ETSI2 philosophy (whilst with this additional codec step also fulfilling the requirement that dumb near 800 nit PB_D displays can't deteriorate the received IDR image too much before displaying it): all the MDR images up to the SDR master image as desired by the content creator can still be generated by receivers by employing the right side luminance transformation functions, and (even with the darkened bright earth object pixels) the master HDR 2000 nit PB_C or 10,000 nit PB_C image can still be reconstructed by inverting the F_H2$h$ function (which by itself could also be optimized for each image, or consecutive set of images encoding a particular shot of a movie, according to its technical and/or artistic needs).

Two documents merit discussion, regarding their irrelevance (because different technical aspects should not be confused) rather than their importance (but because of potential confusion they merit being discussed): US20160307602 and EP2689392 (a.k.a. WO2012127401), which both concern so-called "display optimization" rather than a video image coding framework design. This major difference, to skilled persons, is elucidated with FIG. 23, which shows a typical example total chain of video handling. At a content creation side 2301, we assume there is a live (or previously recorded) capturing of a HDR scene by means of camera 2302. A human grader (or shader) determines e.g. inter alia the master grading of the capturing (i.e. the relative position of the various image object pixel luminances on the luminance dynamic range of the master HDR image —which ends at a maximum representable value of e.g. PB_C_H50=5000 nit; and begins at some small black value, e.g. MB_C_H50=0.001 nit, which for our present discussion may be assumed to be equated with zero: e.g. for the space station he changes by image processing the original camera capturing so that the sun pixels become 4500 nit, the bright blue of the earth becomes e.g. 200 nit, etc.). Secondly, the grader in our approach typically wants to indicate with at least one luminance mapping function (in practice such a luminance mapping function can be differently shaped for consecutive images of the HDR video, and we even explained in our ETSI standards how it may be technically quite convenient to define several functions even for one single time instant video image, but those further complexities are not needed for elucidating the present innovative contribution to the field), which will typically be a function specifying how the 5000 nit PB_C_H50 normalized master HDR luminances must be re-graded to 100 nit LDR normalized luminances: FL_50$t$1.

A third important aspect is then the encoding technique for the encoding of the master HDR image to be communicated out to one or more receivers (via at least one encoding technique). In the beginning of HDR video research, and correspondingly in the simpler versions standardized by applicant, this would be a relatively simple encoding, such as e.g. the LDR 100 nit image, which is then nicely backwards compatible, so that it can be shown directly with good visual appearance on old LDR TVs, which have no HDR savvy or processing capability. The WO2016020189 coding approach and the present teachings are example of a more advanced second generation approach, which is more complex but can cater for additional desiderata in some specific HDR video communication or handling technical ecosystems. The grading performed by e.g. human grader 2304 (in case this is not automated such as often in real-life broadcast programming) is done on a grading apparatus 2303 (which typically would contain several tools to change pixel luminances, yet for the present elucidation can be assumed to consist of the elements of providing a user interface to specify the FL_50$t$1 shape, and communicating out such a function shape (e.g. as metadata comprising a few parameters defining the shape of the function)).

Although the video encoder 2305 (which will perform, assuming non-limitedly that its input master HDR image is a set of luminances for all pixels, all the techniques of producing an actual encoding of the master HDR image, i.e. e.g. and 8 bit, 10 bit or 12 bit pixellized matrix of typically YCbCr pixel color triplets together with metadata describing all further information like luminance mapping functions given whichever coding technique was elected) may in principle be included in the grading apparatus 2303, we have shown it typically as a connectable further apparatus. This represents a simplification for the reader sufficient for elucidating the present invention, where it summarized various practical variants of e.g. the capturing (and may be grading) happening in an outside broadcasting truck, and the encoding perhaps happening in some intermediate communication relay station, e.g. after local commercials have been inserted in the signal, etc. (in that respect harmonization of the various image content may also be involved, but that is a detail which need not be elaborated). What is important to understand, is what happens at the creation side (see e.g. the difference between contribution and distribution), which we may define as formally ending when the finally encoded video signal is communicated to some consumer, e.g. by means of satellite antenna 2306, and communication satellite 2340 (or any equivalent video communication channel, e.g. via the internet, etc.).

At the receiving side, we are typically faced with consumer apparatuses at a final consumer home, such as e.g. a satellite tv settopbox, or any equivalent decoding and final processing apparatus 2352, connected on the input side to a local satellite dish 2351, and on the output side to a HDR display 2353, which may have various display capabilities, e.g. a PB_D of 1000 nit, or 700 nit, or 2500 nit. Whereas it might be that it suffices for the settopbox to perform only a decoding again to the luminance values which need to be displayed, by decoder 2381 which do then do the inverse operations of the encoder, this will typically only be useful in a limited amount of situations. Usually there will be a display optimization process, by display optimizer 2382, which changes the absolute respectively normalized luminance distribution again (either of the e.g. LDR image as received, or the decoded master HDR e.g. 5000 nit image), because the master image may have been encoded for e.g. 5000 nit PB_C_H50, i.e. potentially containing 2000 nit luminance pixels, yet a particular consumer's HDR display may e.g. only display up to 700 nit (its whitest displayable white).

So there are on the one hand major technical differences between the appliances (and their technological design philosophy etc.) on either side, e.g. that the creation/encoding/transmitting side will only have a video encoder 2370, to encode the master HDR video (MsterHDR) as some channel-encoded intermediate dynamic range image IDR, whereas the receiving side may also display optimize the reconstructed 5000 nit HDR image (RecHDR) into a display optimized e.g. 700 nit PB_C image ImDA, optimally suited for a connected 700 nit PB_D display. The technical difference between the two can be seen in that one may do the display optimization as an (optional) post-processing, whereas the coding/decoding is only an image reconstruction technology, not needing any teaching about display optimization typically. The two side's apparatuses (and operation procedures etc.) are typically also handled by quite different skilled experts. The content creation apparatuses may be designed by professional video equipment producers, and operated by broadcasting engineers etc. Settopboxes and televisions are typically made by consumer electronics appliance makers, e.g. of Asian origin.

US20160307602 is a first display optimization patent of applicant. Summarized, the idea in this is that the content creator can give guiding re-grading behavior rules and algorithms for the various (at least two) regimes that can exist in an image (a regime being a concept which is both a set of pixels in an image, and a needed re-grading behaviour for those pixels when having available various displays of various dynamic range). Although this first enabled a connection between the desiderata of content creators, and the actual displaying at a final consumption site, it is actually at this end site that the controlled behavior of display adaptation has to happen. And ideally a maker of a settopbox, or a television in case at least the display adaptation happens in that television, will largely follow what the content creator specified as good behavior for the various regime objects in the video images (e.g. somebody fading in from a dark region neither becoming too visible nor too invisible on any display capability, even the 100 nit PB_D LDR displays), because it is what this content needs, rather than blindly do anything himself But this is clearly FINAL behavior to happen at the consumption side, and is totally orthogonal to how a video communication technology provider wants to develop, respectively any implementer wants to deploy, any particular video codec philosophy. One should also not confuse any ad hoc tone mapping technology, already for the fact that such a mapping will typically not be invertible, a property which a coding via a lower dynamic range IDR image should have.

WO2012127401 is also an early HDR age technology for specifying display optimization behavior, which can be done by means of various embodiments of a DATGRAD structure, which specifies how various image content should be re-graded for different luminance dynamic range capabilities. This DATGRAD structure will be used to generate whichever needed medium dynamic range image (MDR) for a MDR display PB_D between the master HDR codeable peak brightness PB_C (i.e. PB_C_H50 in the present notation) and the 100 nit LDR PB_C of the lowest needed re-grading specification (p. 16). The derivation of the MDR image is optimally done by not only using the re-grading needs of the image as encoded in the DATGRAD data structure, but also the specific display side viewing aspects such as e.g. viewing environment brightness, or final viewer preference settings (see p. 5).

It should be clear that ab initio when not having further quite specific insights, such teachings bring nothing to the skilled person regarding codec redesign.

Apart from differences in generating particular functions compared to what is already findable in prior art, but more importantly the innovative codec structure/framework itself, we should also mention that the actual communication of a second PB_C value (the highest one, of the master content, in addition to the lower one of the actually communicated IDR image) is also different from an (optional) type characterizer which may be used in WO2016020189. Besides the fact that the two are not literally the same, an enumerator may have a different role, and particularly if one looks at the details of that framework compared to the present teachings. Such a characterizer of '189 may be useful in case there are e.g. two upwards re-grading luminance mapping functions. It may then be useful for selection which one to obtain anything like a close reconstruction of the master HDR image of the creation side. But such an information is neither strictly necessary, nor to be applied necessarily in the prior art. One may use the upgrading function which came from a master HDR image to obtain instead of a 5000 nit reconstructed image, a 4000 or 6000 nit reconstructed image. There being two sides of the intermediate image, the down-grading function is usually the one with the critical image content (especially the content which must be displayed sufficiently bright and faithful on all PB_D displays), but the upgrading function will be specifically different in such a manner that it specifies the re-grading behavior for the very brightest objects (like car headlights, sun reflections, etc.). Those are the typical HDR impact objects/ effects, that however also are not reproducible correctly anyway since it is in the upper region of the luminance range that the various capability displays vary most. Ergo, making a 4000 nit PB_C reconstructed image from a e.g. 600 nit IDR image may have some car headlights that are slightly too dark compared to their ideal luminance value (even if such a value could be represented on the 4000 nit luminance range), but it will still be a quite nice looking HDR image if one just applies the e.g. multi-linear normalized regrading function on the [0-1]/[0-1] axis system where the horizontal axis represents the IDR image's PB_C-normalized luminances and the vertical axis corresponds to the whatever elected to be calculated reconstructed HDR image PB_C which is not too unreasonably far away from the (possibly not known but only assumed) master HDR PB_C. In our present technology we actively communicate out in metadata a PB_C_H50 luminance value per se, because it is also used in the algorithm of the decoder.

The inventors of the present patent application wanted to constrain the generic IDR approach in a number of ways specifically around the today already deployed ETSI2 coding philosophy and systems (ICs, televisions, Settopboxes).

SUMMARY OF THE INVENTION

A number of technical considerations were made by the inventors. On the one hand, they would like their system to be compatible with already deployed ETSI2 decoders. Ergo, if e.g. a 1500 nit IDR image was communicated (the ETSI2 decoder not knowing anything about IDR construction principles, ergo assuming this was just an original HDR master image of the HDR scene), then a F_L_IDR luminance mapping function (and all other color mapping information according to ETSI2) should be co-communicated which is the F_I2s function of FIG. 7, which does the correct display adaptation. Ergo, whether an IDR additional technology has been used or not, the ETSI2 a.k.a. SLHDR2 decoder should be able to normally create all the MDR images up to the SDR image, and they should (ideally) look as the content creator desired. Ideally, any new decoder according to the present principles, which we will call an SLHDR2PLUS decoder, should also exactly or at least approximately yield the same looks for all images between IDR and SDR (i.e. at least one of the IDR and SDR image should preferably not deviate too much from the MDR image that would result as how the color grader or in general content creator would have liked or at least accepted to see it). On the other hand, a very important criterion is that the master HDR can be nearly perfectly reconstructed (but for maybe a few minor rounding errors which creep in, e.g. when DCT-ing the IDR image in the MPEG compression phase for transmission, which will result in very minor unobjectionable reconstruction errors of the master HDR at the receiving side). Of course there might be some systems with some relaxation on the quality of the reconstruction of the master HDR (some content providers may see the IDR image as more important, at least in case some temporary aspect is involved, like in broadcast or even single cast to a limited audience rather than e.g. for storage, on e.g. blu-ray disks), but in general at least one major party involved in the video handling chain will find perfect reconstructability of the master HDR image important (which distinguishes from blind attempts at creating some higher dynamic range look starting from IDR).

Lastly, although we see that to serve without a need for re-design and redeployment of ETSI2 decoders one must co-communicate the F_I2s function (i.e. one preferably re-uses the (de)coding circuitry of the SLHDR2 system as much as possible, but at least the video signals inclusive their luminance and color mapping functions should still conform to the standardized definition, so that inter alia legacy SLHDR2 systems know what they get, apart from some metadata they don't need and can ignore), the content grader may typically want to specify his luminance (and color) mapping functions between the master HDR he has created, and some corresponding SDR (i.e. 100 nit PB_C) version thereof (which he may e.g. have created with a system as shown in FIG. 4). So that F_Mt1 function (see FIG. 10) is neither the F_H2h nor the F_I2s function of FIG. 7, but rather a function that spans the totality of the re-grading effort between master HDR and master SDR (i.e. this F_Mt1 defines the re-grading needs of a HDR scene image between the most different dynamic range representations of said HDR scene). So a technique is needed to elegantly relate these two situations, in particular in or around the ETSI2 framework philosophy (e.g. the SLHDR2PLUS method of decoding yields the same MDR image looks as a ETSI2 receiver display adapting with the received IDR images and the D_I2s functions; for each moment in time one or more functions partially doing the re-grading between the input dynamic range image of that time instant and the desired output dynamic range image for that time instant).

As will be seen below that can be done in several ways according to different insights of the various inventors, depending on which kind of system exactly one desires, and which desirable constraint condition one relaxes more and which one relaxes less (also taking into account such specific practical technical factors like e.g. how many cycles or transistors would be needed for various choices, which may make some choices more desirable than others, but we needn't dive into those details for this patent application).

Yet there are some basic underlying principles which all approaches use. At least two ways of solving can be summarized with FIG. 8. Receivers receive the IDR image (which should be somehow reconstructable into the Mster HDR image, in this example of PB_C=4000 nit), and they also have the function F_I2s. But they must for each IDR luminance somehow find the function F_?? to calculate the needed corresponding normalized, and therefore absolute, master HDR luminance (which will exactly reconstruct that master HDR as it originally was, yet which image(s) was never communicated). One can either construct a novel SLHDR2PLUS decoder color transformation system which can determine the needed function (yet which at least according to its processing IC or software core is still as shown in FIG. 4, with the luminance processing track with its specifics (at least some of the sub-units being employed), and the chromatic processing track), or, one could also try to put all the smartness into the encoder, so that one can use a standard ETSI2 encoding color transformation approach as is (except for its novelty being its new programming to reconstruct the 4000 nit original HDR, by receiving the metadata of this second, desired peak brightness PB_C_H50, which typically involves the loading of the appropriate total or partial luminance and chrominance processing LUTs), be it set to extrapolate rather than to display-adapt images for lesser PB_D than the PB_IDR value. Both approaches and their embodiments will need some generic new technical components and fall under the generic SLHDR2PLUS new encoding philosophy though.

From the basic construction of the SLHDR2PLUS encoder 900 species of the generic IDR encoder as shown in FIG. 9 (which will be explained in more detail below), one sees the difference with normal HDR coding, in particular ETSI2 HDR video coding: there are now two peak brightnesses co-encoded in the metadata, namely firstly the "normal" peak brightness (which shall be called channel peak brightness PB_CH, i.e. the peak brightness of the IDR image as received, whatever technology was used for it, i.e. whatever peak brightness level looked optimal to the content creator, owner, or transcoder, and whatever mathematical technical method was used to calculate the IDR pixel luminances) indicating what the maximum codeable luminance of the video communicated and later received is, i.e. of the IDR image(s) [this is what a normal ETSI2 decoder would see, ignoring all the other novel approaches]. But secondly there is now also the peak brightness of the original master HDR image(s), namely the content peak brightness PB_C_H50 (e.g. 5000 nit). The second one PB_C_H50 may have been specified in some embodiments many months before the IDR image creation, when the master HDR images were created (e.g. based on camera capturing of actions, in the computer, etc.), and the PB_CH may be set as an external input into the encoder 900, by many different possible means at the time of channel encoding (e.g. a cable operator may have a fixed value set in memory, which may be upgraded on a yearly basis to reflect the current average state of his customer's HDR displays, or an optimized PB_CH may be calculated taking also some luminance or other image specifics into account of at least one image of the video, or its associated metadata, even potentially metadata specifically included for guiding later IDR re-coding, etc.). Having a (single) peak brightness co-communicated is useful for HDR encoding, at least for the system of ETSI2 (which only had what at the time was seen as they only thing needed, namely "the" peak brightness of the images as received), but in view of the full transparent usability for legacy ETSI2 decoders that would as said need to be PB_CH (otherwise they can't do their normal display adaptation calculations). PB_C_H50 on the other hand is necessary to be able at all to calculate the F_?? function of FIG. 8, and with this function ultimately the desired master HDR reconstructed image from the received IDR image.

So that immediately shows the difference between a legacy ETSI2 video coding data stream, and legacy ETSI2 decoders will not know this extra metadata and simply ignore it, because ETSI2 decoders need not determine any images with PB_C higher than the PB_C_H they receive in the metadata indicating the brightest possible luminance in the image they received (because according to a pure ETSI2 philosophy, the image as received is always the best quality image, in fact it was the highest quality master HDR image that was created by the content creator). But as shown in FIG. 11 a generic SLHDR2PLUS decoder will not only receive and read the PB_C_H50 value, but also use it to reconstruct the REC_M_HDR image, which is a near perfect reconstruction of the master HDR image created by the content creator (in fact, such a decoder will use the PB_C_H50 value to calculate the needed F_?? function(s) from the received F_I2sCI function(s)). This decoder may advantageously also output lower PB_C images like a e.g. 400 nit PB_C MDR_300 image, but one could choose to use a standard ETSI2 calculation core for such images of lower PB_C than PB_CH, or one could do the calculation in an embodiment of the new SLHDR2PLUS calculation core (but for accurate reconstruction of images with higher PB than PB_CH the new insights are definitely needed, as that cannot be trivially done with the ETSI2 technology).

So the tasks set to be solved by the new technology are realized by a high dynamic range video encoder (900), arranged to receive via an image input (920) an input high dynamic range image (MsterHDR) which has a first maximum pixel luminance (PB_C_H50) for which the encoder has a first metadata input (922), and arranged to receive via a second metadata input (921) a master luma mapping function (FL_50t1), which luma mapping function defines the relationship between normalized lumas of the input high dynamic range image and normalized lumas of a corresponding low dynamic range image (Im_LDR) having an LDR maximum pixel luminance preferably being equal to 100 nit, characterized in that the encoder further comprises a third metadata input (923) to receive a second maximum pixel luminance (PB_CH), and the encoder further being characterized in that it comprises:

a HDR function generation unit (901) arranged to apply a standardized algorithm to transform the master luma mapping function (FL_50t1) into an adapted luma mapping function (F_H2hCI), which relates normalized lumas of the input high dynamic range image to normalized luminances of an intermediate dynamic range image (IDR) which is characterized by having a maximum possible luminance being equal to the second maximum pixel luminance (PB_CH);

an IDR image calculation unit (902) arranged to apply the adapted luma mapping function (F_H2hCI) to lumas of pixels of the input high dynamic range image (MsterHDR) to obtain lumas of pixels of the intermediate dynamic range image (IDR) which is output of this unit; and an IDR mapping function generator (903) arranged to derive on the basis of the master luma mapping function (FL_50t1) and the adapted luma mapping function (F_H2hCI) a channel luma mapping function (F_I2sCI), which defines as output the respective normalized lumas of the low dynamic range image (Im_LDR) when given as input the respective normalized lumas of the intermediate dynamic range image (IDR), which in turn correspond to respective lumas of the input high dynamic range image (MsterHDR); the encoder being further characterized to have:

an image output (930) to output the intermediate dynamic range image (IDR);

a first metadata output (932) to output the second maximum pixel luminance (PB_CH);

a second metadata output (931) to output the channel luma mapping function (F_I2sCI); and a third metadata output (933) to output the first maximum pixel luminance (PB_C_H50).

Firstly note that although we conceptually show a separate input for each needed data item of the present encoder, in practice the skilled reader realizes that one or more of these inputs (and similarly for outputs) may be the same, depending on what a video input technology can handle (e.g. some earlier HDMI image inputs cannot handle the dynamically varying—i.e. being potentially different for each temporally successive video image—master luma mapping functions (FL_50t1), in which case that data may be communicated in a synchronizable manner over e.g. a Wi-Fi connection etc.). How the various input data are inputted may also depend on where they are generated, i.e. in or to which other system the encoder is connected (which may depend on whether real-time encoding is desired at the same time of camera capturing of an event, or a later encoding for some video communication system like e.g. a cable distribution system which at any later time receives all data from an original content creator, to optimally distribute it given the limitations or desiderata of this particular cable system, etc.).

One may without intended limitations assume that the MsterHDR image has just before been graded by a human color grader using color grading software on a computer, and that he has defined the FL_50t1 functions which define a corresponding lower dynamic range image, typically a 100 nit SDR image (although currently the lowest end of the re-graded images spectrum is by standard agreement a 100 nit PB_C image, so seemingly unlikely to change, such lowest image of the trio, i.e. the LDR image, may have an LDR max. luminance in future embodiments which is not exactly 100 nit, but may be a number k of times 100 nit, e.g. preferably k being up to 3×, i.e. the LDR maximum luminance in that embodiment realization of the present system being 300 nit), corresponding to the MsterHDR image (which SDR image preferably looks as similar as possible to the MsterHDR image taking into account the considerably lower luminance dynamic range), which typically at least reasonably conveys the desired looks for visually optimally telling the e.g. movie story as needed (also different video applications may have different desiderata such as different color criteria, possibly involving different technical limitations on the FL_50t1 functions).

The PB_CH value is somewhat different from the other metadata, in that it is in fact a setting for the intermediate dynamic range coding. So it may or may not come from a grader. It may e.g. be a fixed value for a particular video coding system (say e.g. a satellite broadcast system), which may be e.g. fetched from a fixed memory attached to or in the encoder. In internet-based delivery it can be that this PB_CH value is communicated as a desideratum by a final customer for which the IDR images are generated. E.g. a customer with a bad quality mobile display may request merely a 500 nit PB_IDR image to be calculated by a server on the other side of the internet, e.g. the server of a video on demand company, whereas some other customer may demand a 1000 nit PB_IDR version, and in such a case that requested PB_CH=PB_IDR value will be inputted in the encoder.

So whereas at the encoding side there was a highest quality (in fact highest PB_C) MsterHDR image, this is not the image that receivers (complementary decoders) will receive, but rather the IDR image (and they will need to closely reconstruct the MsterHDR image by calculating a REC_M_HDR image). The technologies are best realized by formulating everything as normalized in 0.0-1.0 lumas. In fact, where we talk about a luma mapping function, this is in fact equivalently also a luminance mapping function (because of the relationship between lumas and their corresponding luminances, e.g. typically luminances to be displayed), but technically strictly speaking our calculations preferably work with luma mapping functions, and preferably in a psychovisually uniformized luma definition, as calculable by the Philips v-function (see Eqs. 1 juncto 2).

As explained above, our approach to handling HDR videos, in particular not just coding a single, or two, differently re-graded images of different dynamic range in particular peak brightness, but an entire spectrum of corresponding different DR re-gradings, is about relating the various possible normalized lumas that pixels of such at least two relatable images can have, e.g. 0.2 in image_1 corresponding to 0.4 in image_2, etc. This is what the luma mapping functions define, between one situation i.e. one species re-grading, and any other selected different situation.

With standardized algorithm we mean that there must be some fixed manner to relate a first set of possible functions (which can have many different shapes and definitions) to a second set of corresponding functions. I.e. this just means that in some communication technology (or even all of them), the designer of the encoder and the decoder have defined a method which uniquely specifies how to transform the shape (typically on axes which are normalized to 1.0) of any input function into the shape of the output function. There can be various such algorithms, ergo in principle the codec designer could decide he may want to communicate the order number of any such algorithm—e.g. agreed algorithm number 3- to the decoder, etc., but normally there is no need for such complexity, as our method will work perfectly and most simple by just pre-agreeing one fixied standardized function transformation algorithm, e.g. the one in the supporting math here below.

For the quick understanding of the reader the following would be a simple example of such an algorithm. Suppose the input functions are power functions: power(x_in; P), then the algorithm could derive corresponding functions power(x_in; P−1). By inversion, the original functions could also be re-derived again when receiving the corresponding functions (by the +1 algorithm).

It should not be misunderstood that the standardized algorithm itself is typically not communicated to receivers, only the resulting output corresponding functions are. This is why it is standardized, or pre-agreed, i.e. must be fixed so that the decoder can know what has happened at the encoding side. The way this was agreed is not so relevant to understanding the technology as patented. E.g. there can be 5 different fixed algorithms, and a cable operator can decide to encode with algorithm 3, and supplying to his customers settopboxes correspondingly set to decoding fixed algorithm 3 (even if the STB could be re-set at some occasions for some other video communications to e.g. algorithm 4; but algorithm changes will in general not be necessary, though changes in PB_CH for different cable channels e.g. may be interesting).

One should also note carefully the fact that typically not the corresponding adapted luma mapping function F_H2hCI is communicated to the receivers, but yet another then further derivable channel luma mapping function (F_I2sCI) is communicated, and the decoder also needs to somehow reverse this double derivation. In fact the total re-grading mapping is split into two parts, so if the first part is standardized, the second part is also defined, so the inversion of this IDR encoding by decoders might be (though difficult) seen as probably possible (making a construction and correct functioning of the new SLHDR2PLUS codec possible).

We have elucidated this concept of standardized codeable-peak-brightness-dependent function changing algorithm a little further with FIG. 24. So on the left we see that there can be various occurrences of the FL_50t1 function designed by the grader or content creation's side re-grading function determination automaton. E.g. FL_50t1_1 may have been determined for a HDR scene in which there are quite deep blacks with important action happening, which must be brightened considerably to be still sufficiently visible on lower dynamic range displays, yet the brightest parts are not so critical—like e.g. street light lamps—and can be represented with a single almost maximum white luminance on any display (or the image calculated therefore, i.e. containing exactly those absolute luminances as they are to be rendered on that display, or more precisely, usually the luma codes encoding those luminances). In contradistinction, FL_50t1_2 was created for an image or shot of successive images which contains another type of HDR scene, in which there is both an important lower brightness object (or more precisely regime) and a higher brightness one, which have resulted in specifically tuned re-grading curve shapes on either side of "the middle". FL_50t1_3 is yet another possible input function into the standardized algorithm applied by the HDR function generation unit 901, which may e.g. occur for a daytime scene with very bright content (and a master of not too high PB_C) and some local darker regions, like e.g, the income of a temple in a outdoors scene of India.

For any of those three situations, and all the million others, the unit 901 will determine an output function. The property of this algorithm is that this function will be similarly shaped, but closer to the diagonal (because if the original function represents a re-grading between e.g. an X nit PB_C image an an corresponding—reasonably similarly looking as far as capabilities allow—Y nit PB_C2 image, let's say a 100 nit image, then re-grading from X to a Z nit PB_C image with Z e.g. halfway between X and Y will involve a similar re-grading, but to a lesser extent; if one were to map from X to X one would have an identity transform, corresponding to the diagonal).

There are a number of manners in which one can define such a standardized algorithm to uniquely obtain the output F_H2hCI_1, F_H2hCI_2 and F_H2hCI_3 luminance mapping functions corresponding to the respective input functions, and the details of this do not really form an essential element of this invention, besides the fact that one must have some standardized algorithm available which behaves as such. E.g., one may typically define some metric (quantifying the PB_C_CH-dependency on the elected PB_C_CH IDR image codeable maximum luminance), which can be used to shift the points y(x) of the input function for any normalized input luminance towards the diagonal in some manner (e.g. largely equi-paced, or non-uniformly, etc.). Although one can also shift vertically, a quite well-working preferable embodiment as detailed below shifts such function points on trajectories orthogonal to the diagonal from [0,0] to [1,1].

An advantageous embodiment of the high dynamic range video encoder (900) is characterized in that the standardized algorithm of the HDR function generation unit (901) applies a compression towards the diagonal of the master luma mapping function (FL_50t1) to obtain the adapted luma mapping function (F_H2hCI), which compression involves scaling all output luma values of the function with a scale factor which depends on the first maximum pixel luminance (PB_C_H50) and the second maximum pixel luminance (PB_CH).

There may be variously defined F_L50t1 functions (the para definition below being one example) and they may be scaled in various manners by the standardized algorithm, but typically there will be scaling involved, and this scaling depends on the starting PB_C_H50, and the target value PB_CH=PB_IDR. This can be done by different metrics, but applicant has found over the years that it is handy to define the scale factor based on psychovisually uniform values and ratios of the peak brightnesses by sending them through the v-function, i.e. defining a scale factor based on v-function luma outputs corresponding to the two peak brightnesses (and possibly the third PB_C of the SDR image). An advantageous embodiment of the high dynamic range video encoder (900) comprises a limiter (1804) arranged to re-determine a slope of the channel luma mapping function (F_I2sCI) for a sub-range of the normalized lumas comprising the brightest normalized luma equal to 1.0. This is not needed for many embodiments, but in particular a useful manner to handle a particular choice of the coding HG_COD of the highlight gains of paras which was standardized in ETSI2, so to be fully compliant with all of that this particular embodiment is useful.

A corresponding mirror technology to the encoder, in fact undoing all encoding processing by being able to re-derive all needed information (even if such information was not actually communicated) is a high dynamic range video decoder (1100) having an image input (1110) to receive an intermediate dynamic range image (IDR), which has a second maximum pixel luminance (PB_CH) which is lower by a multiplicative factor preferably being 0.8 or less than a first maximum pixel luminance (PB_C_H50) of a master high dynamic range image (MsterHDR), which second maximum pixel luminance (PB_CH) is received via a second metadata input (1112), the decoder having a first metadata input (1111) to receive a luma mapping function (F_I2sCI) which defines the transformation of all possible normalized lumas of the intermediate dynamic range image (IDR) to corresponding normalized lumas of a LDR maximum pixel luminance low dynamic range image (Im_LDR), the decoder being characterized in that it has a third metadata input (1113) to receive the first maximum pixel luminance (PB_C_H50), and the decoder comprising:

a luminance function determination unit (1104) arranged to apply a standardized algorithm to transform the luma mapping function (F_I2sCI) into a decoding luma mapping function (F_ENCINV_H2I) which specifies as output for any possible input normalized luma of a pixel of the intermediate dynamic range image (IDR) a corresponding normalized HDR luma of the master high dynamic range image (MsterHDR), which standardized algorithm uses the values of the first maximum pixel luminance (PB_C_H50) and the second maximum pixel luminance (PB_CH); and a color transformer (1102) arranged to successively apply to inputted normalized lumas of the intermediate dynamic range image (IDR) the decoding luma mapping function (F_ENCINV_H2I) to obtain normalized reconstructed lumas (L_RHDR) of pixels of a reconstructed master HDR image (REC_M_HDR); the decoder further having an image output (1120) to output the reconstructed master HDR image (REC_M_HDR). The LDR max. luminance is again preferably the standardized 100 nit SDR luminance, though one could conceive similarly working future variants being deployed in which the low (i.e. the lowest) dynamic range (i.e. max. luminance) image of the re-graded image spectrum and its communication is e.g. a 200 nit image.

So the MsterHDR image is not actually received as an image, but still it is uniquely defined by the data that is received (so although formally this MsterHDR image is the corresponding master image that existed at the corresponding matched encoder's site, and the decoder is only reconstructing nearly identically a REC_M_HDR image from the IDR image which is received, various functions do define MsterHDR image properties even at any decoding site). Different customers may choose various values of both PB_C_H50 and PB_IDR. The first may be chosen by the content creator for various reasons, such as e.g. because he purchased a 4000 nit grading monitor, or because he likes to give his master content a certain best quality (e.g. create/define everything at PB_C no less than 10,000 nit), or because certain kinds of images demand a certain quality i.e. PB_C_H50, at least according to the creator (e.g. a spectacular fireworks show or light show or pop concert may deserve a higher PB_C_H50 than e.g. a reasonably uniformly lit tennis match or a news reading).

The PB_IDR value may be selected based on different technical considerations, e.g. a valuation of the typical customer of a video communicating company, and as said the communication company may oftentimes not be the same as the creation company.

Typically it does not make too much sense to make re-graded IDR content which differs less than at least 20% in PB_C (i.e. the factor 0.8, although in principle the values of the PB_C's could be closer, e.g. 0.9), but oftentimes more typical there will be a multiplicative factor 2 or more between the PB_C's (e.g. 2000 nit master material sent at some PB_CH below 1000 nit, e.g. 800, 700 or 600 nit, and typically above 500 nit). The PB_C_H50 at the decoding site is typically similar to the other metadata and in particular the PB_CH value, so typically it is received as metadata associated with the video data, e.g. non-limiting SEI messages, or special packets on a video communication protocol, etc. (whether in one logical data structure or several structures, according to what suits best for each standardized or non-standard video communication protocol, this being a minor detail of the presented new technology). Since the decoder used a standardized algorithm to ultimately come to the IDR image and its ETSI2-compliant metadata, a corresponding standardized algorithm can be designed for and in the decoder which ultimately determines the needed F_ENCINV_H2I luma mapping function for reconstruction of the REC_M_HDR image pixel lumas (whatever is then done further with this image, displaying it being a typical application, but e.g. storing on a hard disk recorder being another).

An interesting embodiment of the high dynamic range video decoder (1100) is characterized in that the standardized algorithm of the luminance function determination unit (1104) calculates a scale factor which depends on the first maximum pixel luminance (PB_C_H50) and the second maximum pixel luminance (PB_CH). As mentioned this correspondingly may be done in various manners, but the psychovisually uniform v-function-based scale factors are quite handy in practice for well-controlled HDR image handling, and meeting the various even critical artistic needs while keeping technological complexity under control simultaneously.

A useful embodiment of the high dynamic range video decoder (1100) has the luma mapping function (F_I2sCI) defined by a luma mapping which consists of a first linear segment having a first slope (SG_gr) for a range of dark normalized lumas, a second linear segment having a second slope (HG_gr) for a range of bright normalized lumas, and a parabolic segment for lumas in between said two ranges. The corresponding math involves inter alia solving a second order equation to obtain the needed channel-adapted highlight gain for doing the reconstruction. This is a useful first order HDR re-grading approach which is suited for markets with not the highest pixel color control needs, such as e.g. real-life television broadcast (as contrasted to e.g. the detailed color control sometimes involved in e.g. blockbuster movies). As mentioned below, this could in some further divided embodiments be either the sole component fully defining the F_L50t1 function and all derivable functions (e.g. the communicated functions together with the IDR image: F_I2S), but it could also be a partial definition of that re-grading function, e.g. defining the total re-grading together with a customizable function as elucidated with FIG. 4.

A useful embodiment of the high dynamic range video decoder (1100) has its color transformer (1102) arranged to calculate pixel lumas of a medium dynamic range image (MDR_300) having a maximum pixel luminance (PB_MDR) which is not equal to the values 100 nit, the first maximum pixel luminance (PB_C_H50), and the second maximum pixel luminance (PB_CH), and the decoder having an image output (1122) for outputting the medium dynamic range image (MDR_300). Although a reconstruction of the REC_M_HDR image may be all that is needed for some apparatuses in some sub-markets (there possibly being all kinds of other transformations being applied on the reconstructed image), it is advantageous if some embodiments of our SLHDR2PLUS decoder can in addition to merely reconstructing the master HDR image also calculate corresponding images with other PB_C, e.g. an MDR image directly displayable on some display with any PB_D. This will also use the present invention's mathematical principles, e.g. in the manner elucidated with FIG. 16, or any equivalent manner.

Another useful embodiment of the high dynamic range video decoder (1100) has a metadata output (1121) for outputting a luma mapping function (F_L_subsq) which defines for all normalized lumas of the reconstructed master HDR image (REC_M_HDR) or alternatively the medium dynamic range image (MDR_300) corresponding lumas of an image having another maximum pixel luminance, this another maximum pixel luminance preferably being 100 nit, or a value higher or lower than the maximum luminance value of respectively the reconstructed master HDR image (REC_M_HDR) or alternatively the medium dynamic range image (MDR_300). It may be that the received IDR image is reconstructed into a REC_M_HDR image not to be directly displayed on a dumb monitor display, but sent to some system doing further colorimetric calculations. It is then useful that the decoder embodiment can also output a suitable luma mapping function, namely typically means a luma mapping function which is associated with the image which is being output, e.g. the REC_M_HDR image (associated with typically meaning that the input normalized lumas of that function as defined are the normalized lumas of the image which is co-outputted, and the outputs of the function are the normalized lumas of some reference image, which is usually the SDR image, as it is standardized to have PB_C=100 nit, which typically is the lowest quality one would wish for in the HDR era, this not excluding that someone may want to apply the present teaching with an PB_C for the output ordinate defining the co-communicated function being e.g. 80 or 50 nit).

Anything that is formulated for apparatuses (or parts or aggregations of apparatuses) can be formulated equivalently as signals, memory products comprising images such as blu-ray disks, methods, etc., e.g.:

A method of high dynamic range video encoding of a received input high dynamic range image (MsterHDR) which has a first maximum pixel luminance (PB_C_H50), comprising receiving a master luma mapping function (FL_50t1), which luma mapping function defines a relationship between normalized lumas of the input high dynamic range image and normalized lumas of a corresponding low dynamic range image (Im_LDR) having a LDR maximum pixel luminance preferably having a value equal to 100 nit, characterized in that the encoding further comprises receiving a second maximum pixel luminance (PB_CH), and the encoding comprising:

applying a standardized algorithm to transform the master luma mapping function (FL_50t1) into a adapted luma mapping function (F_H2hCI), which relates normalized lumas of the input high dynamic range image to normalized luminances of an intermediate dynamic range image (IDR) which is characterized by having a maximum possible luminance being equal to the second maximum pixel luminance (PB_CH);

applying the adapted luma mapping function (F_H2hCI) to lumas of pixels of the input high dynamic range image (MsterHDR) to obtain lumas of pixels of the intermediate dynamic range image (IDR);

deriving on the basis of the master luma mapping function (FL_50t1) and the adapted luma mapping function (F_H2hCI) a channel luma mapping function (F_I2sCI), which defines as output the respective normalized lumas of the low dynamic range image (Im_LDR) when being given as input the respective normalized lumas of the intermediate dynamic range image (IDR), which lumas in turn correspond to respective lumas of the input high dynamic range image (MsterHDR);

outputting the intermediate dynamic range image (IDR); and outputting the second maximum pixel luminance (PB_CH), the channel luma mapping function (F_I2sCI) and the first maximum pixel luminance (PB_C_H50).

Or, a method of high dynamic range video decoding of a received intermediate dynamic range image (IDR), which image has a second maximum pixel luminance (PB_CH) which is lower by a multiplicative factor being preferably 0.8 or less than a first maximum pixel luminance (PB_C_H50) of a master high dynamic range image (MsterHDR), which second maximum pixel luminance (PB_CH) is received as metadata of the intermediate dynamic range image, the decoding method also receiving in metadata a luma mapping function (F_I2sCI), which defines the transformation of all possible normalized lumas of the intermediate dynamic range image (IDR) to corresponding normalized lumas of a LDR maximum pixel luminance low dynamic range image (Im_LDR), and the decoding method being characterized in that it receives the first maximum pixel luminance (PB_C_H50), and the decoding method being characterized in that it comprises:

applying a standardized algorithm to transform the luma mapping function (F_I2sCI) into a decoding luma mapping function (F_ENCINV_H2I) which specifies as output for any possible input normalized luma of a pixel of the intermediate dynamic range image (IDR) a corresponding normalized HDR luma of the master high dynamic range image (MsterHDR), which standardized algorithm uses the values of the first maximum pixel luminance (PB_C_H50) and the second maximum pixel luminance (PB_CH);

apply to normalized lumas of the intermediate dynamic range image (IDR) the decoding luma mapping function (F_ENCINV_H2I) to obtain normalized reconstructed lumas (L_RHDR) of pixels of a reconstructed master HDR image (REC_M_HDR); and outputting the reconstructed master HDR image (REC_M_HDR).

FIG. 25 illustrates nicely the present SLHDR2PLUS encoded HDR image signal (2501), i.e. a e.g. 4k×2k matrix of pixel colors 2502 (YCbCr, or any color representation that can be calculated into the needed YCbCr representation by known colorimetric equations by a preprocessor [not shown]), and the necessary metadata: a luminance mapping function F_I2sCI, and the two PB_C values. In case this HDR image signal is communicated to and received by a standard SLHDR2 decoder 2510, since the F_I2sCI is the normal function this decoder would expect to re-grade from its received image peak brightness (PB_CH, being in the example 800 nit, to any lower peak brightness, it can display optimize for e.g. a connected 350 nit medium dynamic range display by calculating Im350 by display optimization (which as said is not the key aspect of this application, it is only made possible as one of the starting design criteria for coming to the novel codec framework, and one can use for the display optimization e.g. a method as disclosed in US20160307602, or a similar one). But what is now also made possible, is that anybody having a SLHDR2PLUS decoder 2520, e.g. newly deployed by a cable operator deciding to introduce this service, and the like, can make other images, of PB_C above the PB_CH value, e.g. a reconstruction of the 5000 nit exemplary master HDR image (i.e. output image Im5000) or any display adapted image between PB_C_H50 and PB_CH, or potentially even above PB_C_H50, like the Im1250 display adapted image, etc.

Interesting embodiments of decoders regarding chroma processing are inter alia:

A high dynamic range video encoder (900) in which the luminance function determination unit (1104) is further arranged to determine a original saturation boost specification curve (2801) depending on a channel saturation boost specification curve (2804) and the channel luma mapping function (F_I2sCI).

A high dynamic range video encoder (900) in which the original saturation boost specification curve (2804) further depends on a saturation position correction function (FSNL) which corresponds to an equation involving a power function of the value of the normalized lumas. The normalized lumas best used for this are the ones defined with respect to i.e. by division by the master HDR image peak brightness PB_C_MHDR, e.g. 5000 nit.

The same corresponds at an encoder side with inter alia a high dynamic range video encoder (900) in which the HDR function generation unit (901) is arranged to determine a saturation boost specification curve depending on an original saturation boost specification curve (2801) and the adapted luma mapping function (F_H2hCI). Or the same as color processing methods being performed in any technical apparatus, e.g. a decoding integrated circuit in a consumer settopbox or the like, or on a mobile phone, or an encoder IC in a production apparatus in an outside broadcasting truck, or a final coder or transcoder on the premises of a cable operator, or running on the server of an over-the-top content provider, or supplier to movie theatres, etc.

BRIEF DESCRIPTION OF THE DRAWINGS

These and other aspects of the method and apparatus according to the invention will be apparent from and elucidated with reference to the implementations and embodiments described hereinafter, and with reference to the accompanying drawings, which serve merely as non-limiting specific illustrations exemplifying the more general concepts, and in which dashes are used to indicate that a component is optional, non-dashed components not necessarily being essential. Dashes can also be used for indicating that elements, which are explained to be essential, but hidden in the interior of an object, or for intangible things such as e.g. selections of objects/regions (and how they may be shown on a display).

In the drawings:

FIG. 2 shows what a capturing system for HDR images may look like;

FIG. 6 elucidates our concept of customizable curve in some more details, by explaining a useful application;

FIG. 12 further explains some aspects of black and white offsetting when selected by the content creator in his master luma mapping functions defining the re-grading needs of his video content according to his view;

FIG. 13 describes the technical principles of a preferred approach of a fixed algorithm for deriving a channel-adapted version of a para according to a diagonal scaling principle;

FIG. 19 elucidates how to determine corresponding versions of an original master customized curve, for various dependent peak brightness image representations (whether as input or output image), e.g. an IDR image with a co-specification of a customized curve to fine-tune coarsely mapped IDR lumas to precise final SDR lumas as desired by e.g. a movie creator's grader;

DETAILED DESCRIPTION OF THE EMBODIMENTS

Figure 9:
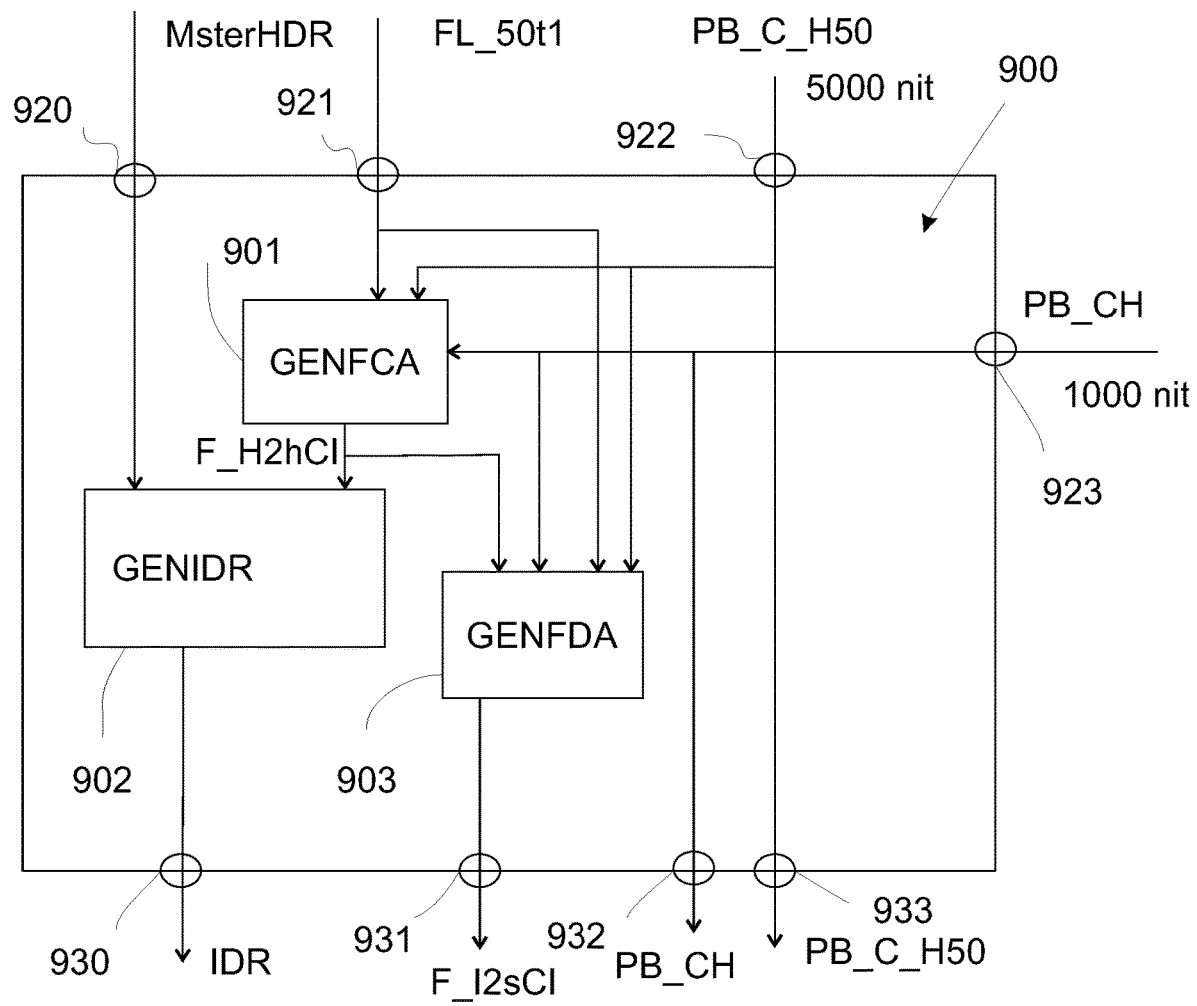
FIG. 9 shows a generic construction of the technical parts typically needed for the present application's novel SLHDR2PLUS encoder.

FIG. 9 shows generically the new SLHDR2PLUS encoder 900. As input it gets a master HDR image (e.g. a 5000 nit PB_C image MsterHDR), which without wanting to lose generality the reader can assume to have been made at or around the time of encoding by a human color grader using color grading software, e.g. by starting from a RAW camera-captured HDR image (the MsterHDR image being optimized e.g. for a typical evening dim television viewing environment, i.e. its average surround luminance etc.; the present technologies can also work with other or variable environments, but that is rather an issue of display adaptation rather than new methods to create or code HDR images). The grader has also created at least one nice luminance downgrading function FL_50t1, to convert the 5000 nit master HDR image in a corresponding nice looking SDR image (i.e. of usual 100 nit PB_C), and he has done this by filling in some of the partial re-grading aspects of 403, 404 and 405, and some good color adjustment F_C[Y] according to chromatic processing unit 451), which he has checked on his SDR reference monitor (other methods e.g. in real-life event broadcasting can calculate applicable function shapes on the fly, and then there may be some director looking roughly at the result, or not even, but the principle is there comes into existence a good function FL_50t1, whether from only one of the partial units, or the total function of all of the units together, etc.).

This function FL_50t1 must also be input as starting information for the novel encoder 900. The peak brightness static (for the whole movie or broadcast) metadata PB_C_H50 is also input, as it will be used, but is also output by the encoder as the total IDR video coding signal (IDR+F_I2sCI+PB_CH+PB_C_H50, wherein the image is typically compressed or uncompressed according to some suitable video communication standard, e.g. HEVC, and the other metadata can be communicated according to any available or configurable metadata communication mechanism, ranging from MPEG SEI messages to dedicated internet packets, etc.).

A HDR function generation unit 901 will calculate the HDR-to-IDR luminance mapping function F_H2hCI which is needed to calculate the IDR image from the Mster HDR image, and it will need a choice for the IDR's PB_CH, which we assume it gets from some other input (e.g., this may have been chosen by a cable operator, and put somewhere in a memory, to be loaded by configuration software); we will assume PB_CH equals 1000 nit (merely for elucidation purposes; typically this value will be a couple of times higher than the SDR PB_C, e.g. 4× higher, the technical aspects differing somewhat in embodiment details based on which value is chosen).

Figure 10:
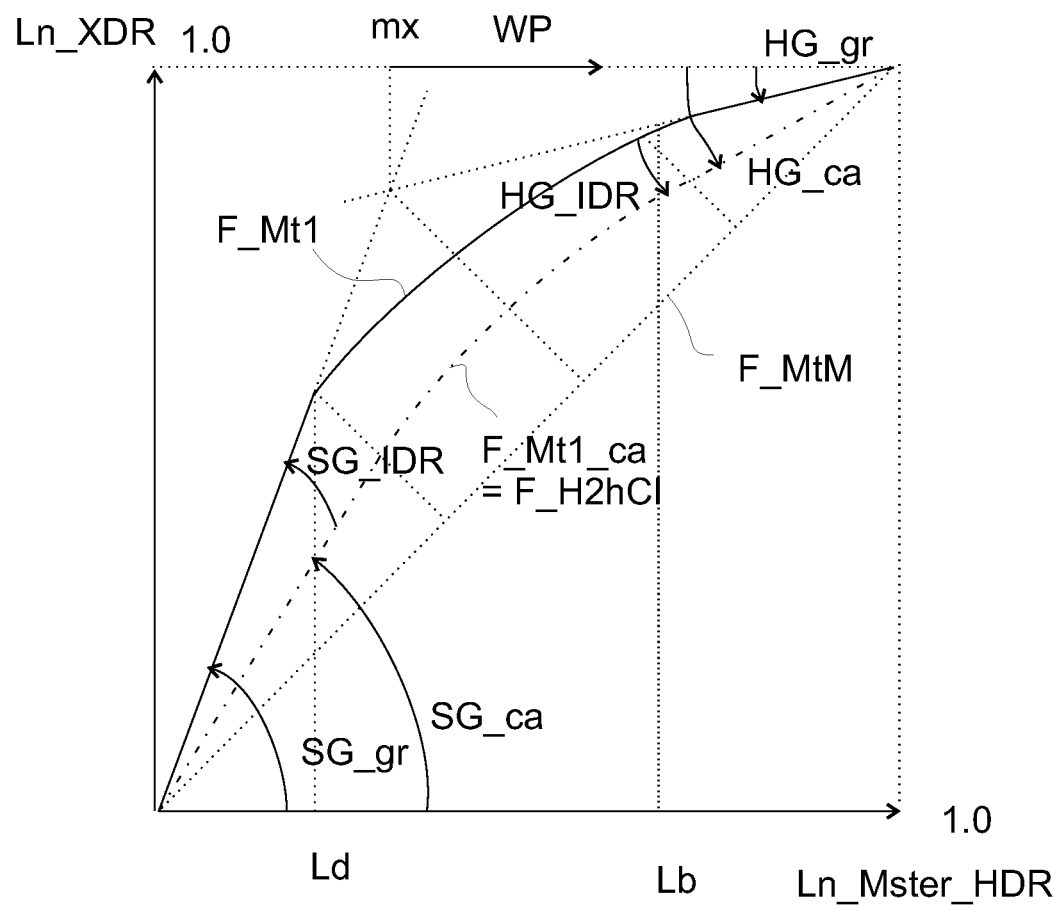
FIG. 10 elucidates some basic technical aspects involved in consecutively deriving the various corresponding luma mapping functions by an encoder, in particular elucidated with the example of a para luma mapping function.

How this HDR function generation unit 901 may function is illustrated with FIG. 10.

Suppose the grader has defined some function (here in the elucidating example the linear-parabola-linear function—para in short—which applicant uses according to the ETSI standardized codec philosophy to do a first already largely good re-balancing of the brightnesses of the dominant image regions (i.e. it e.g. gives the darks sufficient visibility in the SDR image at the cost of a co-controlled compression of the brightest luminance regions).

Such a function relates the input lumas (in a psychovisual equalized representation by transforming the pixel luminances according to above Eqs. 1 and 2) of the darkest sub-range of lumas (L<Ld) to the needed output luminances by a linear relationship with controlled slope SG_gr as optimally chosen for this HDR image by the grader:

$$Ln\_XDR = SG\_gr * Ln\_Mster\_HDR \text{ if } (Ln\_Mster\_HDR < Ld) \quad [\text{Eq. 4}]$$

(where Ln_Mstr_HDR and Ln_XDR are respectively the lumas—i.e. phychovisually uniformized representations of the corresponding pixel luminances—of the input master HDR image as pre-graded as optimal starting image by the grader, and Ln_XDR is a summary of several output lumas of images with different dynamic range and in particular peak brightness PB_C all shown on the same normalized vertical axis for explaining the concepts behind the present invention and its embodiments). In particular, when the grader starts re-grading a corresponding optimal SDR image for his already optimally graded Mster_HDR image, XDR will be the species SDR, and the corresponding luminance mapping function shape is shown as F_Mt1 [we use the shorthand notation xty to indicate from which starting PB_C x to which end PB_C y the functions maps the lumas, and the x and y can either generically indicate an image's PB_C, like M for Master, or numerically indicate an example value, where we then drop two zeroes, e.g. 50 means 5000, and 1 means 100 nit].

Similarly for input lumas Ln_Mster_HDR higher than Lb there is again a controllable linear relationship:

$$Ln\_SDR = HG\_gr * Ln\_Mster\_HDR + (1 - HG\_gr) \text{ if } (Ln\_Mster\_HDR > Lb) \quad [\text{Eq.5}]$$

The parabolic part of the para extending between Ld=mx−WP and Lb=mx+WP has a functional definition of L_XDR=a*x^2+b*x+c, of which the coefficients a, b and c can be calculated by calculating the point where the linear tangents to the curve coming from its extremes intersect, and its abscissa mx (as defined in the ETSI1 standard; mx=(1−HG)/(SG−HG)).

A general thought underlying the invention is the following (and it can be explained in a multiplicative view). Any master HDR luminance can be transformed to itself by applying the identity transform (the diagonal). If at the end of the spectrum of re-graded images, i.e. to create the corresponding SDR luminance (XDR=SDR) we have to obtain the output luminance L_SDR=F_Mt1(Ln_M), where Ln_M is some particular value of the Ln_Mstr_HDR luminances, then we can also see this as a multiplicative boost of the input luminance L_SDR=b_SDR(Ln_M)*Ln_M. If we can now define some intermediate function F_Mt1_ca, then the final processing is a consecutive application of two functions F_IDRt1(F_Mt1_ca(Ln_Mster_HDR)), in which the F_IDRt1 does the finally luminance mapping towards the SDR luminance of any pixel (or object), starting from the already calculated IDR pixel luminance (derived from the master HDR luminance). In multiplicative terms one can say L_SDR=b_IDR*b_ca*Ln_M, where the two boost correspond to the intermediate function (or channel adaptation function), and the remaining regrading function (which happens to be the function we communicate together with the IDR image to create an ETSI2-compliant HDR video coding). Note that these boost factors are themselves functions of Ln_Mster_HDR (or in fact any therewith associatable intermediate luma).

Now it is convenient if we don't need to communicate any additional functions (which could e.g. get lost if metadata management is imperfect etc.).

So it can be useful if the SLHDR2PLUS philosophy uses a pre-agreed, fixed manner to transform the grader's F_Mt1 function (i.e. a mechanism for whatever function shape he desired to use) into the channel-adapted function, corresponding with the PB_IDR (which value is also typically communicated to receivers according to the ETSI2 coding approach, as PB_CH). It can be shown that one then does not need to co-communicate in metadata associated with the IDR images the upwards grading function F_H2$h$, because it is fixed and known to decoders, so the inverse F_?? could probably be calculated from the received F_I2$s$ function, as we will indeed show (if PB_C_H50 is also communicated to the receivers). The novelty of the decoder is this new approach to derive images of PB_C>PB_IDR. In principle any fixed approach to derive a F_Mt1_$ca$ function from the master F_Mt1 could do, provided it is mathematically invertible, or at least decodable according to the requirements, but it is desired to select a species class approach in which the HDR-to-IDR regrading is performed (i.e. the F_Mt1_$ca$ shape is derived) so that its further deformation for deriving MDR images is compatible with what ETSI2 would yield (in principle ETSI2 images are only standardized between PB_C and 100 nit, so one could start with demanding near equality of the image looks, i.e. all pixel luminances and colors, for all images of dynamic range between PB_IDR and 100 nit, but one could also try to impose on the solution to be obtained the technical constraints that images upgraded from the received IDR towards the master HDR image, i.e. with F_?? to be calculated by a SLHDR2PLUS decoder, have the same look as would be obtained by the display adaptation of an ETSI2 which was to receive the e.g. 5000 nit PB_C Mster_HDR images, and the total luminance remapping function F_Mt1.

We first explain how such a preferred channel adaptation (i.e. calculation of F_Mt1_$ca$, or F_H2$h$CI calculated in FIG. 9; and the corresponding IDR image(s)) can be designed which is useful for several approaches/embodiments of SLHDR2PLUS.

Figure 1:
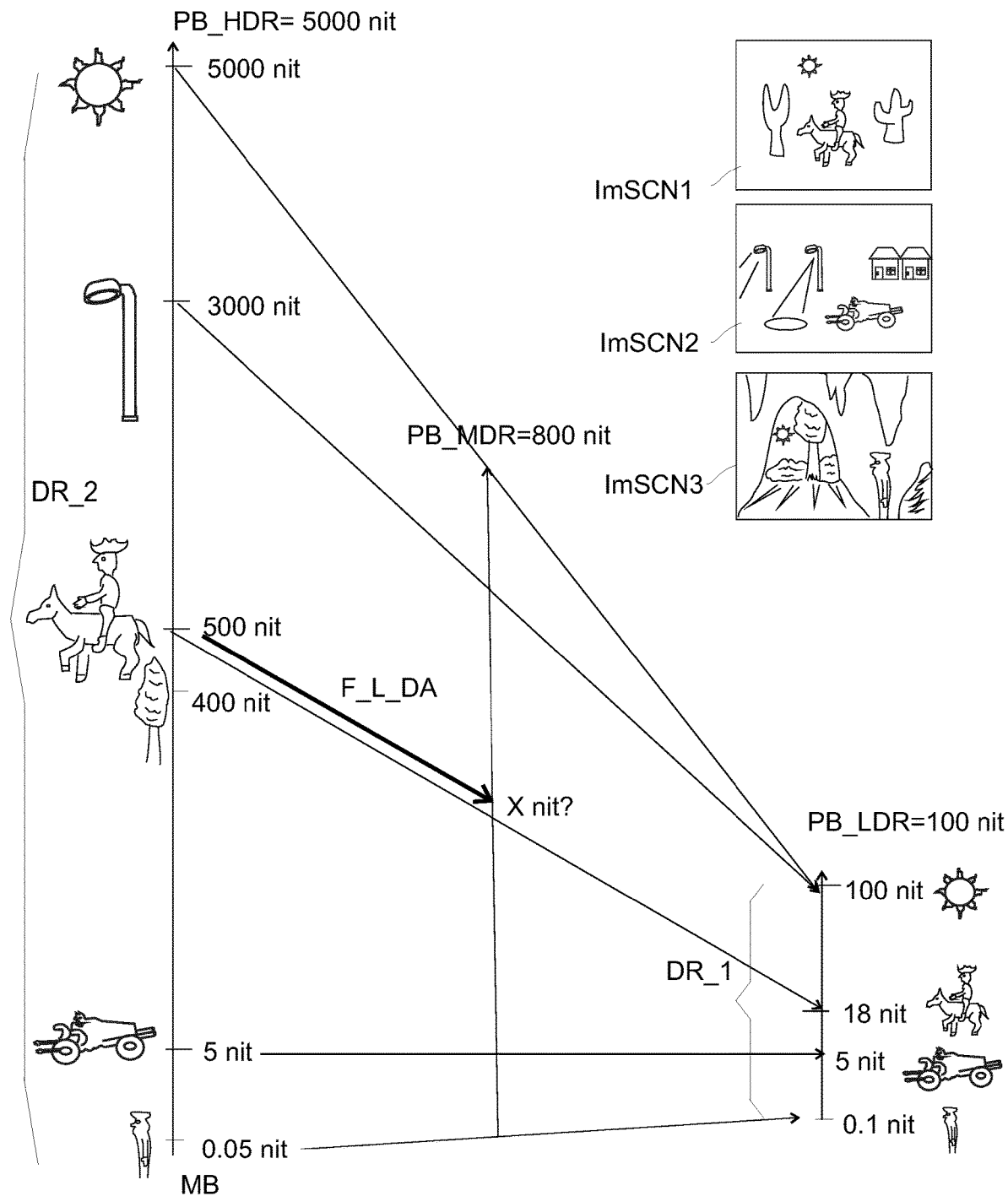
FIG. 1 schematically illustrates a number of typical color transformations which occur when one optimally maps a high dynamic range image to a corresponding optimally color graded and similarly looking (as similar as desired and feasible, given the differences in the first and second dynamic ranges DR_1 resp. DR_2) lower dynamic range image, e.g. a standard dynamic range image of 100 nit peak brightness, which in case of reversibility (mode 2) would also correspond to a mapping of an SDR image as received by receivers (decoders) which SDR image actually encodes the HDR scene.
Figure 2:
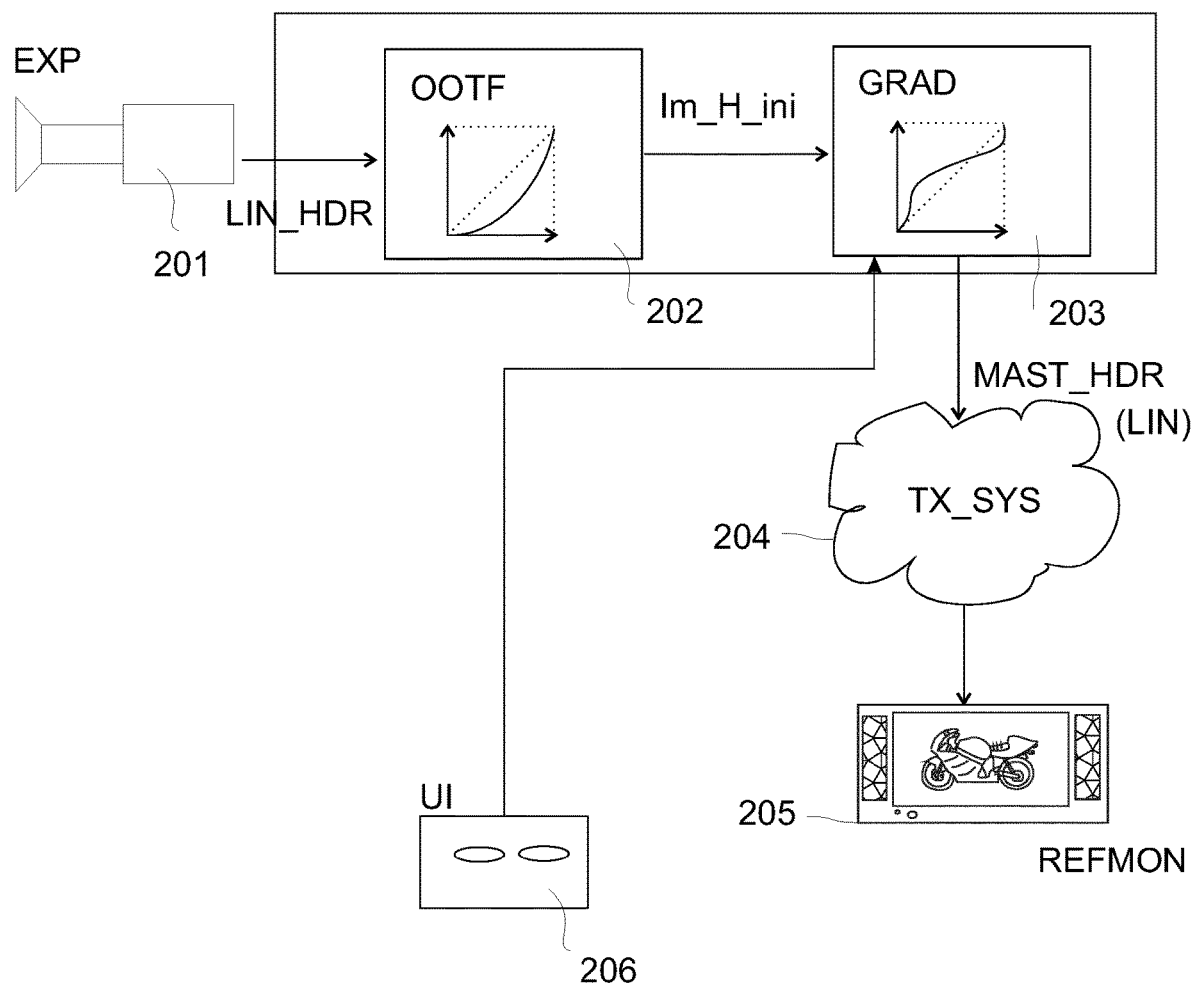
Figure 3:
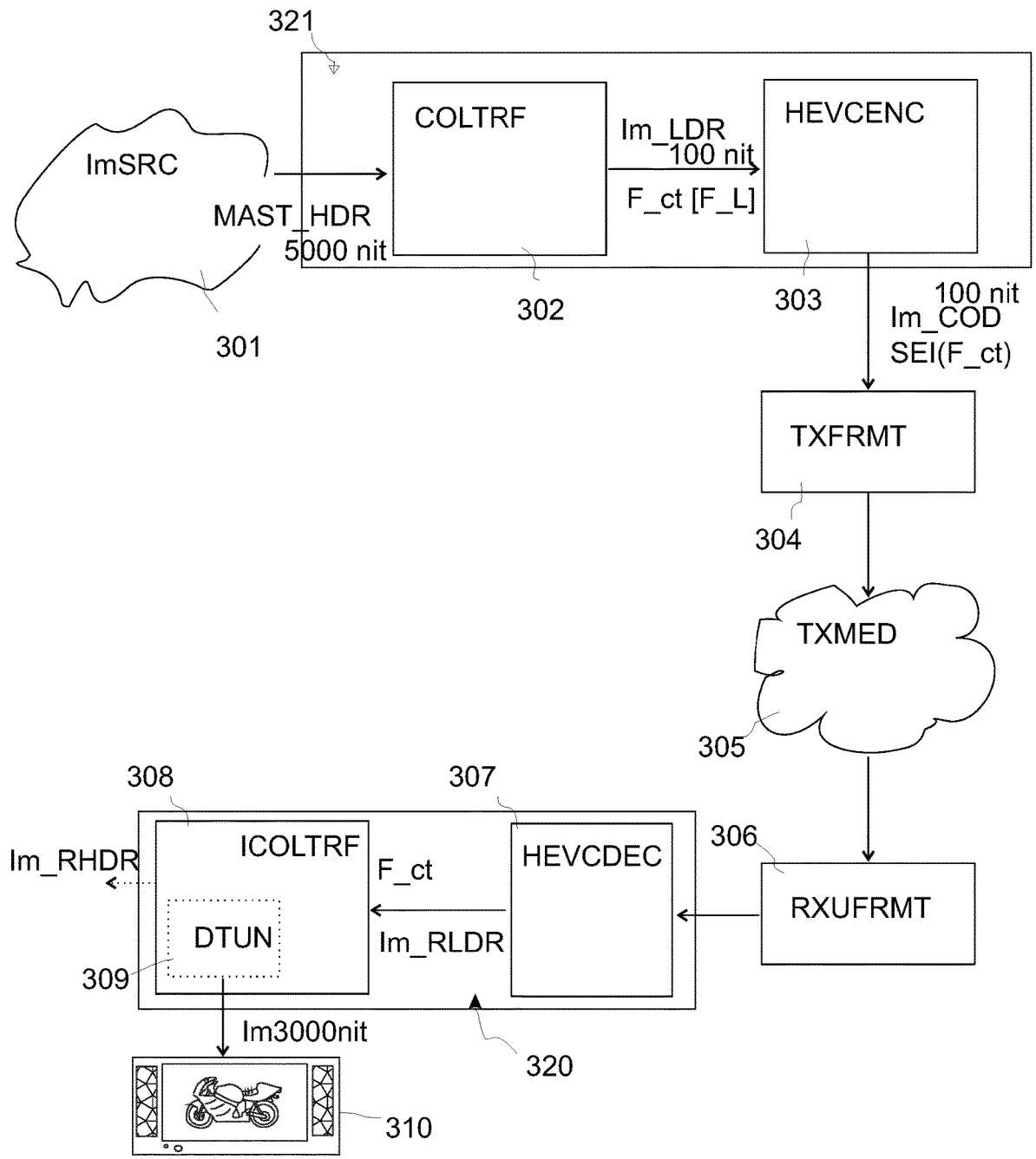
FIG. 3 elucidates a possible manner to communicate HDR images as some images of a particular (different) peak brightness and in metadata co-communicated luminance mapping functions typically defined as luma mapping functions, e.g. as legacy-usable SDR images Im_LDR, e.g. according to a preferred approach of applicant, on high conceptual level to start the elucidation for readers new to the technology.
Figure 4:
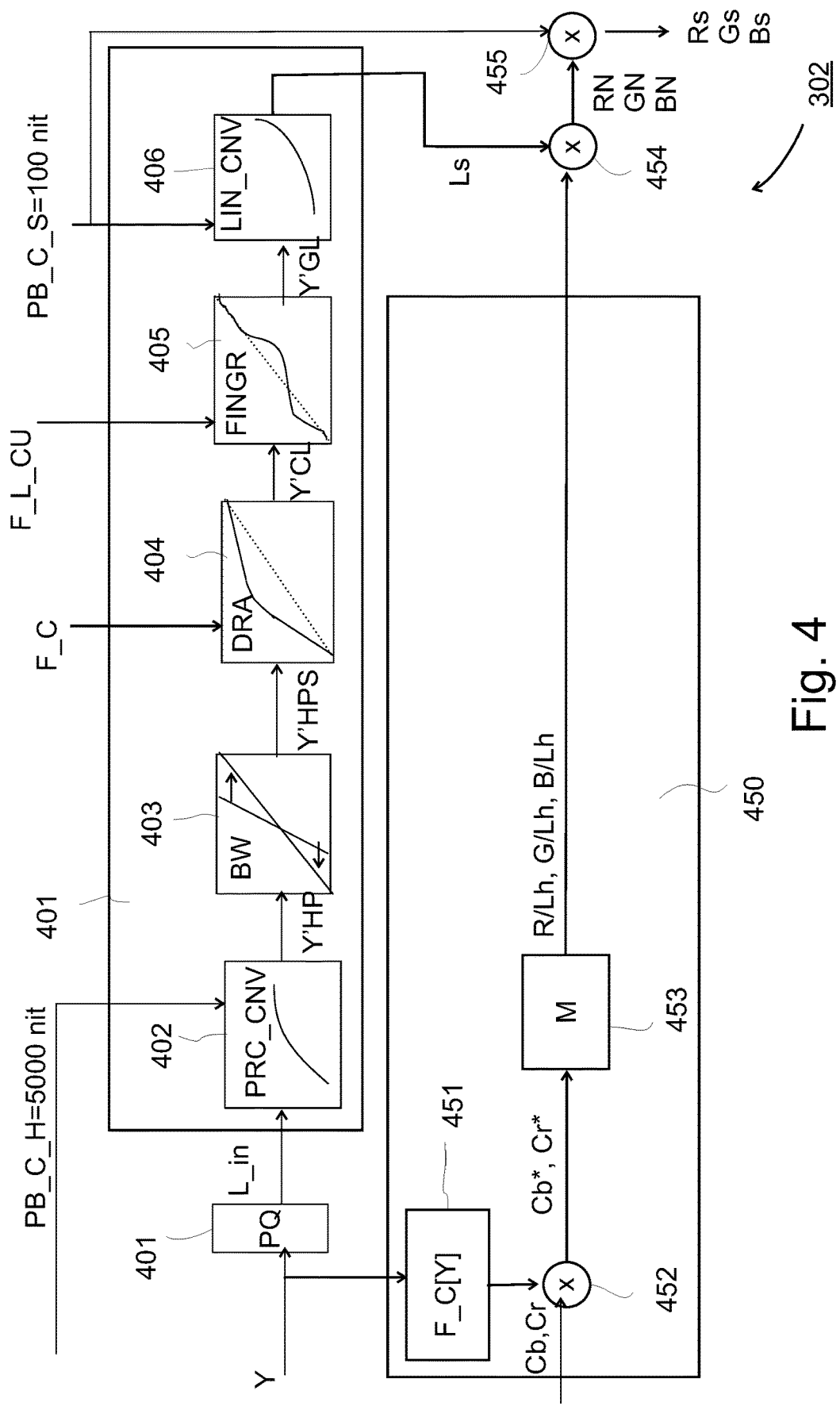
FIG. 4 shows various further details of the encoding of HDR images according to applicant's particular approach as standardized in ETSI2, which aspects are needed to understand various details of various teachings of the novel SLHDR2PLUS codec approach written herebelow.
Figure 5:
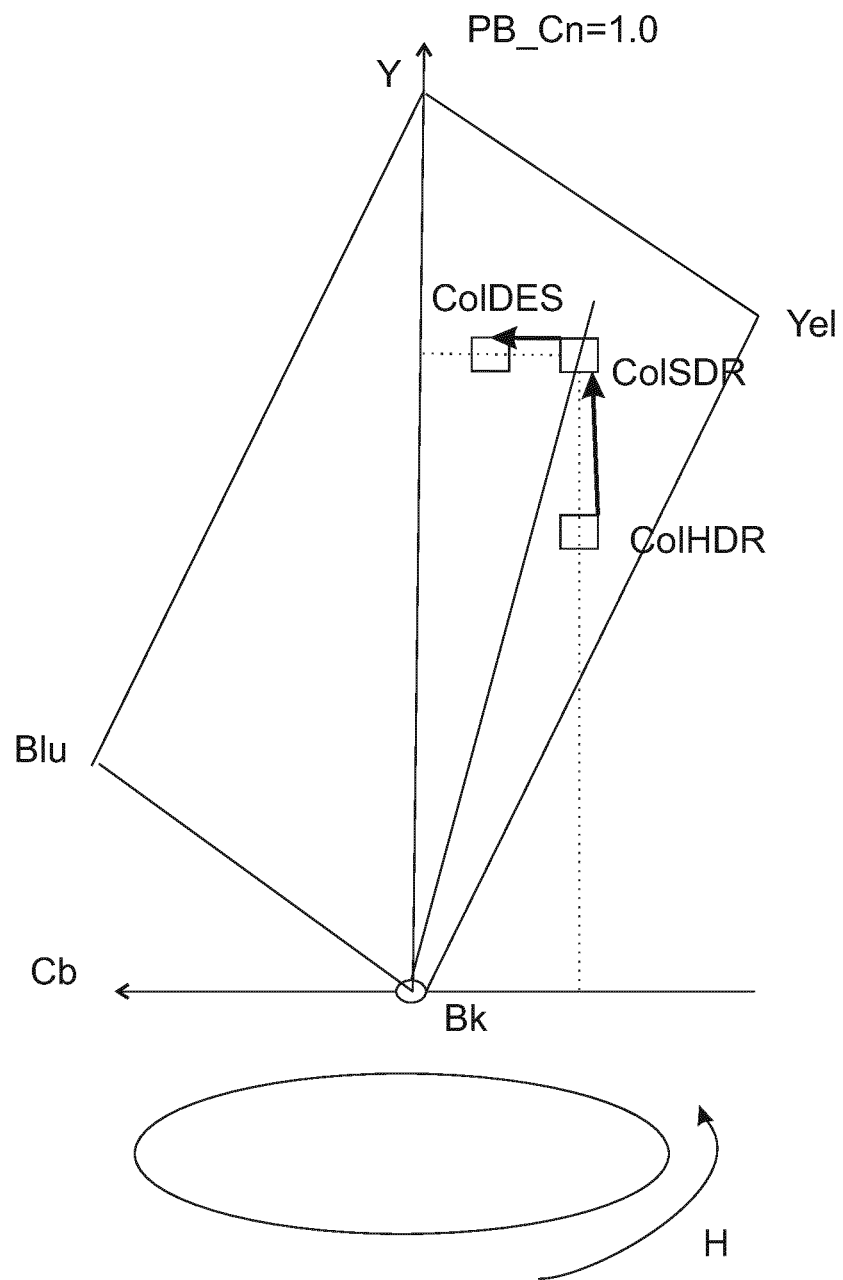
FIG. 5 elucidate how the color transforms and in particular the luma transforms of the re-gradings work in the YCbCr color gamut.

FIG. 12$a$ shows a white level offset WLO_gr as optimally selected by the grader (or automaton), and if available also a black level offset (BLO_gr); corresponding to unit 403 in FIG. 4.

We can for the moment assume that this is the only dynamic range adjustment i.e. luminance mapping operation to obtain the SDR image from the Mster_HDR starting image (this white-on-white and black-on-black is a rather dumb dynamic range conversion which gives bad quality LDR images, which already don't have the correct average brightness nor average visual contrast, let alone higher image quality descriptors of the resultant image being as desired, but as a first step of a re-grading chain according to applicant's approach it is a nice step, and we need to explain this step and its channel adaptation first). The idea is that, if there are (despite of the potential to code lumas up to PB_HDR=5000 nit) actually no pixel luminances above a value MXH in the present to be mapped image (or a shot of images in a video of the same scene, in case one decides to use the same function for all of those temporally successive images), then it makes sense to map that highest MXH value to the max. luma code in SDR (i.e. e.g. 1024, corresponding to the luminance of 100 nit). Any other mapping approach (e.g. HDR-white-on-SDR-white mapping) will make all actually present luminances even darker, and that is not optimal given that the SDR luminance range is small enough as it is, yet needs to optimally contain a corresponding emulation of a large range of HDR luminances.

The question is then whether this WLO value should be adjusted for the IDR image (as can be seen in FIG. 12$b$, the brightest luma in the intermediate images may already fall closer to PB_IDR, there still being a final shift to map on 1.0 for the SDR re-graded image; which mapping can also equivalently be shown on the HDR 5000 nit image's normalized luminance range, as is indicated by ON). In a first approach it need not (because there is some liberty in how to design the algorithm for calculating the F_Mt1_$ca$ function), but in case it is scaled, then the following approach can be used.

A scale factor for such horizontal scaling needs to be determined, to be able to scale the luminance mapping function, which in this case are its parameters WLO_ca, and similarly a scaled BLO_gr (notation BLO_ca). if one desires this parameter to scale linear with the PB_IDR, then the constraints are that the act is fully on, i.e. the offset has its maximal extent BLO_gr, when PB_IDR=PB_SDR. On the other hand for the HDR image the BLO or WLO should be zero, as nothing needs to be corrected, since we have the identity transform for mapping 5000 nit Mster_HDR to Mster_HDR.

Ergo, one can formulate such a definition of the parameters $$WLO\_ca = scaleHor*WLO\_gr(0<=ScaleHor<=1)$$

$$BLO\_ca = scaleHor*BLO\_gr \qquad [\text{Eqs. 6}]$$

The question is then how to define the ScaleHor.

FIG. 12$b$ shows a spectrum of different dynamic range, more specific different PB_C images organized along the horizontal axis. They are positioned along perceptualized positions of the peak brightness PB_C of each image. Ergo, we place them on an abscissa position being v(PB_C), whereby v is the function Eq. 1, with the value PB_C used for the parameter L_in, and with the value RHO of Eq. 2 being calculated for the peak brightness of the Mster_HDR image which was graded (i.e. e.g. RHO is 25 for a 5000 nit PB_C Mster_HDR image). If also the ordinate axis has its lumas L parametrized according to the v function (on the vertical axis), with the same RHO=25, then the PB_C's nicely follow a straight line, and definitions and calculations can be done in this framework. E.g., we can project the lumas of the peak brightnesses PB_C of any intermediate image onto the master (5000 nit) luma axis. The notation we use is "P_I1$o$I2", meaning the value of the luma corresponding via the application of the v-function of the peak brightness (which is a normal luminance) of image I1, when represented on the luma range of image I2. So e.g. P_IoH is the luma of the peak brightness of the elected IDR image on the Mster_HDR luma range, and P_SoH is the luma of 100 nit (note that 1.0 on this range corresponds to the PB_C of the Mster_HDR image, so that position of e.g. 100 nit, e.g. 0.5, will vary depending on the chosen Mster-HDR image representation, which is why Eqs. 1 and 2 are a RHO-parametrized family of curves).

A suitable function for ScaleHor would then be to start from 1−P_IoH. This function will indeed increase the more PB_IDR decreases, i.e. the more to the right we elect our IDR image representation of the MsterHDR image. And it will yield 0 in case P_IoH=1, which happens when a 5000 nit IDR image is chosen (pure for the theoretical explanation of the scaleHor equation, because that doesn't make sense technically). However, this equation does not equal 1.0 when IDR=SDR, so we need to scale it with a factor k.

It can be verified that the normalization is correct if k=1−P_SoH (which is in contradistinction with the variable P_IoH value corresponding to various IDR positions a fixed value), ergo:

$$\text{ScaleHor}=(1-P\_IoH)/(1-P\_SoH) \quad [\text{Eq. 7}]$$

The determination of the correct para (FIG. 4, unit 404) for the channel conversion is more complex, and elucidated with FIG. 13.

In this case the inventors decided to do the function transformation in a diagonal direction, orthogonal to the identity diagonal ([0,0]-[1,1]). This has to be converted in an equivalent parametrization in the normal Mster_HDR/XDR coordinate system representation of all functional regradings.

The basic scaling is defined in a 45 degree rotated axis system which changes the diagonal into the horizontal axis (FIG. 13a). We see a function Fx, which is e.g. the rotated para. It makes sense to scale any value dY for a point on the rotated diagonal i.e. new x-axis (which dX corresponds to some abscissa i.e. L_Mster_HDR luma in the original axis system) by factor La/K, whereby K is the full action of the function, i.e. the full dY value, and a scale dY_ca value would be (La/K)*dY in this rotated system.

We define a sc_r=La/K, with La=1/P_IoH and K=1/P_SoH (note that the value of an I2 luma on the I1 axis can be reformulated as a value of an I1 luma on the I2 axis, in particular e.g. 1/P_IoH=P_HoI; e.g. if P_IoH=0.7, this means that the PB_Mstr_HDR would stick 1/0.7 above the PB_IDR).

Now we need to calculate an equivalent vertical scaling sc* to the diagonal sc_r.

This can be done by applying the counter-rotation math (actually by first defining a K and La for 1.0 instead of 1.4), bringing the FIG. 13a representation onto the FIG. 13b diagonal. This yields by matrix rotation (any x_r, y_r in the diagonal system, e.g. 1, dY, rotated to the main representation):

$$[x1,y1]=[\cos(pi/4)-\sin(pi/4); \sin(pi/4)\cos(pi/4)]*[1,P\_HoI=1/La]$$

$$[x2,y2]=[\cos(pi/4)-\sin(pi/4); \sin(pi/4)\cos(pi/4)]*[1,P\_HoS=1/K] \quad [\text{Eqs. 8}]$$

One should note that because of diagonal scaling, both x and y coordinates will change, but SG and HG, as well as any other scaled point change, are defined as slopes rather than angles anyway.

The rotation from the line from (0,0) in FIG. 13b to the square representing a diagonally scaled point of the luma mapping function to the line from (0,0) to the circle being the original luminance mapping function point, or vice versa, can be found by dividing the slopes at any fixed abscissa value, e.g. a (with the angle changes corresponds a vertical change of a normalized scale factor sc*):

$$sc^*=(y2/x2)/(y1/x1)=[(1+1/K)/(1-1/K)]/[(1+1/La)/(1-1/La)]=[(K+1)/(K-1)]/[(La+1)/(La-1)]=[(La-1)*(K+1)[/](La+1)*(K-1)] \quad [\text{Eq. 8}]$$

Subsequently, the actual ordinate distance n corresponding to the full vertical scaling (sc*=1) has to be calculated, and this can be done by realizing that because of the 45 degree angle involved in the diagonal scaling mip is a midpoint, having a distance Fd below it to the diagonal and above it to the intersection point (mx, my) of the two linear segments of the para. Ergo, n=Fd equals half of the differential slope SG−1 at mx, i.e. mx*(SG−1)/2.

Subsequently the shifted intersection point (mxca, myca) has to be calculated, which follows as:

$$mxca=mx+d=mx+[mx^*(SG-1)/2]^*(1-sc^*)$$

$$myca=my-d=SG^*mx-(mxca-mx)=-mxca+mx^*(SG+1) \quad [\text{Eqs. 9}]$$

With the location of the new point one can finally calculate the channel-adapted shadow gain (SG_ca, see FIG. 10) and the channel adapted highlight gain HG_ca: SG_ca=myca/mxca $$HG\_ca=(myca-1)/(mxca-1) \quad [\text{Eqs. 10}]$$

Finally for the parabolic middle section there are several approaches/embodiments.

In one approach, which produces quite good visual results in practice, one takes WP_ca=WP_gr, with WP_gr the original width of the parabolic section as optimized by the grader or automaton of the content creator relating the master HDR and master SDR images, and WP_ca the width for the channel-adapted para function. Another approach is to define WP_ca=v(abs(sc*), 100)*WP_gr, with the v-function again defined by above Eqs. 1 and 2.

Having this as available technology, it can be used to define a suitable IDR definition for SLHDR2PLUS.

Returning to FIG. 10, the above equations define how one can uniquely define the function F_Mt1_ca, for e.g. a selected 1000 nit PB_IDR, starting from e.g. a 5000 nit master HDR image. If this function is determined by HDR function generation unit 901, it can be output as F_H2hCI and sent as input for IDR image calculation unit 902. This unit will apply this function to all pixel luminances of the MsterHDR image it receives as image input [L_IDR=F_H2hCI(L_MsterHDR)=F_Mt1_ca(L_Mster-HDR)], to obtain the corresponding IDR image pixel luminances, and it will output the IDR image.

The question is now still which luminance mapping function to add in metadata to the IDR image, to make it appear as if this were a normal ETSI2 image (i.e. so that any legacy ETSI2 decoder can normally decode it, yielding an SDR image or any MDR image as it should look).

This secondary, IDR luminance mapping function F_I2sCI, which will also be a para, can be defined as follows (and it will be calculated by IDR mapping function generator 903). The Shadow gain for the IDR image SG_IDR can be seen as the remaining multiplication (or slope) after having gone from the Mster_HDR to the IDR image already (i.e. the remaining relative brightening to obtain the SDR image, starting from the IDR image):

$$Y\_out(x\_in)=SG\_gr^*x\_in;=F\_I2sCI(L\_IDR=SG\_ca^*x\_in)$$

It is also known that the same para linear segment mapping for the darkest pixels is applied to the new IDR luma inputs:

$$Y\_out=SG\_IDR^*L\_IDR$$

Ergo:

$$SG\_gr=SG\_IDR^*SG\_ca \quad [\text{Eq. 11}]$$

(e.g., take an input x_in=L_Mster_HDR=0.2, which from the diagonal gets mapped to L_IDR=0.3=(0.3/0.2)*x_in, which finally gets mapped to Y_out=0.4=k*0.3, with k=0.4/0.3; Y_out=SG_gr*0.2=(0.4)*0.2=(0.4/0.3)*(0.3/0.2)*0.2).

Ergo, from Eq. 11 follows the way to calculate the needed SG_IDR (given that we used the fixed approach to determine SG_ca as described above):

$$SG\_IDR = SG\_gr/SG\_ca \quad [\text{Eq. 12}]$$

Similarly:

$$HG\_IDR = HG\_gr/HG\_ca \quad [\text{Eq. 13}]$$

In which HG_gr is again the optimal highlight gain as determined by the content creator relating the master SDR image look to the master HDR image look (i.e. its luma distribution), and HG_ca is the channel-adapted highlight gain, corresponding to the original highlight gain HG_gr.

Note that a basic shadow gain adjustment can be determined relating to the expected simple shadow gain coming from the difference in peak brightness between the SDR and IDR image as: ShadBst=SG_IDR/P_IoS. As said, P_IoS is the maximum codeable luminance of the IDR image when represented on the normalized luma axis of the SDR image, i.e. e.g. 7.0.

Note that there are some practical embodiments in which the highlight gain cannot be larger than a predefined number (in the way the ETSI standard codifies highlight gains), in which case a further re-calculation of the highlight gain is needed, see below, but this is not essential for all embodiments. This can be realized e.g. as:

$$\text{If } HG\_IDR > KLIM \text{ then } HG\_IDR\ adj = KLIM \quad [\text{Eq. 14}],$$

with KLIM preferably being equal to 0.5.

Indeed, suppose the grader has made a HG_gr close to the maximum value of 0.5, and a corresponding HG_ca (which as a softer mapping should have a HG_ca closer to the diagonal, i.e. larger than HG_gr) is e.g. 0.75, then we find that the division is 0.67, which is higher than the max. which can be communicated according to a pure ETSI2 HDR video signal as standardized. A solution is e.g. to re-define a smaller HG_gr so that HG_IDR will not be higher than 0.5, the standardized maximum. This needs again a considerable calculation taking all re-grading aspects into account, as will be shown below. Another option is e.g. to make the IDR+ metadata signal compliant by limiting the HG_IDR to 0.5, whilst communicating as additional metadata the exact non-limited HG_IDR. The HG_gr will typically depend on the PB_C of the Mster_HDR image, but also what kind of image objects are in the image (e.g. bright colorful objects, which are important enough not to get too much compression of their luminances, an extreme example being an image of a bright planet near a powerful sun, which is graded with many very high L_Mster_HDR luma values and few dark ones). The HG_ca will typically depend inter alia on how close the selected PB_IDR is to the PB_Mster_HDR.

Furthermore, assume that $$WP\_IDR = WP\_gr \quad [\text{Eq. 15}]$$

As said, other embodiments are possible, but to elucidate the principles in an easier manner, we make for now that assumption.

With Eqs. 6 the appropriate channel-adapted values of the black level offset and white level offset were calculated (if any such offsets were defined by the content creator). Remains now how to calculate (by the IDR video encoder) corresponding values of BLO_IDR and WLO_IDR.

First in a preferred manner of encoding a value glim is calculated:

$$\text{glim} = \{\log[1+(rhoSDR-1)*\text{power}((0.1/100);1/2.4)/]$$
$$\log(rhoSDR)\}/\{\log[1+(rhoHDR-1)*\text{power}(1/$$
$$PB\_Mster\_HDR;1/2.4)/]\log(rhoHDR)\} \quad [\text{Eq. 16}]$$

with rhoSDR=1+32*power(100/10000;1/2.4), and $$rhoHDR=1+32*\text{power}(PB\_Mster\_HDR/10000;1/2.4)$$

This will lead to an easy manner to adapt the BLO, because actually in the ETSI1 and ETSI2 standard approach of HDR encoding there is in parallel to the luminance processing chain (units 402-406 in FIGS. 4 and 1502-1506 in FIG. 15), which Figures for ease of understanding only elucidated the partial sequential re-grading steps of applicant's approach, also a linear gain limiter applying a linear curve with an angle glim to the perceptualized Y'HP and comparing with the Y'GL value as calculated by the units explained, and taking a max of the two values calculated in parallel (this is inter alia important for the reversibility of ETSI1, to allow reconstruction of the darkest HDR lumas).

It can now be shown that due to the action of this limiter, the BLO values can be easily channel-adapted with the following equation:

$$BLO\_IDR = BLO\_gr*\text{glim} \quad [\text{Eq. 17}]$$

glim as shown above depends on the particular choice of PB_Mster_HDR, and can e.g. be 0.6.

Figure 17:
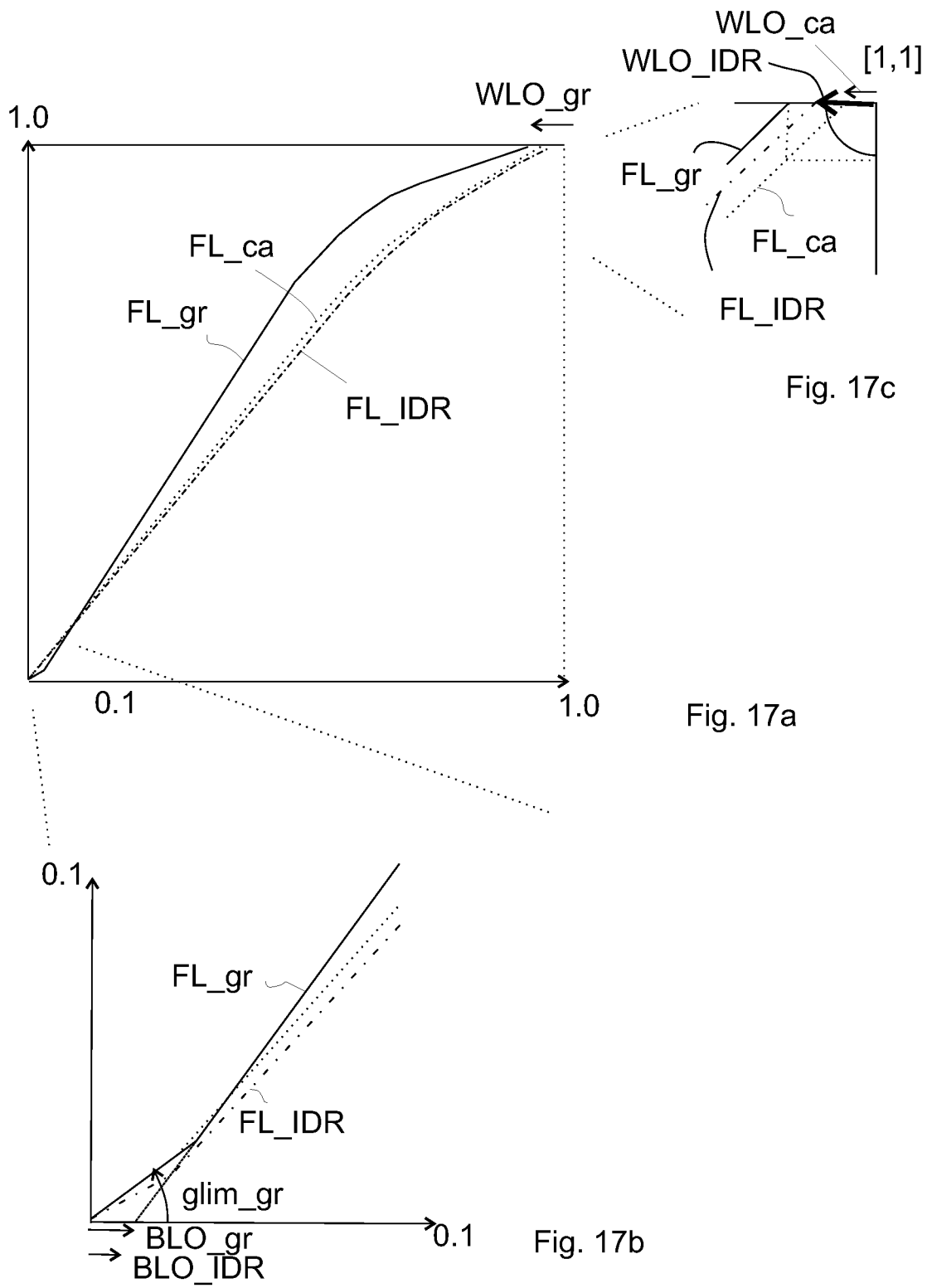
FIG. 17 elucidates some further aspects of channel adaptation of black and white offsets (BLO & WLO) to accompany and simplify the below math, and give the generic physical-technical rationale.

This is illustrated with FIG. 17. FIG. 17b shows a zoom-in for the darkest lumas of a full-range luma mapping shown in FIG. 17a. Various functions are again shown on a normalized plot, which functions correspond to various input PB_C and output PB_C.

FL_gr is the function as created by the content creator for mapping e.g. 4000 nit Mster_HDR to SDR. The dotted curve FL_ca is the channel adaptation to make e.g. 500 nit IDR from the Mster_HDR. The dashed curve FL_IDR is the curve to map the IDR lumas to SDR lumas. In the zoomed-in plot of FIG. 17b we see that the FL_gr curve has a sharp kink at input around 0.03, which is where the parallel gain limiter kicks in (i.e. its linear output y=glim*Y'HP gets selected as the function output for lower luma inputs instead of the Y'GL value coming out of the action of all units in the chain as shown in FIG. 4 (for a full circuit description see ETSI1 standard FIG. 4)).

The BLO value of any curve is the intersection with the horizontal axis which would occur if there was no gain limiting, i.e. e.g. the BLO_gr shown by extending the local slope above 0.3 of the FL_gr curve as does the dotted line.

For this application, it suffices to know that one can also extend the FL_IDR curve to obtain a BLO_IDR value (note that there is a glim_IDR value, which the ETSI2 standard will use, which is different from glim_gr), and that this lower BLO_IDR value can be found as glim*BLO_gr (note that this glim, the only glim one has to calculate for SLHDR2PLUS, is what we show in FIG. 17b as glim_gr).

Subsequently the following calculations are performed to obtain the WLO_IDR.

What FIG. 17a also shows is that there are three different WLO's, namely the WLO_gr originally made by the grader as his master HDR-to-SDR mapping strategy (also the ON in FIG. 12b), the channel-adapted WLO_ca where the FL_ca curve crosses the upper horizontal line, and which is the mapping of the WLO_gr luma onto the IDR luma axis (which can be envisioned with representations like FIG. 12, where the MXH projects to MXI, and lastly there is also a WLO_IDR, which is the WLO remaining for luma mapping the IDR lumas down to SDR (which is not the same as the scaled WLO_ca because the normalized luma abscissa axis definition changes when starting from an associated PB_C=5000 for WLO_gr and WLO_ca, since the input image for re-grading with those functions is the 5000 nit Mster_HDR, to PB_C=1000 nit for the IDR-related definitions of the re-graded needs, since in that ETSI2-compliant view the starting image to derive other images from which gets received is the e.g. 1000 nit PB_C IDR image).

FIG. 17c zooms in on that upper corner (near [1,1]) of the functions plot. The WLO_IDR value follows from sending the WLO_gr value as an input through the FL_ca curve, as shown by the circular projection from a (normalized) ordinate position to an abscissa position. We see on FIG. 12b that the MXI position is indeed the normalized position on the IDR luma axis which gets mapped to a SDR luma of 1.0, ergo this is what is needed by definition as the WLO_IDR.

One may prima facie think that if the mapping curve through which a WLO value subsequently goes at an encoding side is a para (see FIG. 4 unit 404 mapping after unit 403), that it is typically the upper linear segment of the para which will be involved.

However, because of how the para is defined, any part of it can be involved (there are even settings where merely a special value of the SG of the para defines a very high intersection point moving theoretically above 1.0, ergo the behavior in that case up to the brightest lumas is determined by the shadow gain slope only, leading to a linear curve which is useful for re-grading to SDR a HDR image which contains mostly very bright lumas, like e.g. of a desert planet being illuminated by 5 suns in a sci-fi movie). Ergo, this becomes a somewhat involved calculation where it needs to be tested which of the three sub-parts of the para is applicable, the preferred mathematical realization being:

$$WLO\_co=255*WLO\_ca/510$$

$$BLO\_co=255*BLO\_ca/2040$$

$$Xh=(1-HG\_ca)/(SG\_ca-HG\_ca)+WP\_ca$$

$$WW=(1-WLO\_gr*255/510-BLO\_co)/(1-WLO\_co-BLO\text{-}co)$$

IF $WW>=Xh$ THEN $WLO\_IDR=HG\_ca*(1-WW)$
*510/255 [the upper linear segment]

ELSE {

$$Xs=(1-HG\_ca)/(SG\_ca-HG\_ca)-WP\_ca$$

IF $WW>Xs$

{[the input i.e. WLO_gr has to mapped through the parabolic sub-part of the channel-adapted para]

$$A=-0.5*(SG\_ca-HG\_ca/(2*WP\_ca))$$

$$B=(1-HG\_ca)/(2*WP\_ca)+(SG\_ca+HG\_ca)/2$$

$$C=-[(SG\_ca-HG\_ca)*(2*WP\_ca)-2*(1-HG\_ca)]^2/(8*(SG\_ca-HG\_ca)*2*WP\_ca)$$

$$WLO\_IDR=(1-(A*WW*WW+B*WW+C))*510/255$$

}
ELSE [in the special cases where the shadow gain sub-part of the para applies]

$$WLO\_IDR=(1-SG\_ca*WW)*510/255$$

}
These parameters SG_IDR, HG_IDR, WP_IDR, BLO_IDR, WLO_IDR (and similarly extra parameters for the customizable curve, if required) are the parameters characterizing and ergo being output as the function F_I2sCI (whether actually these parameters characterizing the shape of this needed curve to do display adaptation are output, or a LUT characterizing the function is output, is an embodiment choice only; the main thing is that the correct luminance mapping function shape F_I2sCI in the normalized to 1.0 axis system is co-communicated with the IDR image(s), as metadata).

The encoder is now characterized according to the novel SLHDR2PLUS approach. The question is then how a decoder should be designed. One must understand that this decoder will now get the F_I2sCI function only, so it must somehow calculate the function F_?? needed to reconstruct the original Mster_HDR image from the received IDR image. In this SLHDR2PLUS coding approach this would be the inverse of the F_H2hCI function used in the encoder to generate the IDR lumas, but such function should still be calculable.

Figure 11:
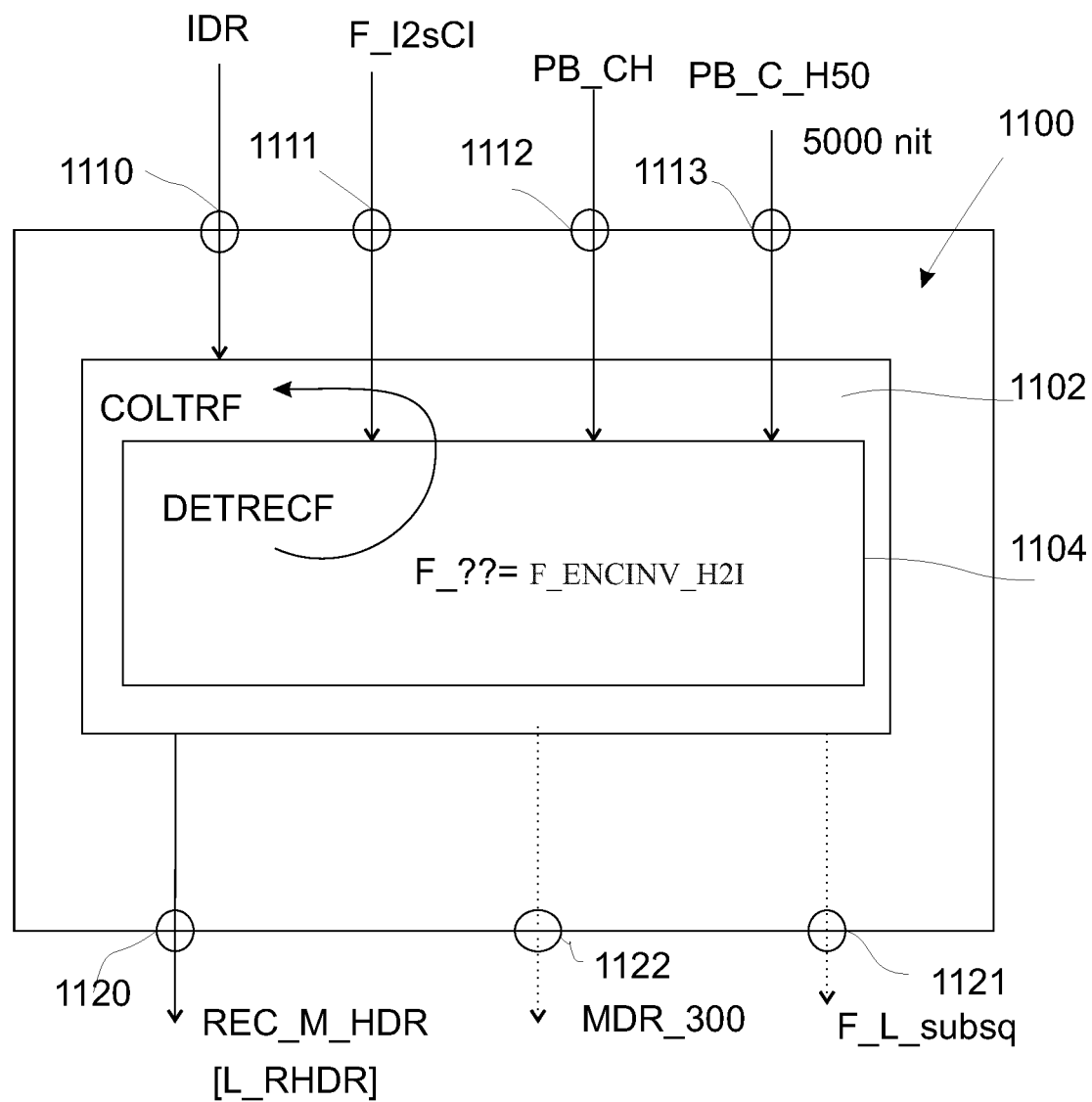
FIG. 11 shows a possible typical high level construction of a novel SLHDR2PLUS decoder that follows some of the embodiment teachings of the below described various possibilities to realize SLHDR2PLUS video communications.

As FIG. 11 elucidates generically, the SLHDR2PLUS video decoder 1100, a luminance function determination unit 1104 has to calculate the F_?? function based on only the information it receives, i.e. F_I2sCI, and the two peak brightnesses PB_CH and PB_C_H50. Once that function is determined, it can be applied to reconstruct the original Mster_HDR luminances, by applying it (in color transformer 1102) to the IDR lumas as received: L_REC_M_HDR=F_??(L_IDR), from which lumas the corresponding HDR luminances can be calculated, by applying the inverse of Eqs. 1 and 2 to those L_REC_M_HDR lumas. Finally the reconstructed master HDR image (REC_M_HDR) can be output by the color transformer 1102 in any format as desired, e.g. a PQ-based YCbCr color formulation, etc. The decoder 1100 may in preferred embodiments also be configured to calculate any display adapted image, e.g. MDR_300 in case a 300 nit PB_D connected display is to be supplied with the best equivalent of the HDR image as received, and this may either be done by the SLHDR2PLUS math, or just a regular ETSI2 decoding, since the appropriate image (IDR) and luminance mapping function (F_I2sCI) is already available as input in the color transformer 1102).

Figure 14:
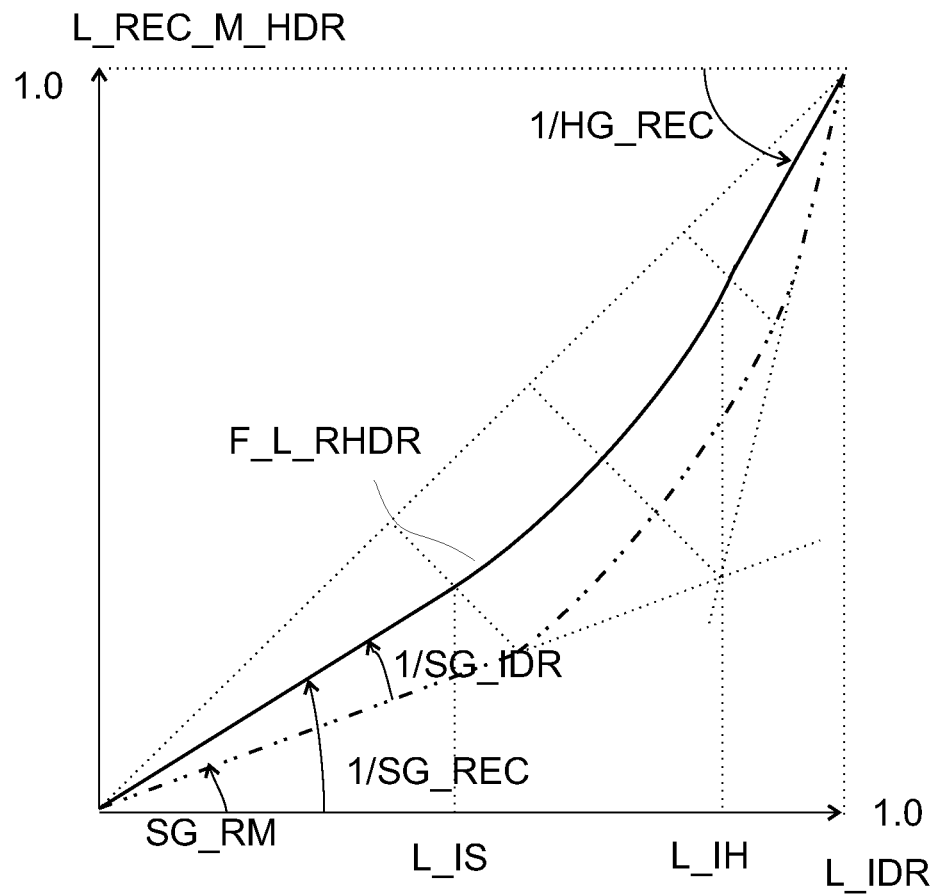
FIG. 14 elucidates some aspects of the inverse curve of a para, a so-called abcara.

FIG. 14 shows what is involved for the para, to reconstruct the REC_M_HDR image from the IDR image as received (similar calculations will be done for WLO and BLO, and the customizable curve shape points, where applicable (note that as discussed below, some embodiments will not apply the customizable curve philosophy between Mster_HDR and IDR, but only as a SDR downgrading technology, i.e. between IDR and SDR).

Now a new master HDR reconstruction shadow gain (SG_REC) and reconstruction highlight gain (HG_REC) need to be calculated, and an inverse parabolic equation for the parabolic segment has to be calculated to complete the needed reconstruction para luminance mapping function shape F_L_RHDR (note that merely for illustrative purposes the inverse SDR-to-Mster_HDR luminance mapping function has also been shown on this normalized graph as the dotted line; it should be noted that because of the inverse function property of SDR-to-HDR mapping, the shadow gain of that curve SG_RM equals 1/SG_gr, etc.).

Figure 15:
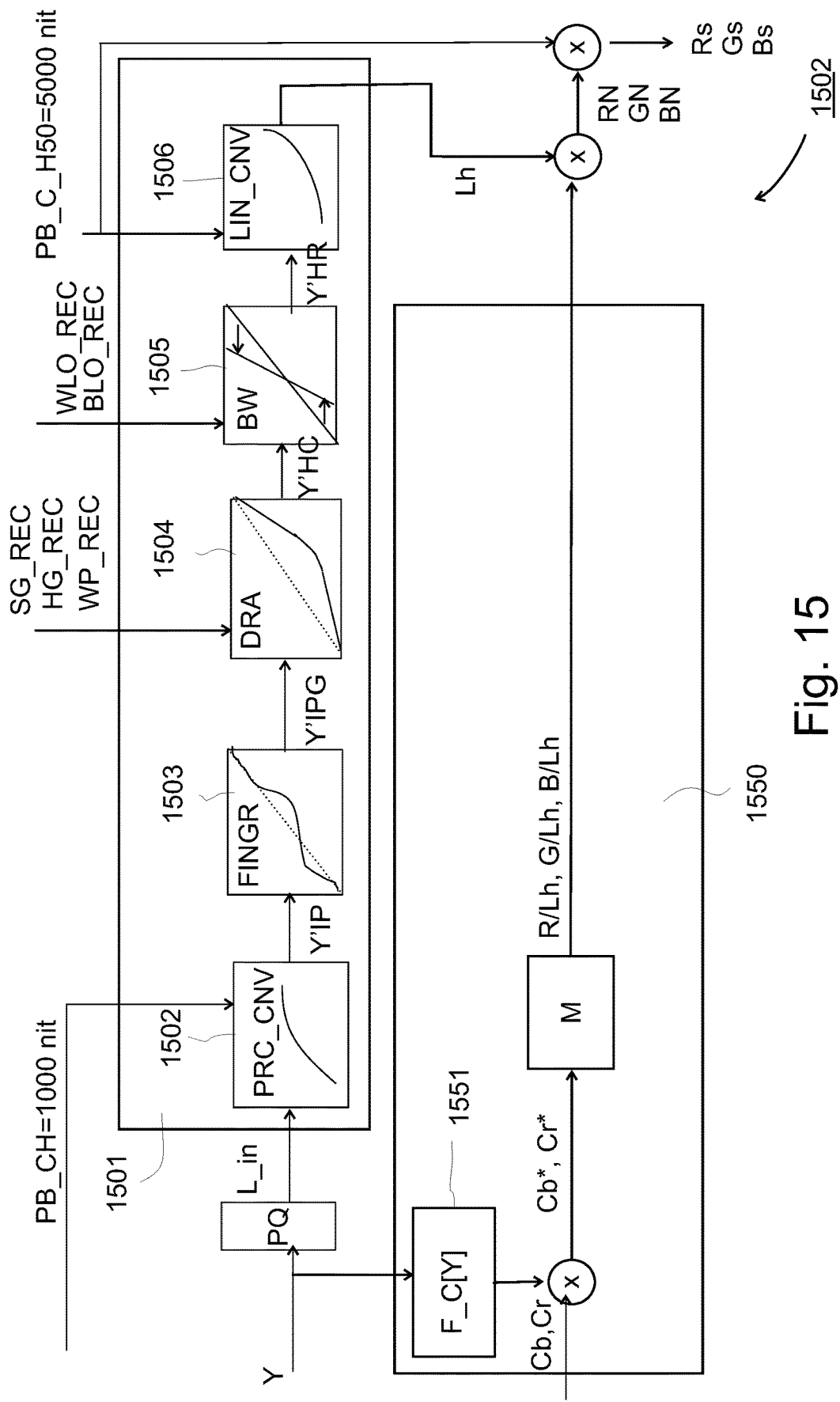
FIG. 15 details some aspects of a SLHDR2PLUS decoder.

FIG. 15 first elucidates some aspects of the typical decoder 1502 core calculation topology. As it can be seen, it is roughly the same structure as the encoder, despite it performs a re-grading in the opposite direction (reconstruction REC_M_HDR from IDR), which is handy as one can reconfigure such a calculation topology easy, as need would dictate. If luminance mapper 1501 gets a total LUT (of all the partial successive re-grading actions) it would indeed function in a similar manner like the encoder.

Of course some differences need to be configured to have the decoder do the correct HDR reconstructing re-grading.

Firstly, L_in will now be a IDR normalized luminance, and the output luminance Lh will be a normalized luminance which is correctly scaled for e.g. 5000 nit PB_D display rendering. We see also that the last multiplier, which yields the REC_M_HDR image pixel colors (Rs, Gs, Bs) now multiplies with the PB_C_H50 value as received in metadata. In fact the perceptualization outer calculation loop performed by perceptualizer 1502 and linearizer 1506 applies a PB_CH and PB_C_H50 value respectively in the Eqs. 1, 2 and inverse of those equations. It is also noted that now the order of the various partial re-gradings, to the extent they are present is reversed: first the perceptual IDR luma Y'IP is fine-graded by the inverse customizable curve in fine-grading unit 1503, yielding re-graded IDR lumas Y'IPG. Thereafter a first mapping to the HDR luma axis (i.e. corresponding re-distributed lumas for a corresponding correct HDR look, in fact a 5000 nit PB_C_H50 Mster_HDR look) is performed by coarse luminance mapping unit 1504, which applies the inverse para of FIG. 14, which still needs to be calculated correctly, and it will yield initial HDR lumas Y'HC. Finally, an inverse black-and-white offsetter 1505 will create the correct normalized REC_M_HDR lumas (Y'HR), to be used in the further calculations with the chromas, to arrive at the full three-dimensional color for each pixel. As explained, unit 1504 will typically get the calculated SG_REC etc. (or a LUT version of the luma mapping function to be applied corresponding to these three values). Note that if the various PW values were kept identical, then WP_REC is again WP_gr. Unit 1505 will similarly get the black and white offset for the reconstruction of the Mster_HDR (WLO_REC, BLO_REC). The lower part of the core unit doing the chromatic processing (chrominance processor 1550) will be similar to the encoder topology of FIG. 4, except for the loading of the correct C_LUT F_C[Y] in chromatic processing determination unit 1551 (see calculation of this explained below).

The question is now whether and how the parameters of the functions to be applied in the decoder programmed to reconstruct Mster_HDR from IDR can be calculated (this is a situation that didn't occur before in HDR video decoding).

E.g., we can see the approach for the shadow gain.

Before calculating SG_REC, we can ask whether the total shadow gain SG_RM from SDR to Mster_HDR can be determined, and from that we could then via the division of Eq. 12 determine the SG_REC.

So $SG\_IDR = SG\_gr/SG\_ca$

One can also show that $SG\_ca=(mx/mxca)*(SG\_gr+1)-1$

This can be seen because myca=SG_ca*mxca (by the definition of the lower linear segment of the channel adapted para), and also myca=my−d=mx*SG_gr+(mx−mxca).

The second relationship of mxca/mx follows by dividing the upper equation of Eqs. 9 by mx.

Since by filling in the first relationship into the second (removing the mx/mxca part) one can write SG_ca in terms of SG_gr, an ultimate relationship is now formable between SG_IDR and SG_gr:

$$SG\_ca=(SG\_gr+1)/[(SG\_gr-1)*(1-sc^*)/2+1]-1$$

Wherefrom:

$$SG\_IDR = SG\_gr/\{(SG\_gr+1)/[(SG\_gr-1)*(1-sc^*)/2+1]-1\} \quad \text{[Eq. 18]}$$

This equation can now be solved for the unknown SG_gr, given the known (received) SG_IDR (and sc* was calculated only from peak brightnesses, which are also known, since both PB_CH i.e. PB_IDR and PB_C_H50 are received and PB_SDR is usually 100 nit, but can also be put in metadata of the signal if not).

Call SG_IDR=y and SG_gr=x for simplified notation, then:

$$y=[(x-1)*(1-sc^*)*x/2+x]/[x-(x-1)*(1-sc^*)/2]$$

$$\text{ergo:} x^2+x*(y-1)*[(sc^*+1)/(sc^*-1)]-y=0 \quad \text{[Eq. 19]}$$

[those coefficients (called herebelow A', B', C') being functions of y and sc* will be used below to solve the quadratic equation, in the total system of equations for reconstructing the Mster_HDR image's lumas].

To determine all parameters giving the shape of the reconstruction luminance mapping function, the following equations may typically be done in one of the embodiments (this reconstructs the reverse of the function that was used to generate the IDR image at the encoder side). First the correct para is determined, from which the black and white offsets are subsequently calculable.

rhoSDR is again calculated as above, and rhoCH is calculated as:

$$rhoCH=1+32*power(PB\_CH/10000;1/2.4)$$

$$mu=\log[1+(rhoSDR-1)*power(PB\_CH/PB\_SDR;1/2.4)]/\log(rhoSDR)$$

$K$ and $La$ and $sc^*$ are calculated as above, with $K=P\_HoS$ and $La=P\_HoI$ $$A'=1$$

$$B'=(SG\_IDR-1)*(sc^*+1)/(sc^*-1)$$

$$C'=-SG\_IDR$$

Once having been able to determine at the decoder side the necessary parameters of all needed functions (mind: from other received available parameters SG_IDR etc.), the rest of the decoding is because of the reversibility just applying the inverse curve(s) of the encoding, e.g. a para like in FIG. 14 (suitably shaped by having calculated its appropriate defining parameters 1/SG_REC etc.) will undo the action of the IDR encoding para as illustrated in FIG. 10, i.e. define the re-decoding of IDR to Mster_HDR lumas, etc.).

Therefrom follows $$SG\_gr=[-B'+\text{SQRT}(B'^2-4*A'^*C')]/2*A'$$

Where ^2 indicates a square power.

$$SG\_REC=SG\_gr/SG\_IDR \quad \text{[Eq. 20]}$$

So the inverse channel-adaptation shadow gain (1/SG_REC) is already known.

Similarly the needed highlight gain can be calculated.

$$A''=(SG\_REC*HG\_IDR-SG\_gr)*(SG\_gr+1)/(SG\_REC+1)$$

$$B''=SG\_gr-HG\_IDR-(SG\_REC*HG\_IDR-1)*(SG\_gr+1)/(SG\_REC+1)$$

$$C''=HG\_IDR-1$$

$$\text{MxRec}=[-B''+\text{SQRT}(B''^2-4*A''*C'')]/2*A''$$

IF MxRec=1 THEN $HG\_REC=0$

ELSE=$HG\_REC=\max[0,(\text{MxRec}*SG\_gr-1)/(\text{MxRec}-1)]$

As a para function is defined from its parameters, once they are calculated the needed para is defined.

For obtaining BLO_REC and WLO_REC the following equations are performed:

$$mx=(1-HG\_gr)/(SG\_gr-HG\_gr)$$

$$mxca=mx*(SG\_gr-1)*(1-sc*)/2+mx$$

$$myca=mx*(SG\_gr+1)-mxca$$

$$SG\_ca=myca/mxca$$

IF $mxca=1$ THEN $HG\_ca=0$ ELSE $HG\_ca=\max[0, (myca-1)/(mxca-1)]$ $$ScaleHor=(1-1/La)/(1-1/K)$$

$$RHO=1+32*power(PB\_C\_H50/10000;1/2,4)$$

glim={log[1+(rhoSDR−1)*(0.1/100)^(1/2.4)]/log(rho-SDR)}/{log[1+(RHO−1)*(1/PB_C_H50)^(1/2.4)]/log (RHO)}; [as before; the same glim as used by the encoder, because in the ETSI approach this a fixed parallel bypass of the Im_PB_C_1< >Im_PB_C_2 mechanism, those two images being defined as re-graded starting from the same PB_C_1, and in this specific SLHDR2PLUS approach being respectively the Mster_HDR and IDR image]

BLO_gr=BLO_IDR/glim [the inverse of Eq. 17, so this is relatively easy determined without needing higher order equations, and subsequently we need only apply the fixed channel-adaptation mechanism to obtain the needed WLO_REC, which equals the WLO_ca used by the encoding, but will now be inverted, addition becoming subtraction]

$$BLO\_REC=BLO\_ca=BLO\_REC*ScaleHor$$

Subsequently the WLO_REC is calculated by projecting it through the para, as was the encoding principle, to be subsequently inverted.

IF $HG\_ca=0$ $WLO\_REC=0$

ELSE

{

$$BLO\_co=255*BLO\_ca/2040$$

$$Xh=(1-HG\_REC)/(SG\_REC-HG\_REC)+WP\_REC$$

$$Xh\ REC=HG\_REC*Xh+1-HG\_REC$$

$$WW\ REC=1-WLO\_IDR*255/510$$

IF $WW\ REC>=Xh\ REC$ THEN $WCA=1-(1-WW\ REC)/HG\_REC$

ELSE $$Xs=(1-HG\_REC)/(SG\_REC-HG\_REC)-WP\_REC$$

$$Xsca=SG\_REC*Xs$$

IF $WW\ REC>Xsca$

{

$$A'''=-0.5*(SG\_REC-HG\_REC)/(2*WP\_REC)$$

$$B'''=(1-HG\_REC)/(2*WP\_REC)+(SG\_REC+HG\_REC)/2$$

$$C'''=-[(SG\_REC-HG\_REC)*(2*WP\_REC)-2*(1-HG\_REC)]^2/[8*(SG\_REC-HG\_REC)*(2*WP\_RE)]$$

$$WCA=(-B'''+SQRT(B'''^2-4*A'''*\{C'''-WW\ REC\}))/(2*A''')$$

$$WCA=\min(WCA,1)$$

}

ELSE $WCA=WW\ REC/SG\_REC$ $$WLO\_REC=(1-WCA)*(1-BLO\_co)/[(1-WCA*ScaleHor)*(510/255)]$$

It should be noted that whereas the BLO is indeed mapping-wise a pure additive contribution, the WLO converts into a multiplicative scaling to the maximum (e.g. in FIG. 4):

$$Y'HPS=(Y'HP-BLO)/(1-BLO-WLO) \qquad [\text{Eq. 21}]$$

All this information can typically be filled into a single luminance processing LUT, which relates e.g. in the perceptual domain Y'IP to Y'HR (or better still a total LUT which defines Lh for each L_in value). This would reconstruct the REC_M_HDR image.

As mentioned above, it is also useful if the decoder can directly output a display adapted image, e.g. MDR_300.

Figure 16:
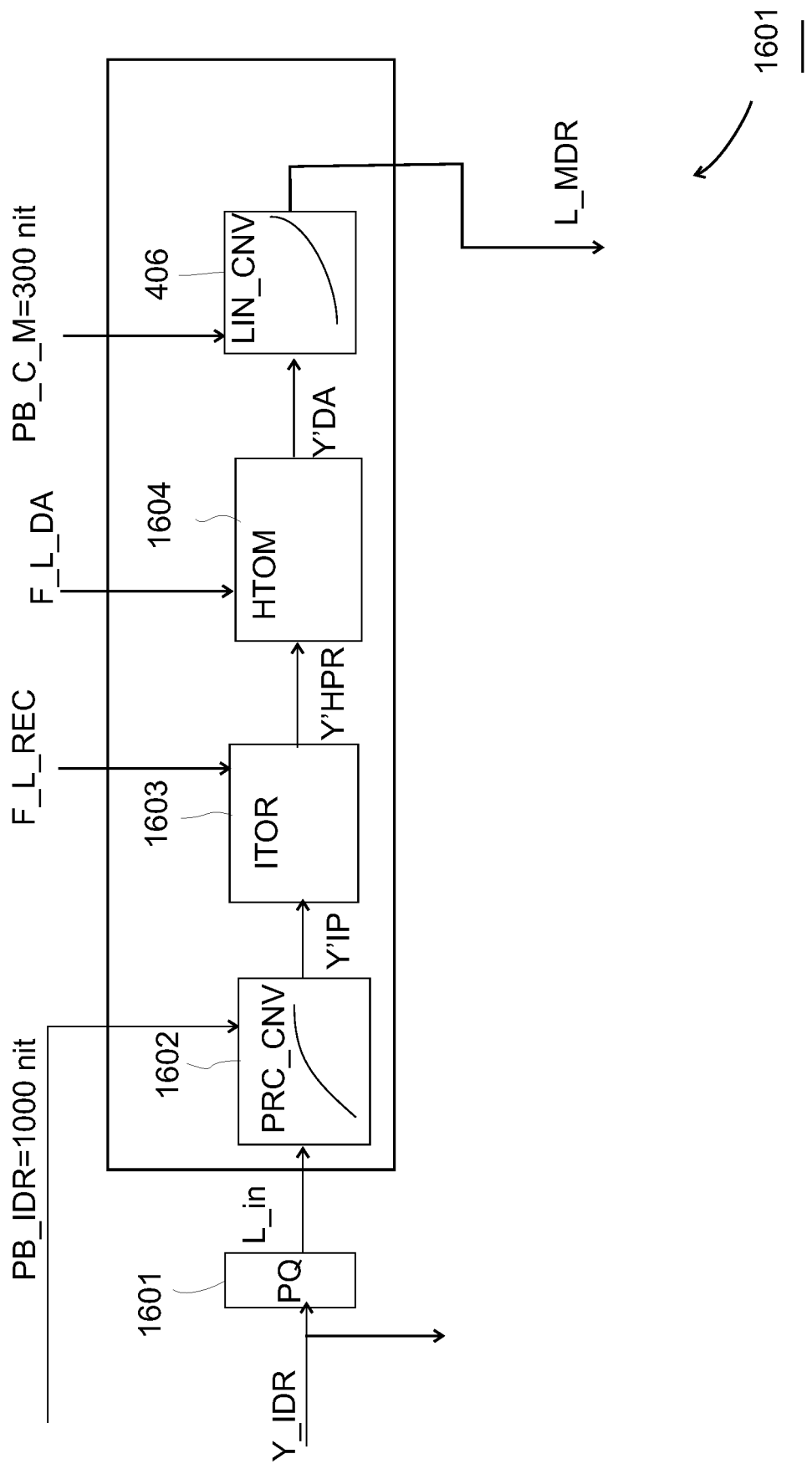
FIG. 16 elucidates a useful manner to implement display adaptation to calculate MDR image for any particular PB_D display integrated with the present application's new technical SLHDR2PLUS coding principles.

For this the following technology can be used as elucidated with FIG. 16 (where two partial LUTs are used, in practice it is most useful to just load one LUT, called P_LUT, since the luminance calculation upper track is in preferred core calculation units, e.g. the per pixel color processor of a dedicated decoding IC, typically embodied simply as a LUT. Y_IDR luma values are input (e.g. typically PQ-based YCbCr encoded), and they are converted by linearizer 1601 into normalized luminances L_in. A perceptualizer 1602 works as explained above (Eqs. 1 and 2), and uses the RHO value for the IDR peak brightness PB_IDR, e.g. 1000 nit. This yields perceptualized IDR lumas Y'IP. A luminance mapping unit 1603 reconstructs the master HDR image as explained above, i.e. it gets all calculated parameters defining the IDR to MsterHDR reconstruction luminance mapping function F_L_REC, or typically the LUT of that function shape. This yields reconstructed MsterHDR lumas Y'HPR. This image forms a good basis to calculate images of lower dynamic range/peak brightness PB_C. Basically this operates like the ETSI2 mechanism, provided the correct functions are applied. These functions can be scaled from the F_L_IDR co-communicated as metadata, or calculated from the reconstructed F_50t1 function which is a reconstruction of what the content creator defined at his side as the optimal function to calculate the master SDR image from the Mster_HDR image. This F_50t1 function can then be calculated into the appropriate display adaptation function F_L_DA for e.g. a 300 nit PB_D, according to the principles defined in the ETSI2 standard (the reader is referred to that standard for this detail). This is loaded into HDR to MDR luminance mapper 1604, in case there is one. In practice the single P_LUT will contain the total action of F_L_REC and subsequently F_L_DA.

Finally the obtained MDR relative luminances are sent to the first multiplier 454 of FIG. 4, to do the same processing (also with the correct accompanying F_C[Y]).

Finally the appropriate C_LUT (F_C[Y] in respectively FIG. 4 or FIG. 15) needs to be calculated, which gives the luminance re-graded output colors their appropriate chrominances (to have as close as possible a look to the Mster_HDR image, i.e. the chromaticities of the output image pixels and the Mster_HDR image should to the extent possible given the different smaller dynamic range be approximately identical).

The C_LUT for the Mster_HDR reconstruction is as follows (other re-grading C-LUTs computations follow similar principles, e.g. taking into account the teachings of ETSI2).

First a CP-LUT is calculated, which is the inverse of the above-mentioned P_LUT which was applied at the encoder to map the Mster_HDR image to the IDR image (so in the decoder this inverse chrominance correction will be used to reconvert from the IDR image chrominances Cb and Cr as received to the Mster_HDR reconstructed chrominances).

The C_LUT for Mster-HDR reconstruction can then be computed as:

$$XH = v(PB\_M\_HDR;10000)$$

$$XS = v(PB\_SDR = 100;10000)$$

$$XD = v(PB\_D;10000)$$

$$XC = v(PB\_CH;10000)$$

With v again the function v(x,RHO) as defined by Eqs. 1 and 2 above.

$$CfactCH = 1 - (XC - XS)/(XH - XS)$$

$$CfactCA = 1 - (XD - XS)/(XH - XS)$$

$$C\_LUT[Y] = [1 + CfactCA*power(CP\_LUT[Y];2.4)] / [Y*\{1 + CfactCH*power(CP\_LUT[Y];2.4)\}] \quad [\text{Eqs. 22}]$$

The display target PB_D can be set to PB_Mster_HDR for reconstruction, in which case only the divider remains as C_LUT determiner. In a practical embodiment the power 2.4 can also be included in the LUT as e.g. CPP_LUT=power (CP_LUT[Y];2.4) which may save some computations in some embodiments.

It was said above that some practical embodiments (for current ETSI2 metadata definition compliance) of the SLHDR2PLUS encoder re-calculate the HG_gr for compliant HG_IDR values. This can be done as follows.

E.g., the metadata may have reserved an 8-bit code word for the HG of the para, i.e. in this case since the IDR image+its metadata is supposed to be an ETSI2-compliant signal, the question is whether the needed HG_IDR will fit in the allocated code. The standard typically uses a code allocation function to transform the physically needed HG_IDR into some HG_COD: HG_COD in [0,255]=F COD[HG_IDR]. E.g. FCOD can be 128*(4*HG_IDR), which means that a max. of 255 corresponds to a max. HG_IDR of 0.5

We want to make sure that the IDR image is so generated that the HG_IDR just fits into the code range, i.e. a pragmatic embodiment may realize this by somewhat adapting the HG_gr of the grader (so that with the fixed channel-adaptation and thereupon based IDR metadata determination that overflow is just avoided).

Calculations for this (optional) embodiment may be e.g.:

Set HG_IDR=(254*2)/(255*4);

Exposure=shadow/4+0.5 [with shadow being the ETSI2 codification of shadow gains SG_gr]

SG_gr=K*exposure $$A = SG\_gr*(HG\_IDR-1) - 0.5*(SG\_gr-1)*(1-sc*)*(HG\_IDR+SG\_gr)$$

$$B = SG\_gr - HG\_IDR + 1 + 0.5*(SG\_gr-1)*(1-sc*)*(HG\_IDR+1)$$

$$C = HG\_IDR - 1$$

$$MxLM = [-B + \text{sqrt}(B*B - 4*A*C)]/(2*A)$$

IF MxLM=1 THEN HG_gr_LM=0

ELSE HG_gr_LM=max[0,(MxLM*SG_gr-1)/(MxLM-1)]

Where HG_gr_LM is the adjusted HG_gr value. The rest of the algorithm will then work as described hereabove, just as if the grader selected the optimal HG_gr_LM value from the beginning.

This details one method to approach the SLHDR2PLUS new codec design problem. There are alternative manners, depending on technical choices made, in particular which aspects one finds of key importance, versus which other aspects one may relax.

The above mathematics define a totally new manner to implement the HDR decoder, be it at least with a core calculation approach consistent with the ETSI1 and ETSI2 approaches: in particular, though differently shaped P-LUT and C_LUT functions will be calculated as they above illustrates (despite FIG. 4 and FIG. 15 detailing the technical-physical philosophy behind how our HDR coding approach works and why, in practice the whole luma processing which is equivalent to a luminance processing [in a one-dimensional color aspect those two being related via a non-linear be it image-dependent functional transformation] in luma processing track 401 respectively 1501 is performed by loading the correct total P_LUT luma mapping function shape, and similarly for the C_LUT called F_C[Y] in respectively unit 451 and 1551), the calculation topology is re-usable, which is a highly useful property for customers (they have to buy an IC in e.g. a STB once, and it can be reconfigured to various new coding philosophies, by reprogramming the metadata handling, but maintaining the per-pixel color transformation engine).

One can also design an IDR coding technology which re-uses the same ETSI2 decoding mathematics in-depth (i.e. the chain of partial re-gradings 1503-1505), by merely instructing the ETSI2 decoder to suitably extrapolate instead of its normal task of down-grading the image received, the display adapt it to display of PB_D<PB_IDR. It should be emphasized that such is not a "blind" extrapolation, which gives "just any" higher dynamic range image look corresponding to the look (i.e. in particular the statistical distribution of the relative lumas or absolute luminances of the IDR pixels) of the IDR image, but actually produces "automatically" by this manner of encoding a HDR output image which looks as close as possible like the original Mster_HDR image of the content creation side (which is also in such embodiments still not actually received, nor is its metadata, e.g. SG_gr, received). This automatically is of course not so simple, and involves the correct approach at the content encoding side. For the decoder in embodiments of this philosophy, the PB_C_H50 received secondary peak brightness functions in the programming of the core per-pixel decoder equivalently as if it was a desired display brightness PB_D (which is then e.g. 5× higher than PB_IDR).

Figure 18:
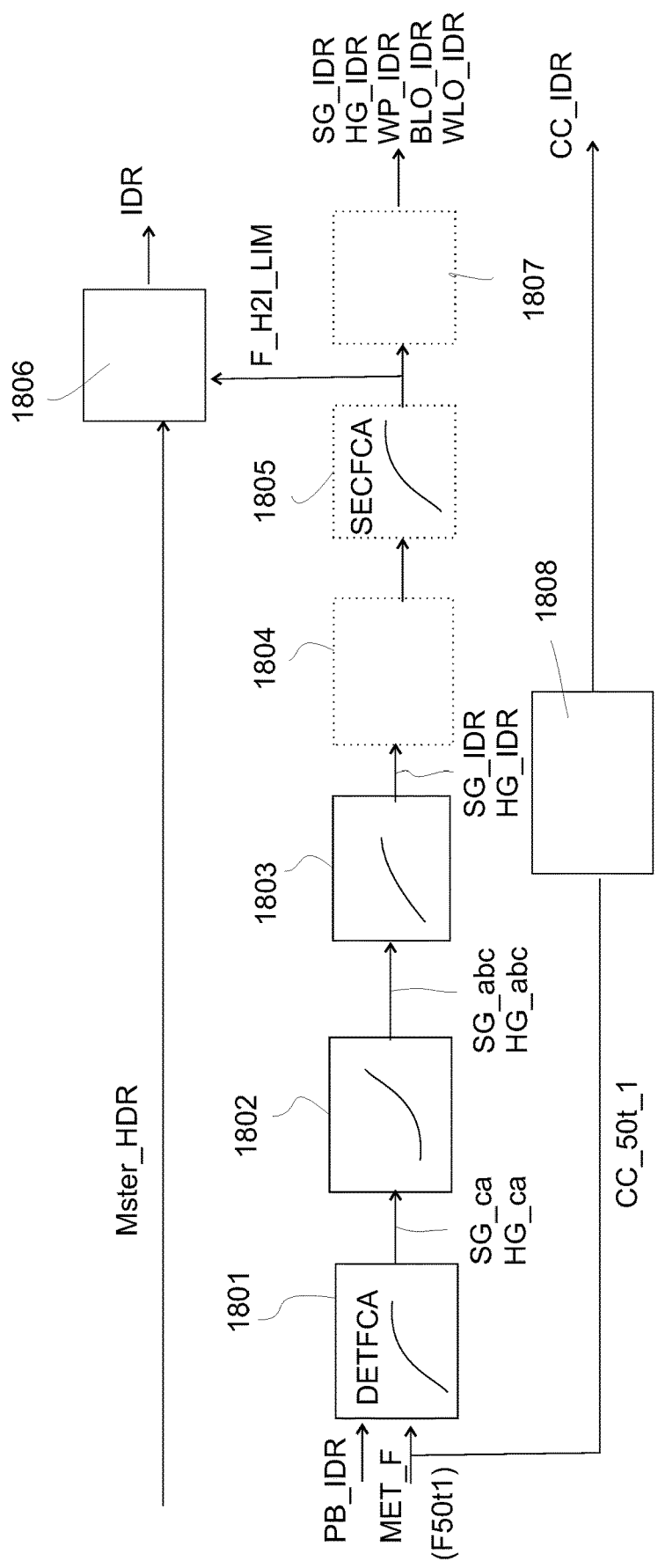
FIG. 18 shows another embodiment of SLHDR2PLUS encoding (or actually several teachings of various embodiment combinations elucidated with one figure), which is in particular useful because the encoded images can be directly decoded by standard already deployed ETSI2 decoders.

FIG. 18 elucidates this approach (block scheme of how the encoder math works conceptually). Furthermore we will for simplicity assume (although these selections are not necessarily linked as needing to be so to this example) that the freedom of choice of the fixed channel adaptation algorithm was selected so as to only do a para transformation linking Mster_HDR and IDR, and leaving any BLO and WLO (if applicable to the current image or shot of images already) and customizable curve to the secondary transformation i.e. the IDR-to-SDR re-grading, and the metadata belonging to the ETSI2-compliant IDR signal to be communicated to receivers (whether legacy ETSI2 receivers or SLHDR2PLUS decoding receivers).

We first need some introductory definitions:

The inverse of a para curve as shown in FIG. 10, i.e. with the ETSI-standardized shape definition as formulated in above equations 4 and 5 and the parabolic middle part defined by $a*x^2+b*x+c$, is a curve which we shall in this text for conciseness call an abcara. According to ETSI1 section 7 (HDR signal reconstruction) it is defined as:

$$L\_out=1/SG*L\_in (\text{if } 0<=L\_in <=xS)$$

$$L\_out=-b/2a+sqrt(b^2-4*a*(c-L\_in))/2a \text{ (if } xS<L\_in <xH)$$

$$L\_out=1/HG*(L\_in-1)+1 \text{ (if } xH<=L\_in) \qquad [\text{Eqs. 23}]$$

With xS and xH being the points where the linear segments change into the parabolic middle section, in conformity with how the para was defined for encoding (or any other use).

Figure 20:
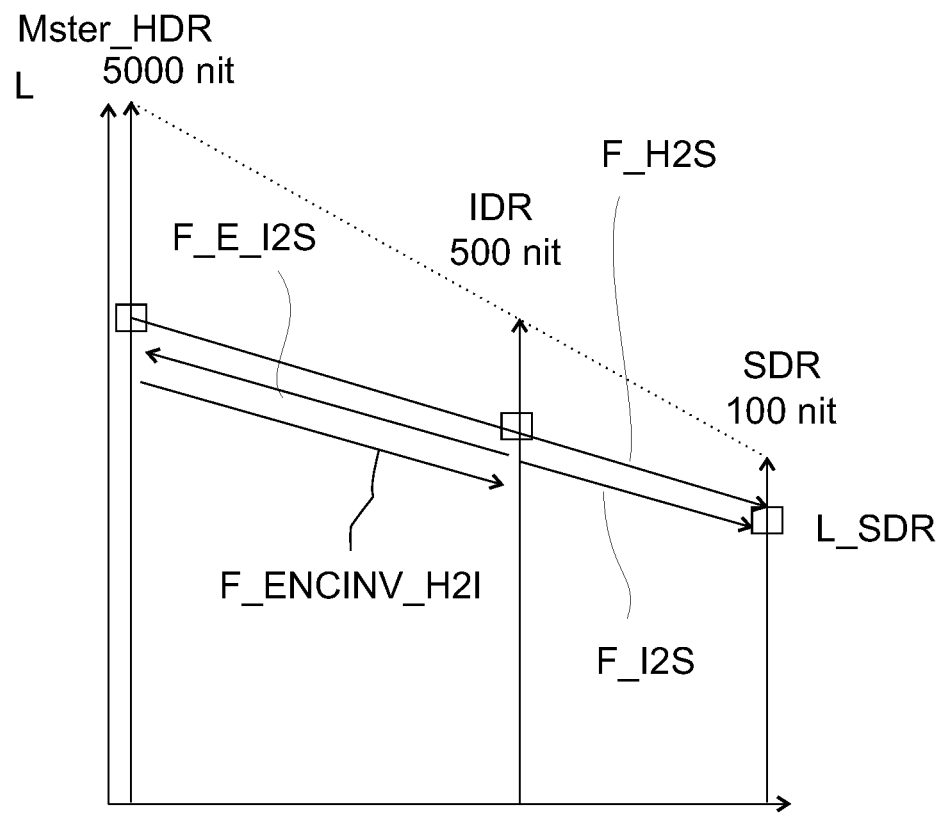
FIG. 20 shows underlying technical principles of the approach of FIG. 18 on a spectrum of re-gradable images.

The basic principle of what the video encoder embodiment of FIG. 18 is trying to achieve is shown in FIG. 20 (in this example we have chosen to elucidate the example of a 500 nit PB_C IDR, not wanting to say that this method is somehow limited to or more suitable for lower PB_IDR).

If we have a fixed mechanism (in an ETSI2-compatible or ETSI2 legacy decoder) to extrapolate from IDR to higher PB_C's than PB_IDR (using such PB_C setting as if it was a display peak brightness), then we could also design a coder which inverts that process, i.e. creates the IDR image by using the inverse F_ENCINV_H2I of the suitably adapted extrapolation luminance mapping function F_E_I2S (adapted from the F_I2S function which is conforming to the ETSI2 spec received by receivers of the IDR signal, i.e. IDR image+metadata including the F_I2S function), and subsequently adds the correct metadata, which as said would be F_I2S, which is to be derived from the total luminance mapping function F_H2S (e.g. F_50/1) as created by the content creator, e.g. a human grader, or an automaton in any intermediate real-time coding process, etc.

The relationships can also be formulated in multiplicative view:

$$L\_SDR=m\_F\_I2S*m\_F\_ENCINV\_H2I*L\_HDR=m\_F\_I2S*L\_IDR$$

$$L\_HDR=m\_F\_E\_I2S*L\_IDR$$

In which m_F_I2S or rather m_F_I2S(L_HDR) is a corresponding multiplier needed to realize the luminance re-grading per any selected L_HDR value, corresponding to the F_I2S luminance mapping function shape, and similarly for the other multipliers.

So one has to solve that an inverse of a para from HDR to IDR, i.e. an abcara working from IDR to HDR, has the same effect as some para being extrapolated to PB_HDR (starting on any L_IDR).

Figure 21:
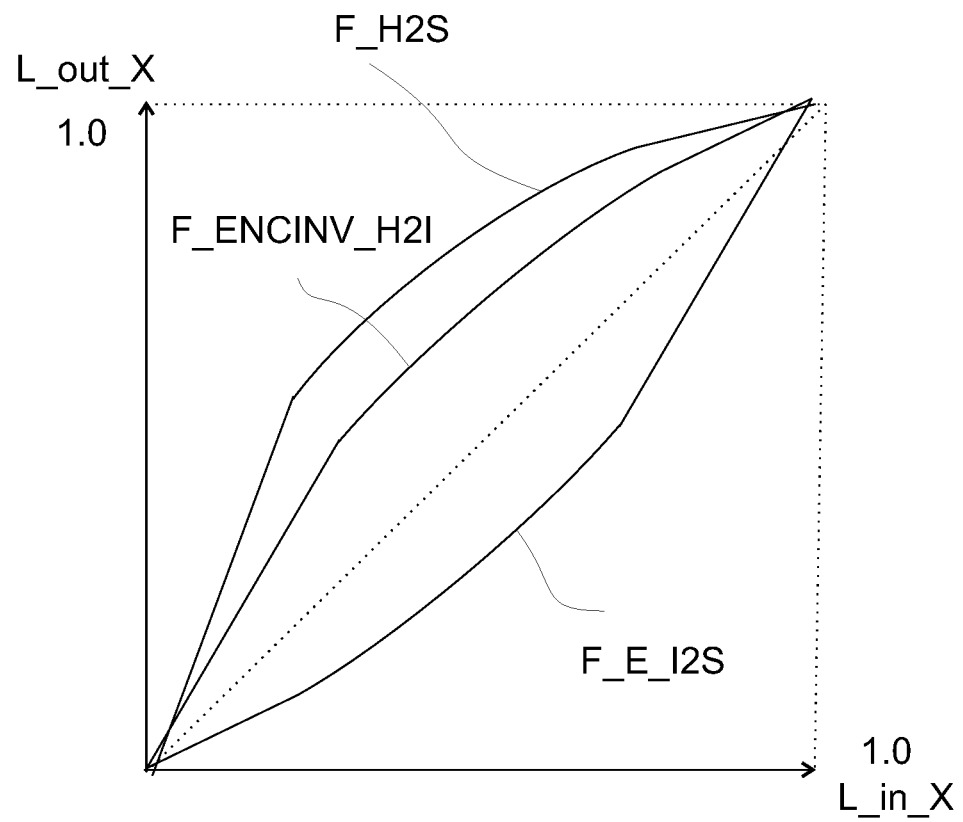
FIG. 21 elucidates extrapolation of an adaptation of a luma mapping function (e.g. a para) beyond a highest value of a starting image (corresponding to a unity transform or the diagonal in the plot), and therewith also a relationship between a specific selected para function shape and a corresponding abcara.

To understand that somewhat better we use FIG. 21. In normal interpolation mode from higher input image PB_C (i.e. working on any normalized input luminances L_in_X that correspond to actual luminances via a PB_Ch which is higher than the PB_D of the normalized output image luminances) to lower PB_D, the original grader's para F_H2S (as received in metadata by a standard ESTI2 coding video communication chain) would be diagonally scaled following the arrow towards the diagonal [0,0]-[1,1] yielding a F_ENCIV_H2I (which now corresponds to the visually uniformized pseudologarithmic distance ratio of PB_IDR/PB_HDR vs. PB_SDR/PB_HDR, i.e. of e.g. v(100/5000)/v(500;5000)=0.54/0.72 [wherein v(x;y) is the function of Eq.1 with abscissa x, and a RHO corresponding to y via equation 2]). One could imagine that continuing the re-grading behavior, from any higher to lower PB_D situation, through the identity processing mapping PB_HDR to PB_HDR, would yield curves becoming steeply descending, in fact for para species luminance mapping curves they would mathematically become abcaras. Indeed, the needed function for extrapolating any received IDR image (based on the starting luminance mapping function F_H2S as received in metadata, by using the ETSI2 Chapter 7.3 display adaptation mechanism) F_E_I2S would be the mirror function obtained by mirroring around the diagonal of F_ENCINV_H2I (and vice versa).

Ergo, what is left, given one wants to re-employ standard ETSI2 computation mechanisms to implement SLHDR2PLUS functionality, is to define the corresponding encoder, as elucidated with FIG. 18.

E.g., the SG of the F_ENCINV_H2I is in the abcara definition 1/SG*L_in_X.

In terms of the SG_COD (i.e. the ETSI-defined codification of the above physical-mathematical shadow gain SG), we get (SG_COD=SGC*255/2 juncto ETSI1 eq. C23 exposure=SGC/4+0.5 juncto C24 expgain=v (PB_HDR=5000/PB target=500; PB target) juncto eq. C27 SG=expgain*exposure):

$$1/[(SGC/4+0.5)*v(5000/500;500)]=(X/4+0.5)*v(500/5000;500) \qquad [\text{Eq. 24}]$$

To be solved for the unknown para Shadow gain control X (i.e. X being the SG of F_ENCINV_H2I).

Figure 7:
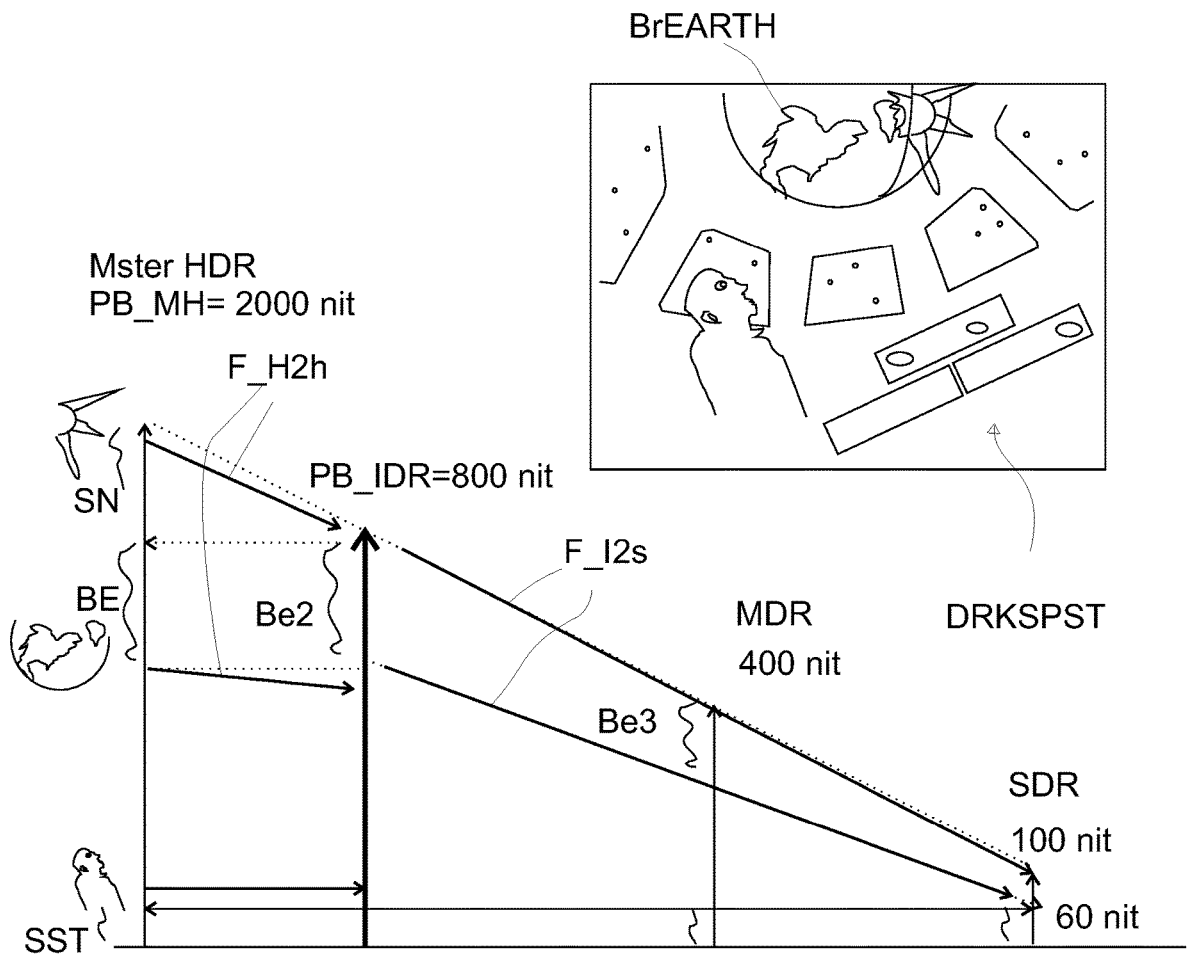
FIG. 7 explains a basic view on intermediate dynamic range (IDR) coding and communication of an original master HDR image, as well as the not to be confused concept of medium dynamic range images (MDR), which are typically calculated from any image received to optimize it for display on any particular display of display peak brightness PB_D as available, e.g. the particular HDR tv which was bought by any end consumer intending to view the HDR video which is received.
Figure 8:
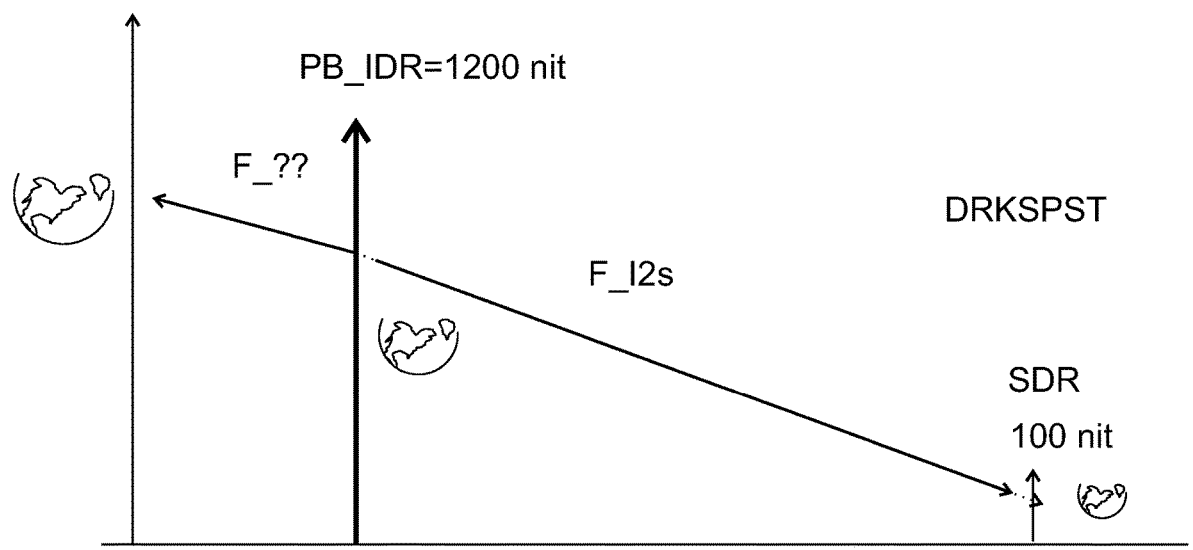
FIG. 8 further elucidates how to start approaching the IDR problem, in particular to solve it in a specific automatically calculable manner by decoders, and in particular if a least some of the decoders potentially receiving the content are ETSI2-compliant decoders already in the market, and perhaps not easily upgradable with the new SLHDR2PLUS technology (e.g. because the owner of the tv or STB doesn't upgrade it)

I.e. the decoder defines how, for any grader's F_H2S selection, what the F_E_I2S shape will be like (using the ETSI2 7.3 algorithm), but we need to interpret that as an ETSI1 abcara, so that we can relate that abcara with the corresponding needed inverse para F_ENCINV_H2I, to ultimately use in the new SLHDR2PLUS encoder the corresponding para, to calculate the IDR image luminances (in a first preferred embodiment of this specific species approach of the generic SLHDR2PLUS approach, i.e. the derivative calculations of luminance mapping functions using the second peak brightness; the white and black offsets will be ignored in this species, at least in the HDR< >IDR sub-range, because they will be applicable to the HDR< >SDR sub-range of the different PB_C images spectrum as shown in FIG. 7).

Now in practice the encoder works in the other order (but with the same relationships obeyed, to keep the system ETSI2-compliant). Channel adapter 1801 calculates (from the received F50/1 function shape) the para needed to transform the L_HDR lumas into the e.g. 500 nit PB_C L_IDR lumas (the channel adaptation math of the above-described previous embodiment can be used, but then ignoring the WLO and BLO adaptation, i.e. the para just works between two 0-1.0 luma representations without any offsets being involved, merely by applying a para only). Invertor 1802 calculates the corresponding abcara, using the inverse of Eq. 24 (i.e. with 1/X on the left being calculated given a known SGC on the right side of the equation). This is the mapping which will reconstruct L_HDR pixel lumas from L_IDR lumas as received. Assuming e.g. a WP which stays constant over the codec definition chain, invertor 1802 will hence calculate the shadow gain SG_abc and highlight gain HG_abc of the abcara. The lower track doing the metadata management will ultimately need to calculate the F_L_IDR (=F_I2S), so adapter 1803 determines the needed mapping function F_I2S (in particular its SG_IDR and HG_IDR) by applying in the inverse direction the algorithm of ETSI2 7.3 (realizing the remaining transformation F_I2S of the total transformation F_H2S if a partial luminance re-grading has already be done to the IDR image lumas by using F_ENCINV_H2I).

As already mentioned above, in some scenarios it may happen that the HG_IDR value falls above what can be coded ETSI2-compliant as HG_COD. What can be done in such a scenario is to limit said value of the HG_IDR to its maximum, and go back through the chain to what that means, in particular which different original grader's F_H2S function would correspond. All calculations can then be restarted from that situation, and that is what the optional units shown in dashed perform in one consecutive processing line.

Figure 22:
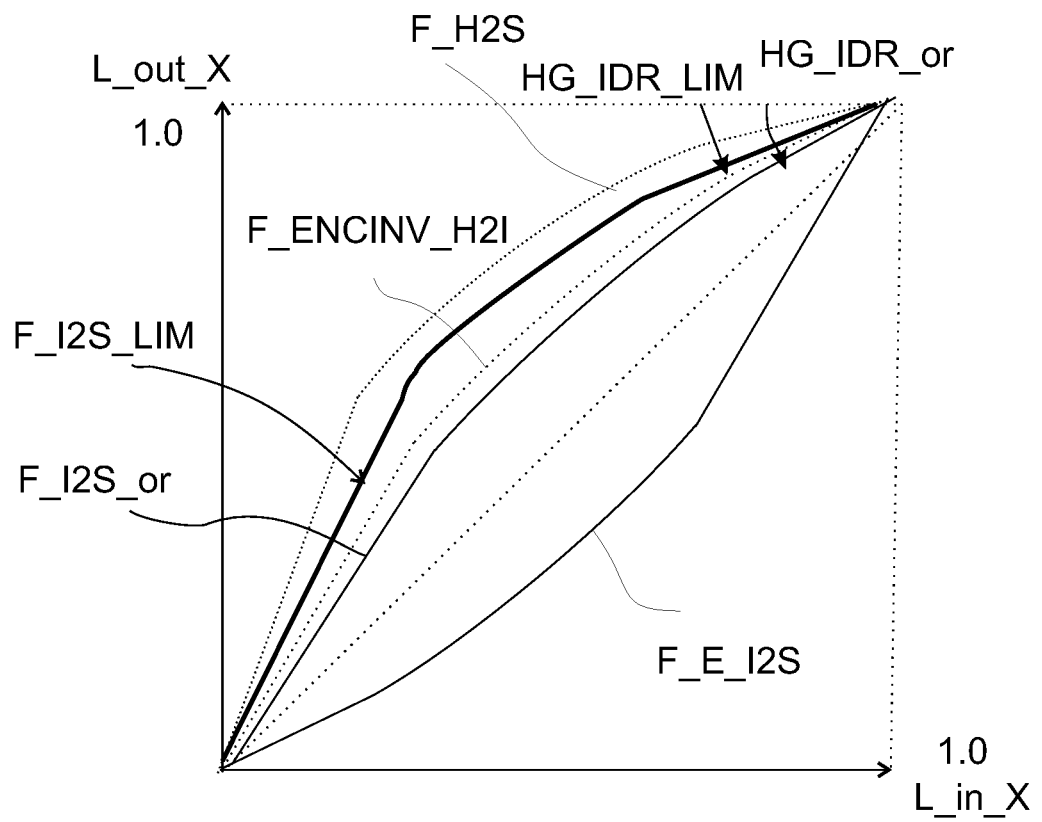
FIG. 22 schematically elucidates how a specific embodiment of limiting of a para's highlight gain works on the luminance re-grading between input and output normalized lumas.
Figure 23:
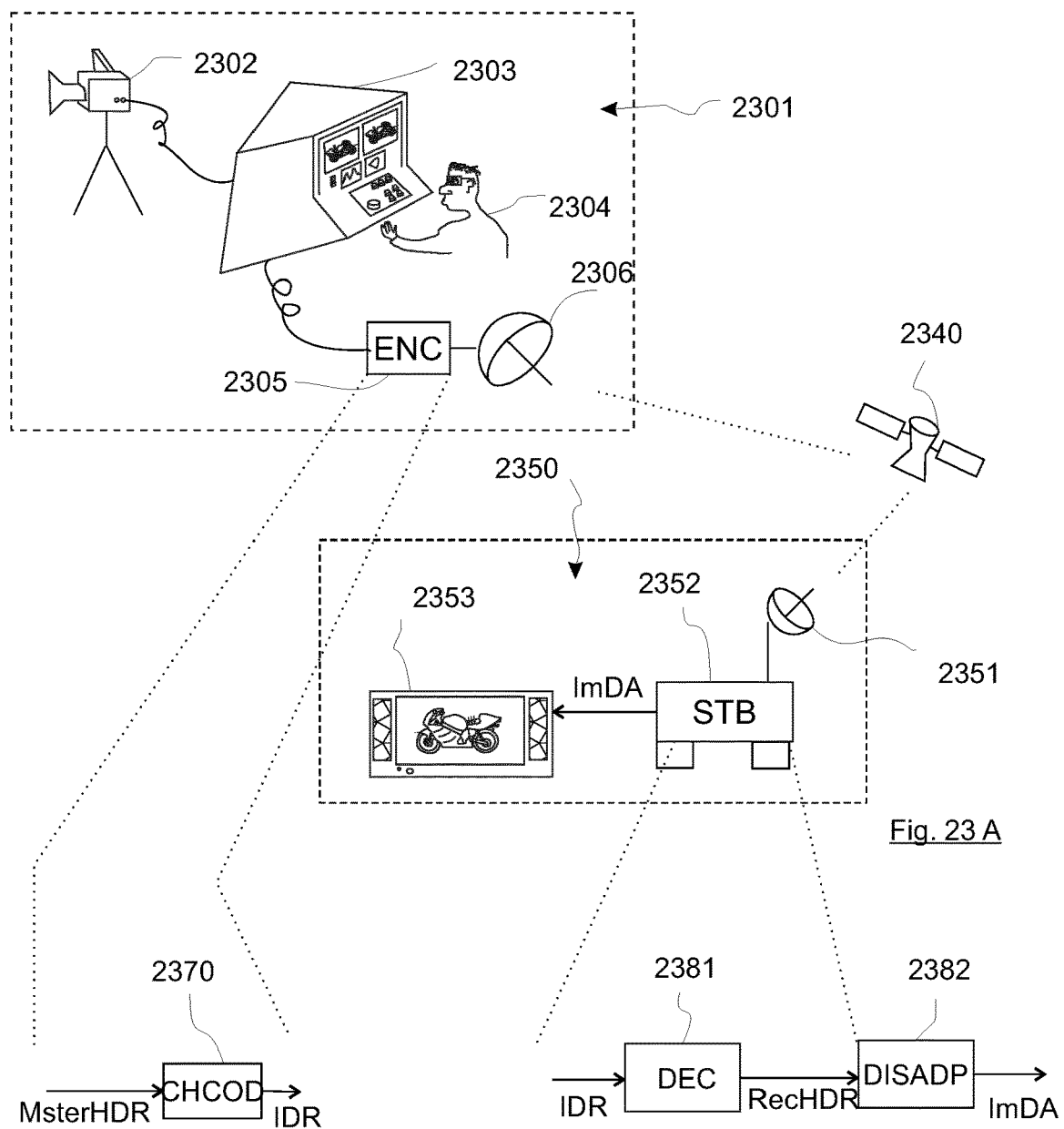
FIG. 23 schematically illustrates a total HDR communication and handling chain, to clearly point out the difference between video coding and display optimization (which former relates to the very definition of images per se, and which latter merely to the, still liberally customizable, preferably taking into account the re-grading needs of the various possibly quite different and quite challenging HDR scene images, optimization for displaying on any particular display of particular dynamic range capability)
Figure 24:
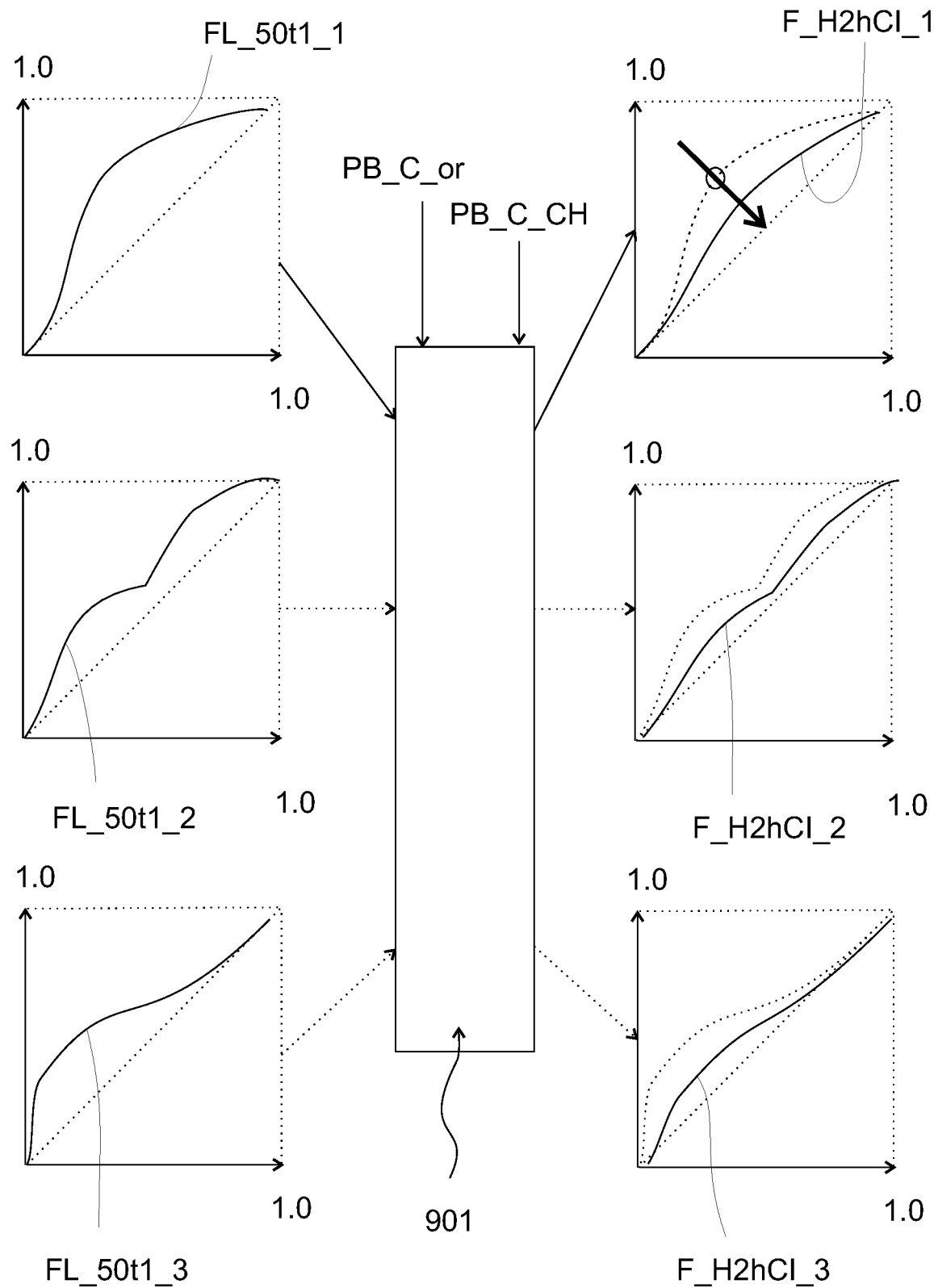
FIG. 24 further elucidates how a standardized function changing algorithm will work, which will take any input function shape made e.g. by a content creator's grader to specify how normalized luminance of a first peak brightness dynamic range should be mapped to the normalized luminances of a second peak brightness image representation, and how from this input function a function to map between a different, specifically lower third peak brightness representation and the second one can uniquely be calculated, for any given input function.
Figure 25:
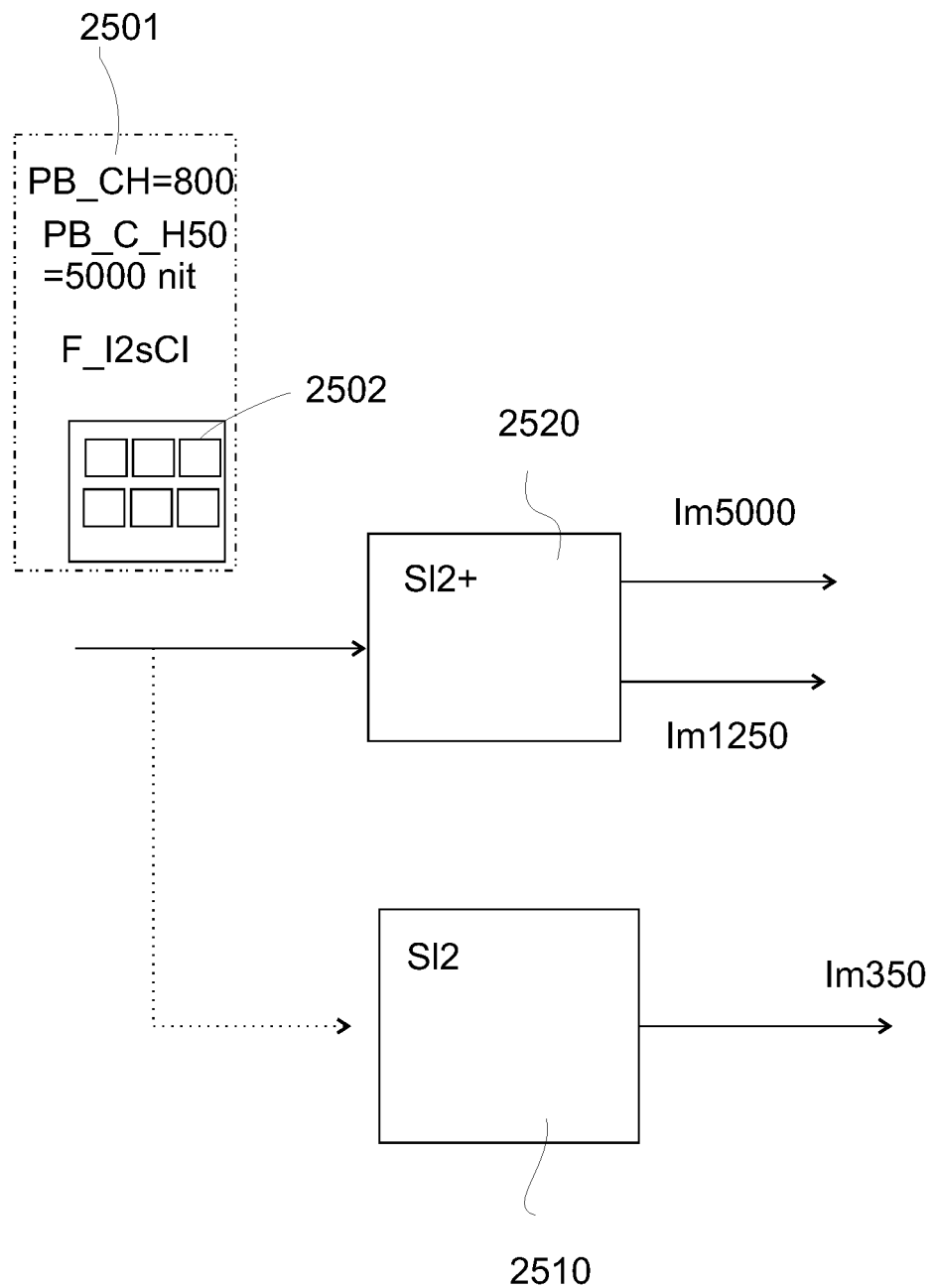
FIG. 25 schematically illustrates how the presently taught SLHDR2PLUS video coding mechanism and signal is nicely compatible with legacy SLHDR2 decoders, yet offers the additional possibilities for SLHDR2PLUS deployed decoders.

FIG. 22 explains what limiter 1804 performs as re-shaping of the luminance mapping curve. In dotted line we show the starting F_H2S, and how from this with the fixed channel adaptation algorithm a F_ENCINV_H2I function can be derived, and how the (original) remaining partial re-grading function F_I2S or may be derived (the original F_IDR in case there were no additional specific limitations in ETSI2 as currently formulated calling for a more detailed specific embodiment approach as explained now). The HG_IDR or of this function, given that this an entirely new approach on HDR video coding, may not fit in the HG_COD definition, i.e. require a value above its 8 bit max. 255 which can be communicated in an ETSI2-compliant HDR video coded signal. Ergo, the HG_IDR or has to be lowered to at most the limited still codeable value HG_IDR_LIM (which in the current embodiments of ETSI2 is 2.0, but this is not a fundamental limitation of the approach). This creates a para which has a highlight linear segment somewhat closer to the upper horizontal boundary (L out X=1.0), which corresponds to somewhat brighter IDR images, but that is no fundamental issue (as we mentioned above that there is some relaxation possibility in the system to design various variants). It will mean that the highest luminance regions in an HDR scene image get a lesser contrasty IDR representation (although the original master HDR is fully recoverable, and the SDR look and all MDR re-gradings will also look good), but that is no real problem since we are grading from higher PB_C_HDR masters, and this corresponds to what is e.g. in the 3000-5000 nit range, which will typically be lamps and the like, which can suffer a little deterioration (since some deteriorating mapping is always needed anyway, and kind of expected for such ultra-bright regions). Second channel adapter 1805 will then apply all the above math again, but now with the limited HG_IDR situation (so first an equivalent F_H2S can be calculated, which as said in this category of embodiments can be performed by extrapolating the limited F_I2S LIM to a PB_D=PB_Mster_HDR situation, and then the channel adaptation can be applied again).

This resultant F_H2I_LIM (i.e. mapping L_HDR lumas to L_IDR lumas) can now be applied by image pixel luminance mapper 1806, to pixel by pixel determine all IDR lumas (or in fact, using also the chromatic processing of ETSI2, i.e. the there defined C_LUT corresponding to the F_H2I_LIM luma mapping function shape, all IDR YCbCr colors). Finally IDR metadata determiner 1807 calculates the full set of metadata for realizing the ETSI2-compliant metadata-based re-grading to lower PB_C images (for any display PB_D), lower than PB_IDR that is (or by extrapolation higher than PB_IDR). So again the SG_IDR, HG_IDR and WP_IDR are determined according to any of the possible combinations forming an embodiment as explained above. Now also the BLO_IDR and WLO_IDR are determined (as explained above, a particular luma on the Mster_HDR luma axis can be mapped to 1.0 on the SDR luma axis, and this can be re-formulated as a mapping of a suitably scaled IDR luma, i.e defining the WLO_IDR, and similarly for the BLO_IDR). Lastly, the customizable curve can be optimized for the new IDR metadata situation, by customizable curve optimizer 1808 (in case customizable curves are used, because some sub-market codec technology embodiment variants such as e.g. real-life broadcast may have elected to never use customizable curves, and then the former para+offsets math applies).

FIG. 19 elucidates how adaptation of a customizable curve works. It is always composed of two conceptual components (whether directly applied in a single direction only, or inverted). The first component can be understood by focusing the mind on an object: assume for a moment that one of the control points of the multi-linear-segment customizable curve corresponds to a pair of pants (so the specific L_in_S normalized luma xo1I is e.g. the average luma of all pants pixels). A transformation is used to e.g. brighten those pants pixels (around and in particular the one of the control point), to output normalized lumas being better lumas for those pants, according to the human grader (or automaton software). We also see in FIG. 4 that in the ETSI approach this happens as a last (optional) fine-grading coding step in the encoder (unit 405), and correspondingly a first step in the decoder. So actually, this luma transformation is in fact defined in the SDR luma domain (after the coarse HDR-to-SDR luma mapping of the para+offset if any).

So one can reason that any luma needs a transformation (for that object!) which can be written multiplicatively as L_out=m(L_in_SDR)*L_in_SDR.

The needed multiplicative luma change (percentual) may be different in any other image, e.g. the IDR image, but one thing one should be able to rely on is that the correction of a fine-grading corresponds to a specific "object" needing a re-grading (even if the customizable curve is used for another one of its benefits in addition to particular object fine-grading, e.g. improvement of the shape of the coarse grading luminance mapping curve, it physically can still be interpreted as such an object-based improvement, be it by defining a set of virtual object corresponding to some luma sub-ranges). So if one tracks the objects to another DR luma range, the normalized abscissa value may change, but not the core essence of the object (e.g. the man on the motorcycle has a different normalized luma in HDR, namely 5/5000 than in SDR, namely 5/100). So we have to recalculate the function for that new normalized luma position distribution (this can be done for any amount of intermediate partial re-grading luminance mapping functions, even upwards and downwards various partial tracks as however complex one would like to design a HDR video coding embodiment). So FIG. 19*a* shows this generically: original SDR object luma (e.g. a segment end-point of a linear segment of the customizable curve) xo1I moves to xo1N (this would happen by applying e.g. the abcara being the inverse of F_I2S of FIG. 20. The same happens to other points, e.g. the pentagon segment point (typically it may be assumed there are sufficient well-spread segment points, e.g.

16, of which e.g. 10 may be set automatically by the grading software if the grader e.g. applies a coarse linear customized re-grading to a relatively large sub-range of the darker lumas). So, having all these points shifted, one can now, from the original CC_gr curve of the master content metadata grader (F_H2S with CC on SDR luma range) define an intermediate curve CC_XRM, by applying the original CC_gr offsets, i.e. the L_out_SDR=CC_gr[L_in_S] where the L_in_S values were the original values xo1I etc. (but now the L_out values are applied to the xo1N re-mapped IDR luma positions (yielding the dashed curve). Of course this will not be the appropriate HDR-to-IDR (or more exactly IDR-to-IDR) mapping multipliers, so that correction is performed in step 2, as illustrated in FIG. 19b.

As we can again see in FIG. 19b, the multiplicative fine-correction can be interpreted as a scalable process which changes between no correction (the Mster_HDR pixel lumas are already correct by definition, because this image was graded optimally by the content creator to start with) to full correction for the most extremely different (from Mster_HDR) PB_C image in the spectrum of re-graded images, which in applicant's approach typically is the 100 nit SDR image (in which the full correction for a particular pixel is e.g. mso1, which can be written as an absolute offset, but also as a multiplicative correction yio1=mso1*xso1 (any luma mapping curve shape yio1=F_L(xso1) can be formulated as a curve of luma-dependent multiplication values).

Since the multiplicative correction view can be formulated as offsets from the diagonal where yio1=xso1, one can introduce a vertical scale factor:

ScaleVer=max [(1−La)/(1−K);0]     [Eq. 25]

With La and K defined as above.

The needed, adapted values of the customizable curve are then found as:

yiDA=Min[(yio1−xso1)*ScaleVer+xio1;1]     [Eq. 26]

and this being calculated for all values of xso1.

Figure 27:
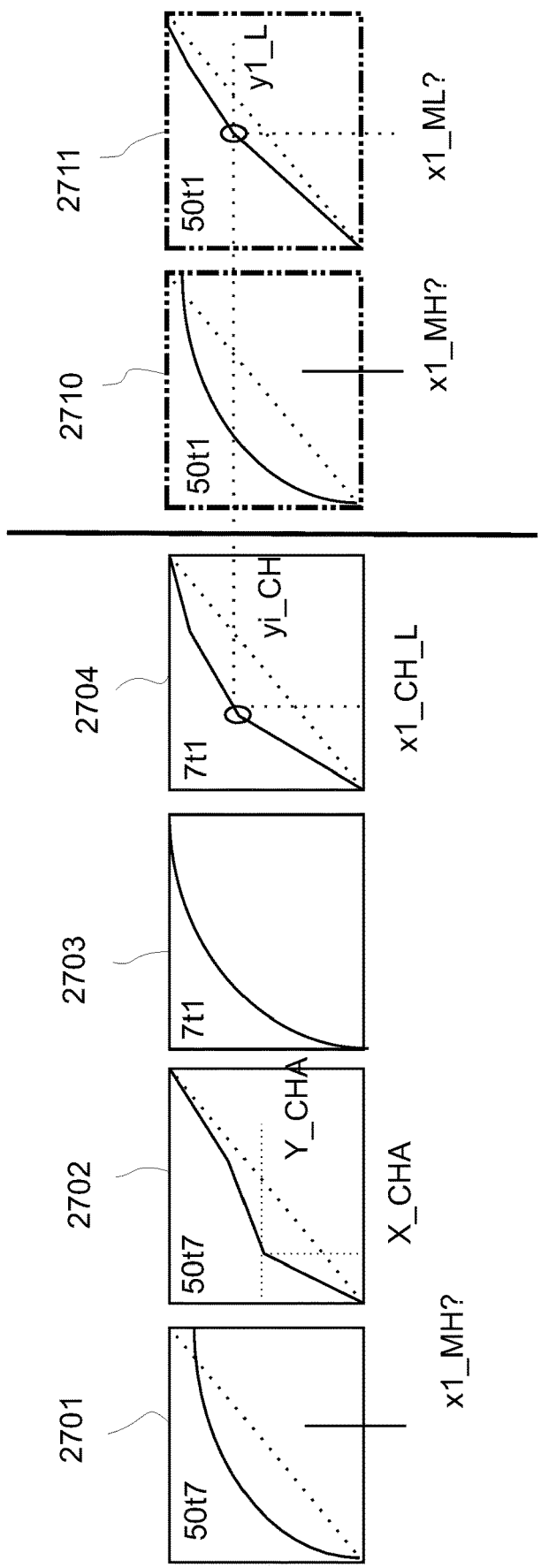
FIG. 27 schematically elucidates a nice pragmatic approach to numerically obtain specifically a customized version of the customizable curve, if present.

FIG. 27 gives another way to determine the segment end-points of a customizable fine-grading curve in a technically elegant manner for decoders. We already described how the parameters of the coarse grading para curve can be recalculated (and if present a black and/or white offset, but we will simplify the explanation by focusing on the para). We assume the para does the coarse grading from whatever starting dynamic range, to the final dynamic range, e.g. the LDR dynamic range. The black and white offset can take into account normalized range discrepancies if any are necessary, so the customizable curve is just about repositioning the relative luminances of specific regimes along the normalized axes. Ergo, the curve will begin at (0,0) respectively end at (1,1), and have some segment connector points in between, in the example 2 curve shape determining points (e.g. (x1,y1)). It also makes sense that in any representation, and re-grading thereof the number of linear segments and points are equal, since the nature of the regimes doesn't change (the regime of darkest e.g. indoors colors may end at a different (perceptually uniform typically) normalized luma in e.g. a 200 nit PB_C image than in a 1500 nit PB_C image, but the fact that there exist two regimes—indoors and outdoors—does not change in the re-gradings.

Ergo, for a multilinear re-grading function shape redetermination, we only need to find the corresponding end points (xnew, ynew).

We can make use of another property to be met (ideally), namely, whether one directly re-grades the master HDR image with the total span function FL_50t1 (which in this case will consist of two consecutively to be applied functions: a total para 2710 and a total multilinear function 2711), or one does the re-grading in two steps, first from the 5000 nit master to the 700 nit IDR (again by using two functions: an IDR generating para 2701 and a IDR generation multilinear function 2702), and then therefrom grades down to the 100 nit LDR image (with channel para 2703 and channel multilinear function 2704), the result must be the same: the same LDR image, because that is the LDR image one should always make for the master HDR image, i.e. the one which the content creator has coded and communicated (with the down-grading luminance mapping function shapes). I.e. whichever of all possible input HDR normalized lumas x1_MH one chooses, the final LDR output luma should be the same. Ergo, this will also be true for input lumas which happen to map (via the previous mappings) to an x-coordinate of the channel multilinear: x_1_CH_L. This one can use to recalculate segments, since having the equality on the ordinate coordinates y, one only needs to calculate an x_new for the particular segment of the corresponding multilinear customized curve on the other dynamic range.

So at the encoding side, one can for any x1_MH input calculate the channel adapted Y_CHA by applying the scaled standardized algorithm. This value Y_CHA will form the next block's corresponding input x-coordinate, which goes into a channel-PB_C-determined para, the equations of which we gave above. The yi_CH value is already known, since it is equal to the y1_L value for the total re-grading of 5000 nit to 100 nit, which of course at the encoding side, in contrast to the decoding side, is directly known (was made by the human grader e.g.). Doing this for all the points of the multilinear function, one obtains all its characterizing parameters, to be written into the video signal (as part of F_I2sCI).

At the decoder side, on can again use the same rationale to come to a somewhat different algorithm, since now some unknown parameters have to be calculated. So now the x1_ML values corresponding to the received hence known x1_CH_L values have to be calculated, because the first step was to recover the total re-grading function(s). There is typically a digital precision of the functions, e.g. 256 quantized x-values (i.e. not the specific e.g. two or three inter-segment points, but all points, so also the points on the lines in between), so one can simply numerically construct a LUT table for all points of the customizable curve as it was customized, i.e. the y1_L of that curve being known, the needed x1_ML corresponding to x1_CH_L.

Mapping from the LDR to the IDR luma, we get the x1_CH for any yi_CH, and that value can be mapped inversely through the para 2703. We can also determine which of all possible x1_MH values maps to this Y_CHA value, if we know para 2701 and multilinear 2702. We know from above how to calculate the para 2701 from the decoder side received function metadata as explained above. We don't know the multilinear 2702 (yet), but that is not currently needed. Because we know that the customized curve 2702 also follows the vertical scaling equation of the standardized algorithm. Any tested X1_MH is convertible into a corresponding X_CHA, and the thereto corresponding (and needed) Y_CHA value follows from: Y_CHA= (y1_L—x1_ML)*scaleVer+X_CHA, and x1_ML can be calculated from x1_MH by applying the total para 2710.

Figure 26:
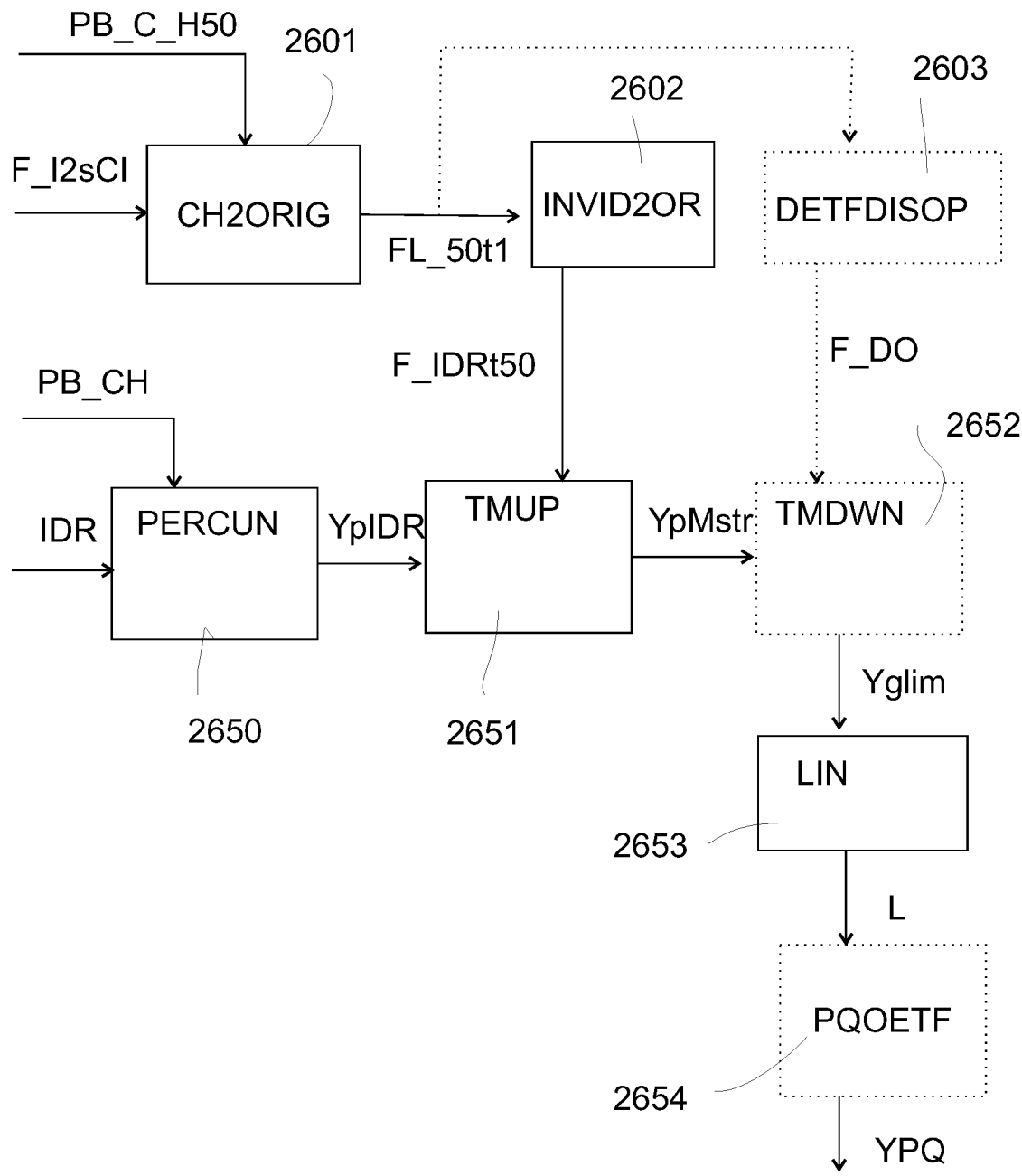
FIG. 26 schematically summarized in blocks all of the below decoding math, to recover all needed luminance mapping functions, for doing all needed decoding luminance processing to obtain the image which is needed from the received IDR image.

Ergo, one will find exactly one corresponding x1_MH respectively x1_ML value, which will recover the total multilinear function 2711. Because one then knows the total re-grading and the channel part re-grading, the remaining re-grading, i.e. between the 5000 nit master and the 700 nit IDR, can also be determined, hence everything is decoded, i.e. the functions are determined, and the processing of all IDR image pixel colors can start, as explained with FIG. 26.

FIG. 26 again conceptually elucidates in a summarized manner, for ensuring a better degree of understanding for the reader, all which the skilled reader could already find in the detailed explanations above. The upper track boxes are about metadata recalculation, i.e. the various steps of the various luminance mapping function determinations (the lower unit 2650 etc. are the ones that perform the actual pixel color processing). One now nicely sees the two step calculation, corresponding to standardized algorithm application in HDR function unit 901, respectively the function determination of IDR mapping function generator 903 in the encoder, but now from the SLHDR2PLUS video decoder side. As explained, the decoders get the function F_I2sCI which specifies the luminance re-grading behavior between the received elected IDR image with its channel peak brightness PB_CH and the 100 nit grading. But we need to determine the larger span function, between 100 nit and a master HDR peak brightness of e.g. PB_C_H50=6000 nit, i.e. the FL_50t1 function (or more precisely the inverse-shaped function of the one used at the encoding side), which original function calculator 2601 will do. But we're not there yet, we want to decode the IDR normalized luminances (or more precisely, in our typical decoding topology perceptually uniformized normalized pixel lumas) into the master HDR reconstructed luminances. So neither the originally received F_I2sCI, nor the function FL_50t1, which determines the regrading between the PB_C_H50 nit master and 100 nit, not the PB_CH nit IDR image and either of the two others, so we need to determine the function F_IDRt50 to apply to the IDR pixel lumas as received, to obtain the (perceptually uniformized) reconstructed master HDR image pixel lumas YpMstr, which is what reconstruction function determiner 2602 will do. We have shown the display adaptation possibility as a dashed display optimization function calculation unit 2603, because as said, although it will typically also be enabled in our full capability SLHDR2PLUS decoding ICs, it is in principle optional for a SLHDR2PLUS decoding. The channel peak brightness PB_CH will be used to convert normally coded (e.g. 10 bit YCbCr) IDR pixel luminances onto perceptually uniform IDR pixel lumas YpIDR, upon which we will typically do our reconstructive luminance mapping in our preferred SLHDR2PLUS ICs (although the skilled person understand how one could embody the present invention principles in alternative circuits or software which do not apply perceptual uniformization, or another method, etc.). Perceptual uniformizer 2650 thereto applies equations 1 and 2 with PB_C_H=PB_CH. The luminance upmapper 2651 reconstructs the master HDR image lumas by simply applying the determined function, i.e. YpMstr=F_IDRt50(YpIDR). In case display adaptation is needed to create e.g. a 350 nit PB_C image, display optimizer 2652 just applies to therefor determined display optimization function, yielding display optimized pixel lumas: Yglim=F_DO(YpMstr). Those can be converted to actual normalized pixel luminances L by linearizer 2653, which applies the inverse equations 1 and 2, but now with the e.g. 350 nit PB_C_DO of the display optimization instead of PB_CH. Finally there may optionally typically be a further luma code generator 2654 which applies the Perceptual Quantizer EOTF of SMPTE 2084 to give output lumas YPQ in the popular HDR10 format.

Figure 28:
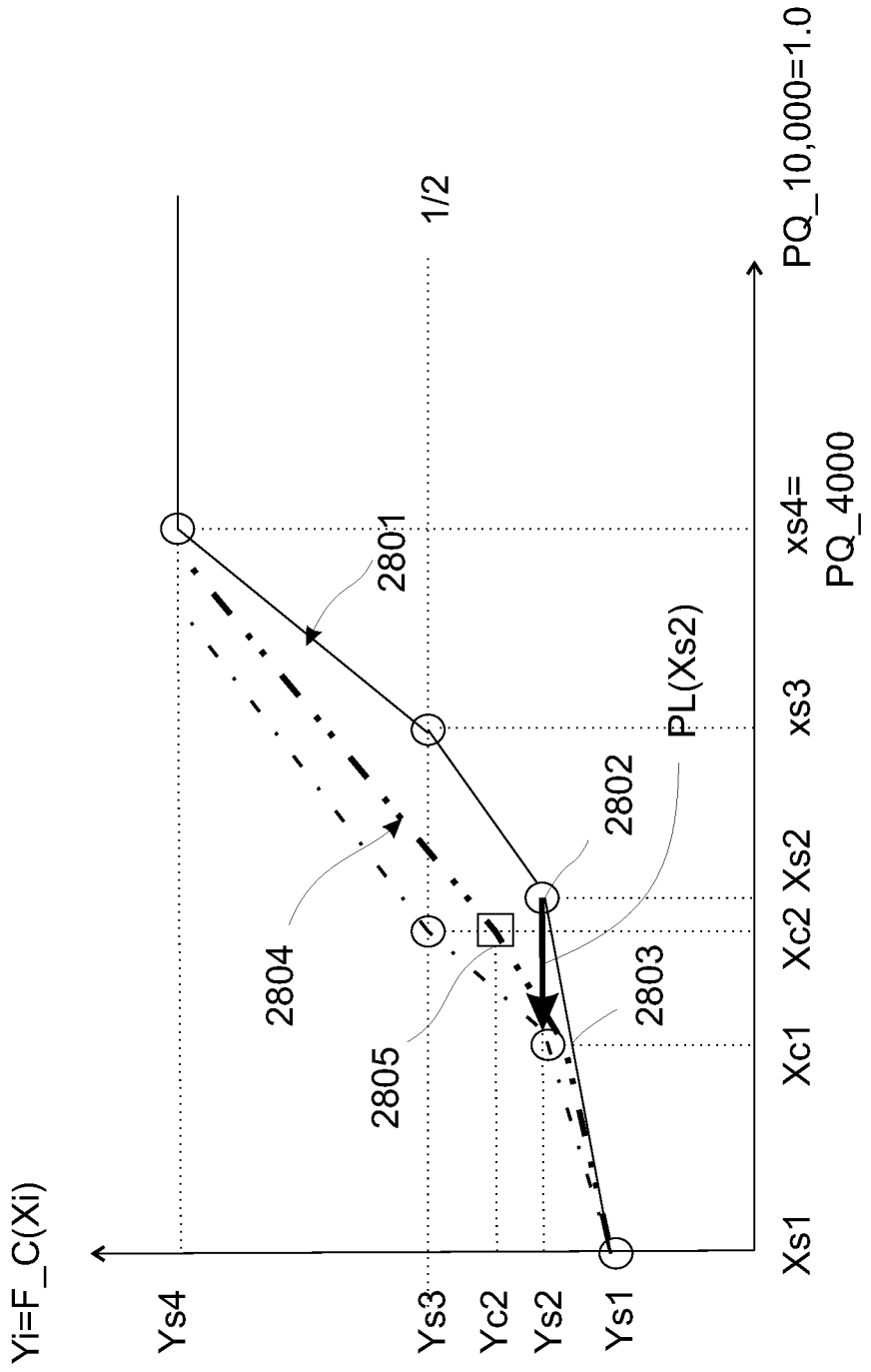
FIG. 28 elucidates a pragmatically handy approach to handle to pixel chromas in an SLHDR2PLUS approach.

In FIG. 28 there is given an exemplary specification of chroma processing (i.e. affecting the saturation of the pixel colors rather than the luminances). We assume a processing apparatus topology (e.g. typically an integrated circuit, inside some e.g. consumer device) as shown in FIG. 15 is used, in which the chroma processing (multiplier) needs to get the appropriate multiplicative value for each pixel, or more precisely each possible pixel color YCbCr. This value is determined by chromatic processing determination unit 1551 by means of a function which enables presenting a different value for different pixel luma values, i.e. enabling differential saturation modification along the color gamut, that is specifically along the height Y of the color gamut.

An example of such a function F_C(Xi), where Xi is now the normalized representation of Y on a scale ending at e.g. 1.0 typically representing a fixed 10,000 nit value, is shown in FIG. 28. It is a multi-line-segment curve (as a merely non-limitative example) defining for several possible pixel lumas the saturation factor (Ys=F_C(Xs), e.g. 0.33). In this example a value of ½ means chroma identity, i.e. neither a boost nor dilution of the saturation. In this specific example values lower than 0.5 define a chroma boost, and values higher a reduction of the saturation, ergo, we see that this particular saturation gain specification curve F_C(Xi), which e.g. a human content creator or automaton may freely select to be of any shape depending on the needs of the particular HDR scene and its images (e.g. a nighttime street with colorful TL signs, or a fiery explosion needing another optimal chroma adjustment to convert an image of a first luminance dynamic range into an optimally corresponding output image of different second luminance dynamic range), reduces the saturation for brighter objects, to make them fit in the gamut tip e.g.

In this example, we assume that our original master HDR image had a codeable peak brightness, or maximum occurring pixel luminance, of 4000 nit, which corresponds to some normalized uniform PQ value PQ 4000=0.9.

Since there is nothing in that master HDR image above 4000 nit, saturation boost values above 4000 nit need not in principle be specified, but one may e.g. specify them to keep constant and equal to the 4000 nit value Ys3. We see that the original saturation boost specification curve, denoted by the small s-es, is defined by points (Xs1, Ys1), (Xs2, Ys2), etc., in which the X-coordinate is a normalized luma (on the perceptually uniformized axis, in this example using the SMPTE 2084 EOTF), and the Y-coordinate represents the applicable multiplicative boost factor for that X-value, i.e. e.g. 0.88, to be multiplied by Cb and Cr similarly.

This starting situation, and original saturation gain function 2801, defines how one should process the pixel chromas when going from the first reference dynamic range, in this case 4000 nit PB_C_HDR, to the second reference dynamic range, which in this example is the typical 100 nit PB_C SDR image with its pixel lumas and chromas Cb, Cr.

The task of SLHDR2PLUS is again to represent this actually as a different channel-PB_C-related processing, e.g. if PB_CH=600 nit, we need to find a channel saturation boost specification curve 2804, which corresponds to the original saturation boost specification curve 2801 in that it applies the same color chroma change if one were to start from the channel communication IDR image corresponding to the original master HDR image.

I.e., if one maps any pixel of the master HDR image (Y HDR, Cb HDR, Cr HDR) to any secondary dynamic range color, e.g. an SDR pixel (Y SDR, Cb SDR, Cr SDR), or a corresponding pixel color for a 250 nit MDR image for optimally driving a 250 nit PB_D display (Y_MDR2, Cb_MDR2, Cr_MDR2), i.e. this involving the specified and typically as metadata co-communicated luma mapping function(s) and the original F_C function, then one should get exactly the same or at least well approximating e.g. (Y_MDR2, Cb_MDR2, Cr_MDR2) pixel color(s) when starting from the channel image colors (Y_CDR6, Cb_CDR6, Cr_CDR6), but then applying the corresponding channel saturation boost specification curve 2804 (i.e. that function can then be loaded in the chromatic processing determination unit 1551 and the apparatus can start bulk-processing the incoming pixels); and also the correct channel luma mapping, as explained in details in the various possible embodiments hereabove.

And more interesting, decoders being supplied with these channel-PB_C-related luma and chroma mapping functions, should be able to reconstruct the original situation (in particular determine the original saturation boost specification curve from the channel saturation boost specification curve as received), e.g, recover the HDR image, etc., or even perform any upwards or downwards mapping to any secondary dynamic range (MDR), but starting from the IDR image as received and its pixel colors (and preferably using the same pixel processing topology, preferably the one shown in FIG. 15).

At the encoding side, the IDR image for channel communication can be generated by doing a e.g. 4000 nit PB_C_master HDR to 600 nit PB_CH mapping of the normalized lumas as elucidated with any of the above embodiments on the luma mapping part (see e.g. the F_H2hCI of FIG. 9). This is shown by the horizontal movement over distance PL(Xs2) of the original master function segment point 2802 to the channel-adapted segment point 2803 (the effect of this shift only is shown by the thin dot-dashed curve, which is merely shown but not used technically). Since the mapping from 600 nit IDR to 100 nit realizes only a part of the full 4000-to-100 nit chroma processing, the encoder still needs to calculate new output Y values for the points, corresponding to a vertical shift (e.g. the channel-adapted chroma boost value point 2805, which corresponds to the circle above it, i.e. has the same Xc value).

The saturation boost function needs to be modified in a first manner, to map from the master to the channel representation (e.g. PB_C_MHDR=4000 nit to PB_CH=600 nit), and this is according to this example preferably performed as follows:

First a modification factor is calculated according to $$MF=1-(invPQ[PB\_CH]-invPQ[PB\_SDR]/(invPQ[PB\_C\_MHDR]-invPQ[PB\_SDR]) \quad [\text{Eq. 27}],$$

with in the example PB_SDR=100 nit, and invPQ is shorthand for the inverse function of the PQ EOTF as standardized in SMPTE 2084.

Subsequently, a channel-adapted function g(Xn) is calculated which is defined as:

$$g(Xn)=F\_C[Xn]*MF+(1-MF)/Rs \quad [\text{Eq. 28}]$$

with Rs being a constant which is typically chosen to be 2.0. with Xn being any possible normalized PQ-scale luma representation of a pixel luminance, as shown in FIG. 28.

A new LUT for the processing to be loaded into chromatic processing determination unit 1551 may e.g. in a preferred realization embodiment be defined as $$F\_C\_chadap[Xn]=\text{Min}\{LC0;(1+MF*\text{POWER}[Xn;2.4])/(Xn*\text{Max}[Rs/255;Rs*g(Xn)])*S\} \quad [\text{Eq. 29}]$$

In which F_C_chadap is the adapted saturation boost function corresponding to the original content creator's F_C for the master HDR content, but for the particular PB_CH and corresponding Intermediate dynamic range image, LC0 is a constant, which is e.g. preferably equal to 1/8, POWER indicates the power function; Rs is another constant, which is preferably equal to 2, and S is a constant depending on the number of bits the wordlength of the luma codes uses, S=1/(POWER[2; wordlength]) e.g. 1/1023 for 10 bit input images.

What is interesting is the power function in the numerator of Eq. 29. This is an example of a well working function for correcting the non-linearity in saturation behavior occurring because of the codification of the lumas and chromas in a PQ-defined domain (as contrasting with normal square root behavior, as the original definition of YCbCr in SDR/MPEG times was).

The first manner modification step is only the starting point to the further calculation of the saturation boost specification curve 2804 (in fact this does "half" of the mapping from 4000 nit to 600 nit —starting from the original specification of 4000 to 100 nit—but we are actually interested in the 600 to 100 nit saturation boost specification curve 2804, so we have to split the total action into two parts, and, having in the first modification step already calculated the first part, now calculate the remaining part of the totality).

To obtain the curve 2804, the SLHDR2PLUS encoder has to do two things.

First, he needs to calculate new definition points for the linear segments of the F_C_chacomm[Xc] curve 2804 (or similarly with a continuous F_C curve representation), by tracking such points through the luma mapping.

I.e., each original point (from the metadata-supplied original 4000-100 nit F_C curve) e.g. Xs2, needs to be mapped to a new normalized point Xc2, etc.

This is done by applying the total luma mapping PL(Xs2) as it was defined in any embodiment situation described hereabove, i.e. the PL curve is the F_H2hCI curve of FIG. 9.

E.g. if the luma mapping was defined only with a Para, a suitably deformed Para will be used (according to the above equations) to map the 4000 nit PB_C_MHDR normalized luma positions [indicated with the subscript s in FIG. 28] to the corresponding 600 nit PB_CH normalized luma positions [indicated with the subscript c in FIG. 28]. If the luma mapping also involved a white offset, and/or a customized curve shape etc., all of that needs to be similarly adjusted to the 600 nit situation, and the corresponding 600 nit normalized luma positions (Xc . . . ) have to be calculated, from where the definition of curve 2804 starts.

But the chroma adjustment for all there (re-determined) positions Xc, needs to do only the remaining part for correcting from 600 nit (or whatever IDR's PB_CH) to the lowest dynamic range reference level which is typically 100 nit PB-SDR.

The Yc values are calculated according to:

$$Yc=Ys/\{Rs*(Ys*MF+(1-MF)/Rs)\} \quad [\text{Eq. 30}]$$

Note that Ys=F_C[Xs].

Note that this only explains the more important part of the curve, being the situation:

Xs<=invPQ[PB_C_MHDR], to be complete, for normalized PQ-lumas above the e.g. 0.9 value corresponding to the exemplare PB_C_MHDR=4000 nit, the following equation is preferably used, to maintain a correct scaling relationship:

$$Xc=Xs*invPQ[PB\_CH]/invPQ[PB\_C\_MHDR] \quad [\text{Eq. 31}]$$

The Yc-values for these upper Xc values will be calculated similarly, or maintained constant at the last relevant value if that part of the curve is unused in practice.

Finally, there may typically be some rounding involved to some quantization level, e.g.:

$$(Xcr, Ycr) = \text{round}[255*(Xc, Yc)]/255 \qquad [\text{Eq. 32}]$$

The SLHDR2PLUS decoder needs to recover the original (Xs,Ys) pairs from the transmitted and received (Xc,Yc) respectively (Xcr,Ycr) pairs of the F_C_chacomm[Xc] curve definition (i.e. the channel saturation boost specification curve 2804).

The inverse two steps of the encoder are therefore applied.

Firstly the decoder needs to remap the saturation boost curve linear segment definition points from their Xc to Xs positions. We have shown hereabove how to calculate the luma mapping from the IDR e.g. 600 nit PB_CH luma positions to the original master HDR luma positions, starting from the channel-adapted luma mapping function as received in metadata co-communicated with the IDR images.

We will call this operation in the PQ domain (as FIG. 28 shows both the Xs and Xc values are defined in the PQ-domain applying SMPTE 2084):

$$Xs = PQICA(Xc) \qquad [\text{Eq. 33}]$$

With the shape of this inverse channel adaptation function again depending on inter alia which definition of the luma mapping function was used, e.g. Para alone versus e.g. Para plus customized curve, and on the other hand the specific parameter values like ShadowGain defining the particular Para which is applicable to a cave exploration HDR scene, etc. (all of that was taught in full detail for the various embodiments above).

The corrective situation is again:

If $Xc > invPQ(PB\_CH)$ then $Xs = Xc*invPQ[PB\_C\_MHDR]/invPQ[PB\_CH]$ [Eq.34]

The needed Ys values are calculated according to:

$$Ys = (MF-1)*Yc/(Rs*MF*Yc-1) \qquad [\text{Eq. 35}]$$

Finally rounding may again be involved, e.g. to steps of 1/255.

Lastly, whereas this is useful to reconstruct merely the original master HDR image colors (Y, Cb, Cr) from the received IDR image, it is advantageous if the SLHDR2PLUS decoder can immediately convert to (i.e. calculate the respective e.g. (Y_MDR2, Cb_MDR2, Cr_MDR2) colors) any needed medium dynamic range image for optimally driving a PB_D MDR e.g. 250 or 400 nit display, and that then of course in one go, i.e. starting from the channel-adapted IDR colors (Y_CDR6, Cb_CDR6, Cr_CDR6); i.e. e.g. by loading the appropriate luma processing functions (or a LUT, etc.) and chroma multiplier determination function F_C MDR into the pixel color processing topology as illustrated in FIG. 15.

Thereto, the particular F_C defining equation of Eq. 29 may advantageously be applied.

Both the numerator and the denominator need to be adjusted to the new situation, i.e. new chroma mapping from PB_CH to PB_MDR, the latter being e.g. 250 when a 250 nit display needs to be supplied with the optimal display optimized image (of what was once the original master HDR image, and as far as the decoder regards, the corresponding incoming 600 nit IDR image, neither of those two being good yet for displaying on a 250 nit display).

Thereto firstly two modification factors are calculated:

$$MF\_ch = 1-(invPQ[PB\_CH]-invPQ[PB\_SDR]/(invPQ[PB\_C\_MHDR]-invPQ[PB\_SDR]) \qquad [\text{Eq. 36}]$$

$$MF\_do = 1-(invPQ[PB\_MDR]-invPQ[PB\_SDR]/(invPQ[PB\_C\_MHDR]-invPQ[PB\_SDR]) \qquad [\text{Eq. 37}]$$

If CPL[Xc] is the luma mapping function which is defined as:

For each PB_CH-defined normalized input luma Xc:

Apply first the PQ EOTF, then convert to the perceptual domain using the Philips perceptualizer function (PPF) with the RHO parameter for the value PB_CH, then apply the function shape of the luma mapping function from PB_CH back to PB_C_MHDR as was taught according to any of the possible embodiments and function shapes of the content creator, then convert to linear domain using the inverse of the Philips perceptualizer function (PPF) but now with the RHO parameter for the value PB_C_MHDR, and finally an inverse PQ EOTF according to SMPTE 2084 yielding the corresponding CPL[Xc] value.

Then a CLY[Xc] function is calculated as:

$$CLY[Xc] = (1+MF\_do*\text{POWER}[CPL[Xc];2.4])/(1+MF\_ch*\text{POWER}[CPL[Xc];2.4]) \qquad [\text{Eq. 38}]$$

This involves a correction of the old (no longer applicable) situation of this part of the Chroma multipliers defining function (a C_LUT typically) which we will call the saturation position correction function (FSNL) to the new situation of that equation for the display optimization.

Then two g-functions are calculated as follows:

$$Gch[Xn] = F\_C[CPL[Xc]]*MF\_ch+(1-MF\_ch)/Rs;$$

$$Gdo[Xn] = F\_C[CPL[Xc]]*MF\_do+(1-MF\_do)/Rs \qquad [\text{Eqs. 39}]$$

(with F_C [CPL[Xc]] the original content creator's chroma multiplier yielding original saturation gain function 2801 calculated from the F_C_chacomm[Xc] the chroma adjustment curve as received by the SLHDR2PLUS decoder in metadata, i.e. corresponding to curve 2804, i.e. as performed by e.g. the above calculation of the (Xs,Ys) points)

Finally the C-LUT yielding the appropriate chroma multipliers for a IDR to MDR display optimization is calculated as:

$$F\_C\_DO[Xn] = CLY[Xc]*\max\{Rs/255; Rs*Gch[Xn]\}/\max\{Rs/255; Rs*Gdo[Xn]\} \qquad [\text{Eq. 40}]$$

This F_C_DO[Xn] function can be directly loaded into unit 1551 before the beginning of a newly incoming image to start running pixel color processor, to yield the correctly display optimized MDR image in time for displaying or the like, e.g. storage (the skilled reader understands that other realization variants are possible, but then all calculations need to be modified accordingly).

Although some embodiments/teachings were presented to elucidate some of the aspects that can be varied, alone or in combination, it can be understood that several further variants can be formed along the same basic principles: re-deriving the luma mapping equations from different intermediate dynamic range image metadata as received in conformity with ETSI2 HDR video communication, or similar, to reconstruct a master HDR image which was optimally graded at a content creation site. The algorithmic components disclosed in this text may (entirely or in part) be realized in practice as hardware (e.g. parts of an application specific IC) or as software running on a special digital signal processor, or a generic processor, etc.

It should be understandable to the skilled person from our presentation which components may be optional improvements and can be realized in combination with other components, and how (optional) steps of methods correspond to respective means of apparatuses, and vice versa. The word "apparatus" in this application is used in its broadest sense, namely a group of means allowing the realization of a particular objective, and can hence e.g. be (a small circuit part of) an IC, or a dedicated appliance (such as an appliance with a display), or part of a networked system, etc. "Arrangement" is also intended to be used in the broadest sense, so it may comprise inter alia a single apparatus, a part of an apparatus, a collection of (parts of) cooperating apparatuses, etc.

The computer program product denotation should be understood to encompass any physical realization of a collection of commands enabling a generic or special purpose processor, after a series of loading steps (which may include intermediate conversion steps, such as translation to an intermediate language, and a final processor language) to enter the commands into the processor, and to execute any of the characteristic functions of an invention. In particular, the computer program product may be realized as data on a carrier such as e.g. a disk or tape, data present in a memory, data travelling via a network connection—wired or wireless—, or program code on paper. Apart from program code, characteristic data required for the program may also be embodied as a computer program product.

Some of the steps required for the operation of the method may be already present in the functionality of the processor instead of described in the computer program product, such as data input and output steps.

It should be noted that the above-mentioned embodiments illustrate rather than limit the invention. Where the skilled person can easily realize a mapping of the presented examples to other regions of the claims, we have for conciseness not mentioned all these options in-depth. Apart from combinations of elements of the invention as combined in the claims, other combinations of the elements are possible. Any combination of elements can be realized in a single dedicated element.

Any reference sign between parentheses in the claim is not intended for limiting the claim. The word "comprising" does not exclude the presence of elements or aspects not listed in a claim. The word "a" or "an" preceding an element does not exclude the presence of a plurality of such elements.

Used Jargon and Abbreviations

PB_C: the maximum codeable luminance of an image generically indicated for any situation, the C-standing for coding (not to be confused with the bit depth), e.g. a HDR image can have a PB_C_HDR=4000 nit (which also defines all the relative luminances below, because L_norm=L/PB_C, with L_norm a normalized luminance lying between 0.0 and 1.0 PB_D: the maximum displayable luminance (a.k.a. peak brightness) of any display, e.g. current HDR displays typically have a PB_D of 1000 nit (but values down to 600 nit or up to 2000 and even 4000 nit are also currently purchasable, and in the future there may be higher PB_D's).
IDR (Intermediate dynamic range): a mechanism to represent an image which was originally (i.e. the master image) defined with a PB_C1, e.g. 10,000 nit, actually as a secondary HDR image with PB_C2<PB_C1 (e.g. typically a factor 2 or more lower, and PB_C2 typically >=500 nit).
MDR (medium dynamic range; certainly not to be confused with IDR): an image with PB_C MDR typically lying between the PB_C of the HDR image as received (PB_C_H), and the PB_C SDR=100 nit (by agreed definition in the video field), which PB_C MDR value is set equal to the PB_D of any display (in this manner the incoming HDR image which has the wrong dynamic range, and consequently more importantly the wrong relative statistical distribution of normalized lumas with respect to each other, can be optimally re-graded for a particular available display of lower dynamic range capability, i.e. PB_D<PB_C_H)
Para: a specific highly pragmatically useful function to map lumas defined on a first normalized luma range corresponding to a PB_C1, to normalized by PB_C2, and the function being defined here above by the equations 4 and 5 and the parabolic in-between segment, or formally in ETSI TS 103433-1 V1.2.1 (2017-08) [ETSI1 for short] p. 70 Eqs. C-20.
Abcara: the inverse function of any para (i.e. with the parameters uniquely defining its shape), which inverse shape can also be intuitively found by swapping the axis (but sometimes needs to be mathematically calculated).
WLO (white level offset): the normalized luma in a first image's (im1) normalized luma range which gets mapped to 1.0 on a second normalized luma range, whereby PB_C_im1>PB_C_im2. In this application there are several different WLO's for the various images of different PB_C along the coding process definition, hence to easily differentiate them they are giving suffixes, like e.g. WLO_gr.
BLO (black level offset): the normalized luma in a first image's normalized luma range which gets mapped to 0.0 on a second normalized luma range, whereby PB_C_im1>PB_C_im2. In this application there are several different BLO's for the various images of different PB_C along the coding process definition, hence to easily differentiate them they are giving suffixes, like e.g. BLO_IDR.
P_LUT: the total mapping (comprised of partial re-gradings in our codec approach as explained with FIG. 4) needed to convert any possible normalized luma of a first image to a corresponding normalized luma of a second image, whereby PB_C_im1 !=PB_C_im2 (typically at least a multiplicative factor 1.02 different). Because the P_LUT[L], which is typically image-content-dependent, and e.g. optimized by a smart image analysing automaton or a human, changes the relative distribution of the normalized lumas, i.e. the histogram, it is a key aspect of a dynamic range transformation, e.g. the one involved in the IDR image definition which is key in the present novel HDR codec philosophy
C_LUT: a pixel-luma-dependent mapping of the chrominances (a.k.a. chromas) of the pixel colors, together with the P_LUT completing the color transformation $$(YCbCr\_out=T[Y\_cbCr\_in])$$

Philips perceptualizer function (PPF): a function (as defined in Eq. 1) arranged to parametrically converted luminances defined on a range between 0 and PB_C into perceptually uniform luminances, the PB_C value being via the parameter RHO the control parameter of the PPF function shape, and hence the allocation of the visually uniform coding lumas for the various input luminances.

The invention claimed is:
1. A high dynamic range video encoder comprising:
an image input circuit,
wherein the image input circuit is arranged to receive an input high dynamic range image,
wherein a highest encodeable pixel luminance of the input high dynamic range image is equal to a first maximum pixel luminance;

a first metadata input circuit,
   wherein the first metadata input circuit is arranged to receive a first value,
   wherein the first value specifies the first maximum pixel luminance;
a second metadata input circuit,
   wherein the second metadata input circuit is arranged to receive a master luma mapping function,
   wherein the master luma mapping function defines the relationship between lumas of the input high dynamic range image and lumas of a corresponding low dynamic range image,
   wherein the low dynamic range image has an LDR maximum pixel luminance;
a third metadata input circuit,
   wherein the third metadata input circuit is arranged to receive a second maximum pixel luminance,
   wherein the second maximum pixel luminance is less than the first maximum pixel luminance;
a HDR function generation circuit,
   wherein the HDR function generation circuit is arranged to transform the master luma mapping function into an adapted luma mapping function,
   wherein the adapted luma mapping function relates lumas of the input high dynamic range image to luminances of an intermediate dynamic range image,
   wherein the luminances of the intermediate dynamic range image have values less than the second maximum pixel luminance;
an IDR image calculation circuit, wherein the IDR image calculation circuit is arranged to apply the adapted luma mapping function to lumas of pixels of the input high dynamic range image to obtain lumas of pixels of the intermediate dynamic range image; and
an IDR mapping function generator circuit,
   wherein the IDR mapping function generator circuit is arranged to derive a channel luma mapping function on the basis of the master luma mapping function and the adapted luma mapping function,
   wherein the channel luma mapping function specifies conversion of lumas of the intermediate dynamic range image to lumas of the low dynamic range image if the lumas of the intermediate dynamic range image are available,
an image output circuit, wherein the image output circuit is arranged to output the intermediate dynamic range image;
a first metadata output circuit, wherein the first metadata output circuit is arranged to output the second maximum pixel luminance;
a second metadata output circuit, wherein the second metadata output circuit is arranged to output the channel luma mapping function; and
a third metadata output circuit, wherein the third metadata output circuit is arranged to output the first maximum pixel luminance.

2. The high dynamic range video encoder as claimed in claim 1,
   wherein the HDR function generation circuit applies a compression towards the diagonal of the master luma mapping function so as to obtain the adapted luma mapping function,
   wherein the compression comprises scaling all output luma values of the function with a scale factor,
   wherein the scale factor depends on the first maximum pixel luminance and the second maximum pixel luminance.

3. The high dynamic range video encoder as claimed in claim 1, further comprises a limiter circuit,
   wherein the limiter circuit is arranged to re-determine a slope of the channel luma mapping function for a sub-range of the lumas, wherein the sub-range of the lumas comprises a brightest luma.

4. The high dynamic range video encoder as claimed in claim 1, wherein the HDR function generation circuit is arranged to determine a saturation boost specification curve, wherein the saturation boost specification curve depends on an original saturation boost specification curve and the adapted luma mapping function.

5. A high dynamic range video decoder comprising:
an image input circuit,
   wherein the image input circuit is arranged to receive an intermediate dynamic range image,
   wherein the intermediate dynamic range image is configured to encode pixel luminances less than a second maximum pixel luminance,
   wherein the intermediate dynamic range image is an encoded version of a master high dynamic range image,
   wherein the master high dynamic range image is configured to encode pixel luminances less than a first maximum pixel luminance,
   wherein the second maximum pixel luminance is less than the first maximum pixel luminance,
a second metadata input circuit,
   wherein the second metadata input circuit is arranged to receive a second value, wherein the second value specifies the second maximum pixel luminance;
a first metadata input circuit,
   wherein the first metadata input circuit is arranged to receive a channel luma mapping function,
   wherein the channel luma mapping function defines the transformation of all possible lumas of the intermediate dynamic range image to corresponding lumas of a low dynamic range image,
   wherein the low dynamic range image has a LDR maximum pixel luminance which is lower than the second maximum pixel luminance;
a third metadata input circuit,
   wherein the third metadata input circuit is arranged to receive a third value,
   wherein the third value specifies the first maximum pixel luminance;
a luminance function determination circuit,
   wherein the luminance function determination circuit is arranged to transform the channel luma mapping function into a decoding luma mapping function,
   wherein the decoding luma mapping function specifies as for any possible input luma of a pixel of the intermediate dynamic range image a corresponding HDR luma of the master high dynamic range image,
   wherein the luminance function determination circuit uses the values of the first maximum pixel luminance and the second maximum pixel luminance; and
a color transformer, wherein the color transformer circuit is arranged to apply the decoding luma mapping function to the lumas of the intermediate dynamic range image to obtain reconstructed lumas of pixels of a reconstructed master HDR image; and
an image output circuit, wherein the image output circuit is arranged to output the reconstructed master HDR image.

6. The high dynamic range video decoder as claimed in claim 5, wherein the luminance function determination circuit is arranged to calculate a scale factor,
wherein the scale factor depends on the first maximum pixel luminance and the second maximum pixel luminance.

7. The high dynamic range video decoder as claimed in claim 5,
wherein the channel luma mapping function comprises a first linear segment, a second linear segment and a parabolic segment,
wherein the first linear segment has a first slope for a range of darkest lumas,
wherein the second linear segment has a second slope for a range of brightest lumas,
wherein the parabolic segment is arranged for lumas in between the range of darkest lumas and the range of brightest lumas.

8. The high dynamic range video decoder as claimed in claim 5,
wherein the image output circuit is arranged to output Ere a medium dynamic range image in place of the reconstructed master HDR image,
wherein the color transformer circuit is arranged to calculate pixel lumas of the medium dynamic range image,
wherein the medium dynamic range image has a third maximum pixel luminance,
wherein the third maximum pixel luminance is not equal to the values of the LDR maximum luminance, the first maximum pixel luminance, and the second maximum pixel luminance.

9. The high dynamic range video decoder as claimed in claim 5, further comprising a metadata output circuit,
wherein the metadata output circuit is arranged to output an output luma mapping function,
wherein the output luma mapping function defines output lumas for all lumas of the reconstructed master HDR image,
wherein the output lumas encode pixel luminances less than a fourth maximum pixel luminance,
wherein the fourth maximum pixel luminance is 100 nit.

10. The high dynamic range video decoder as claimed in claim 5,
wherein the luminance function determination circuit is arranged to determine an original saturation boost specification curve,
wherein the original saturation boost specification curve depends on a channel saturation boost specification curve and the channel luma mapping function.

11. The high dynamic range video decoder as claimed in claim 10,
wherein the original saturation boost specification curve depends on a saturation position correction function,
wherein the saturation position correction function corresponds to an equation involving a power function of the value of the lumas.

12. A method of high dynamic range video encoding of a received input high dynamic range image, wherein the input high dynamic range image has a first maximum pixel luminance comprising:
receiving a master luma mapping function,
wherein the master luma mapping function defines a relationship between lumas of the input high dynamic range image and lumas of a corresponding low dynamic range image,
wherein the low dynamic range image has a LDR maximum pixel luminance;
receiving a second maximum pixel luminance;
transforming the master luma mapping function into an adapted luma mapping function,
wherein the adapted luma mapping function relates lumas of the input high dynamic range image to luminances of an intermediate dynamic range image,
wherein the intermediate dynamic range image is configured to be able to encode pixel luminances less than the second maximum pixel luminance;
applying the adapted luma mapping function to lumas of pixels of the input high dynamic range image to obtain lumas of pixels of the intermediate dynamic range image;
deriving a channel luma mapping function based on the master luma mapping function and the adapted luma mapping function,
wherein the channel luma mapping function specifies how to calculate the corresponding lumas of the low dynamic range image from the lumas of the intermediate dynamic range image,
outputting the intermediate dynamic range image; and
outputting the second maximum pixel luminance, the channel luma mapping function and the first maximum pixel luminance.

13. A method of high dynamic range video decoding of a received intermediate dynamic range image,
wherein intermediate dynamic range image encodes a master high dynamic range image,
wherein the master high dynamic range image is arranged to encode pixel luminances less than a first maximum pixel luminance,
wherein the intermediate dynamic range image is arranged to encode pixel luminances less than a second maximum pixel luminance,
wherein the second maximum pixel luminance is less than the first maximum pixel luminance,
wherein the second maximum pixel luminance is a metadatum of the intermediate dynamic range image,
the method comprising:
receiving the first maximum pixel luminance;
receiving the second maximum pixel luminance;
receiving a channel luma mapping function,
wherein the channel luma mapping function defines the transformation of all possible lumas of the intermediate dynamic range image to corresponding lumas of a low dynamic range image,
transforming the channel luma mapping function into a decoding luma mapping function,
wherein the decoding luma mapping function specifies as output for any possible input luma of a pixel of the intermediate dynamic range image a corresponding HDR luma of the master high dynamic range image,
wherein the transforming uses the values of the first maximum pixel luminance and the second maximum pixel luminance;
applying to lumas of the intermediate dynamic range image the decoding luma mapping function to obtain reconstructed lumas of pixels of a reconstructed master HDR image; and
outputting the reconstructed master HDR image.

14. A computer program stored on a non-transitory medium, wherein the computer program when executed on a processor performs the method as claimed in claim 12.

15. A computer program stored on a non-transitory medium, wherein the computer program when executed on a processor performs the method as claimed in claim 13.

16. The high dynamic range video decoder as claimed in claim 5, further comprising a metadata output circuit,
wherein the metadata output circuit is arranged to output a luma mapping function,
wherein the luma mapping function defines for the medium dynamic range image corresponding lumas of an image having another maximum pixel luminance,
wherein the another maximum pixel luminance is 100 nit, or a value higher or lower than the maximum luminance value of the medium dynamic range image.

17. The method as claimed in claim 12, further comprising:
applying a compression towards the diagonal of the master luma mapping function so as to obtain the adapted luma mapping function,
wherein the compression comprises scaling all output luma values of the function with a scale factor,
wherein the scale factor depends on the first maximum pixel luminance and the second maximum pixel luminance.

18. The method as claimed in claim 12,
further comprising, re-determining a slope of the channel luma mapping function for a sub-range of the lumas, wherein the sub-range of the lumas comprises a brightest luma.

19. The method as claimed in claim 12,
further comprising, determining a saturation boost specification curve, wherein the saturation boost specification curve depends on an original saturation boost specification curve and the adapted luma mapping function.

20. The method as claimed in claim 13 further comprising, calculating a scale factor, wherein the scale factor depends on the first maximum pixel luminance and the second maximum pixel luminance.

21. The method as claimed in claim 13 further comprising determining a saturation boost specification curve, wherein the saturation boost specification curve depends on an original saturation boost specification curve.

22. The high dynamic range video encoder as claimed in claim 1, wherein the HDR function generation circuit selects a selected algorithm to transform the master luma mapping function into the adapted luma mapping function from a set of pre-agreed function transformation algorithms.

23. The high dynamic range video decoder as claimed in claim 5, wherein the luminance function determination circuit is arranged to transform the channel luma mapping function into the decoding luma mapping function based on which selected algorithm was selected by an encoder which created the intermediate dynamic range image.

24. The method as claimed in claim 12, wherein the deriving of the adapted luma mapping function is based on a selected algorithm to transform the master luma mapping function into the adapted luma mapping function selected from a set of pre-agreed function transformation algorithms.

25. The method as claimed in claim 13, wherein the transforming the channel luma mapping function into the decoding luma mapping function is based on the selected algorithm which was selected by an encoder which created the intermediate dynamic range image.

* * * * *